(12) United States Patent
Ross

(10) Patent No.: US 12,256,810 B2
(45) Date of Patent: Mar. 25, 2025

(54) APPARATUS FOR ADJUSTING A SHOE AND METHODS FOR MAKING AND USING THE SAME

(71) Applicant: Judy Jewell Ross, Coronado, CA (US)

(72) Inventor: Judy Jewell Ross, Coronado, CA (US)

( * ) Notice: Subject to any disclaimer, the term of this patent is extended or adjusted under 35 U.S.C. 154(b) by 256 days.

(21) Appl. No.: 18/070,004

(22) Filed: Nov. 28, 2022

(65) Prior Publication Data

US 2023/0099291 A1    Mar. 30, 2023

Related U.S. Application Data

(63) Continuation-in-part of application No. 16/778,773, filed on Jan. 31, 2020, now Pat. No. 11,559,110.

(60) Provisional application No. 62/800,258, filed on Feb. 1, 2019.

(51) Int. Cl.
 *A43D 3/02* (2006.01)
(52) U.S. Cl.
 CPC ..................................... *A43D 3/02* (2013.01)
(58) Field of Classification Search
 CPC . A43D 3/02; A43D 3/021; A43D 3/14; G09B 23/30; G06V 40/20
 See application file for complete search history.

(56) References Cited

U.S. PATENT DOCUMENTS

| | | | |
|---|---|---|---|
| 1,117,818 A | 11/1914 | Ellmann | |
| 1,753,857 A | 4/1930 | Galterio et al. | |
| 4,130,007 A | 12/1978 | Hayashi | |
| 5,875,504 A | 3/1999 | Tambling | |
| 6,581,437 B2 | 6/2003 | Chrystall et al. | |
| 6,883,197 B2 | 4/2005 | Tak | |
| 7,992,243 B2 | 8/2011 | Cook et al. | |
| 8,005,558 B2 | 8/2011 | Waatti et al. | |
| 8,032,962 B1 | 10/2011 | Payne | |
| 9,277,786 B2 | 3/2016 | Langvin et al. | |
| 11,178,938 B2* | 11/2021 | Kulenko | A43D 1/02 |
| 2007/0033750 A1 | 2/2007 | Cook et al. | |
| 2010/0229422 A1 | 9/2010 | Goonetilleke et al. | |
| 2014/0011172 A1* | 1/2014 | Lowe | G09B 23/288 434/273 |
| 2016/0107391 A1 | 4/2016 | Parish et al. | |

FOREIGN PATENT DOCUMENTS

DE    101 18 969 A1    1/2002

* cited by examiner

*Primary Examiner* — Timothy A Musselman
(74) *Attorney, Agent, or Firm* — Orrick, Herrington & Sutcliffe LLP

(57) ABSTRACT

An apparatus for adjusting a shoe and methods for making and using the same. A relative movement can be generated between a platform and a model foot wearing the shoe such that the platform contacts the shoe and the model foot adjusts the shoe via the relative movement. Advantageously, the model foot can be a surrogate to a human foot in adjusting the shape of the shoe. The model foot can stretch the shoe in the same manner as human walk. A person can experience great comfort when wearing the stretched shoe. The model foot can simulate the mechanical characteristics of the natural foot. The model foot can simulate gait of a natural foot and the stretching of the shoe can be further customized.

22 Claims, 57 Drawing Sheets

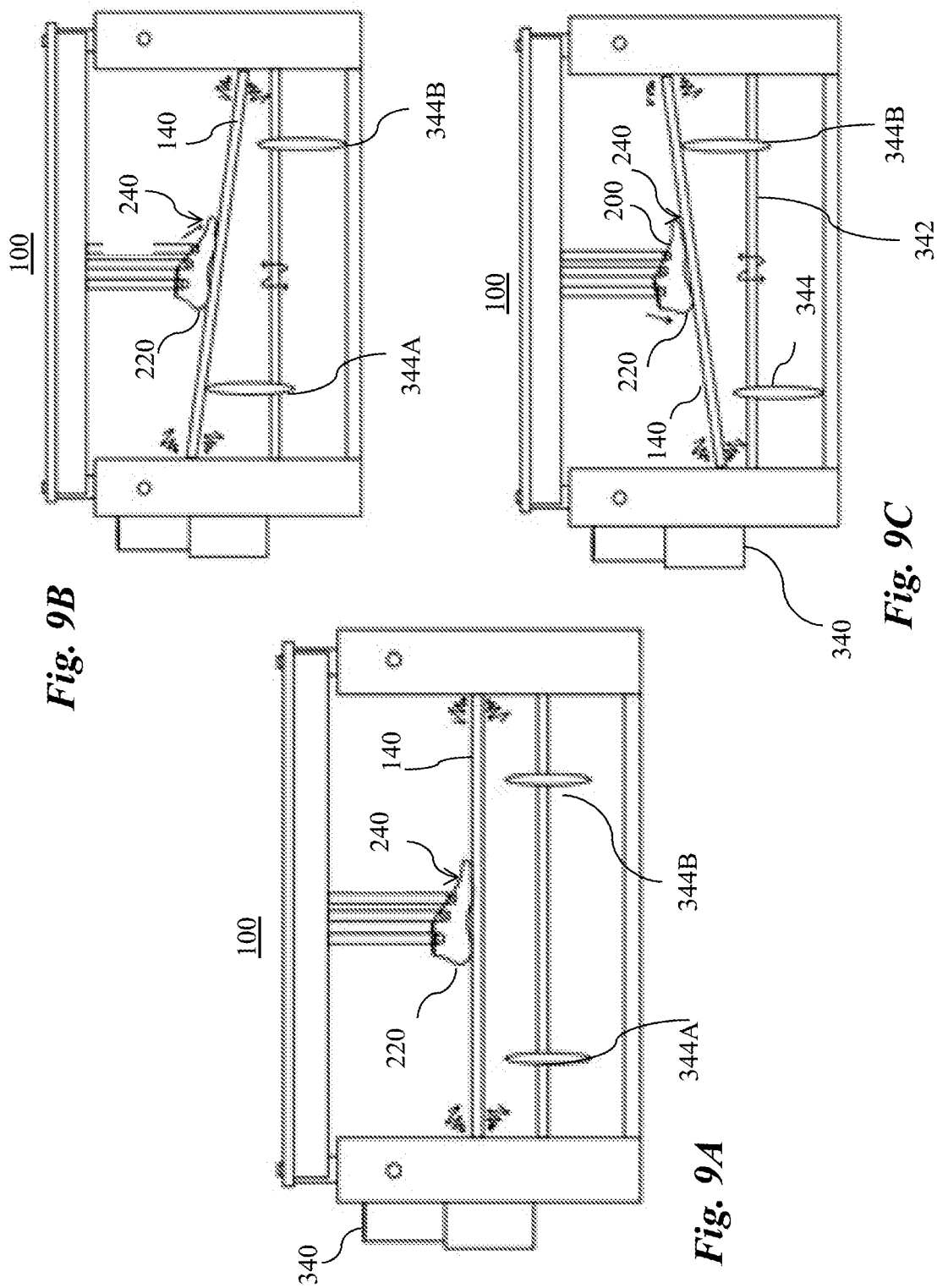

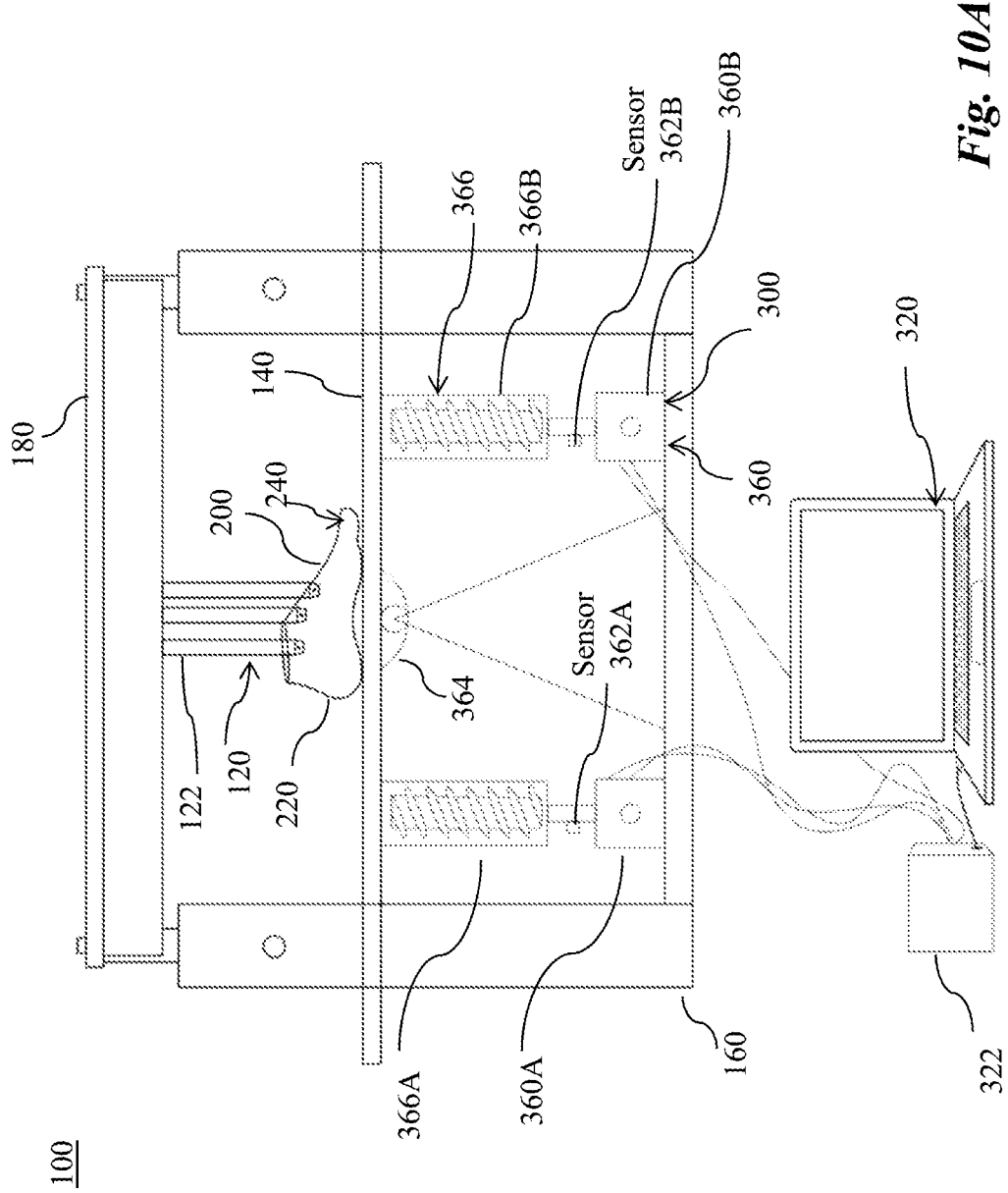

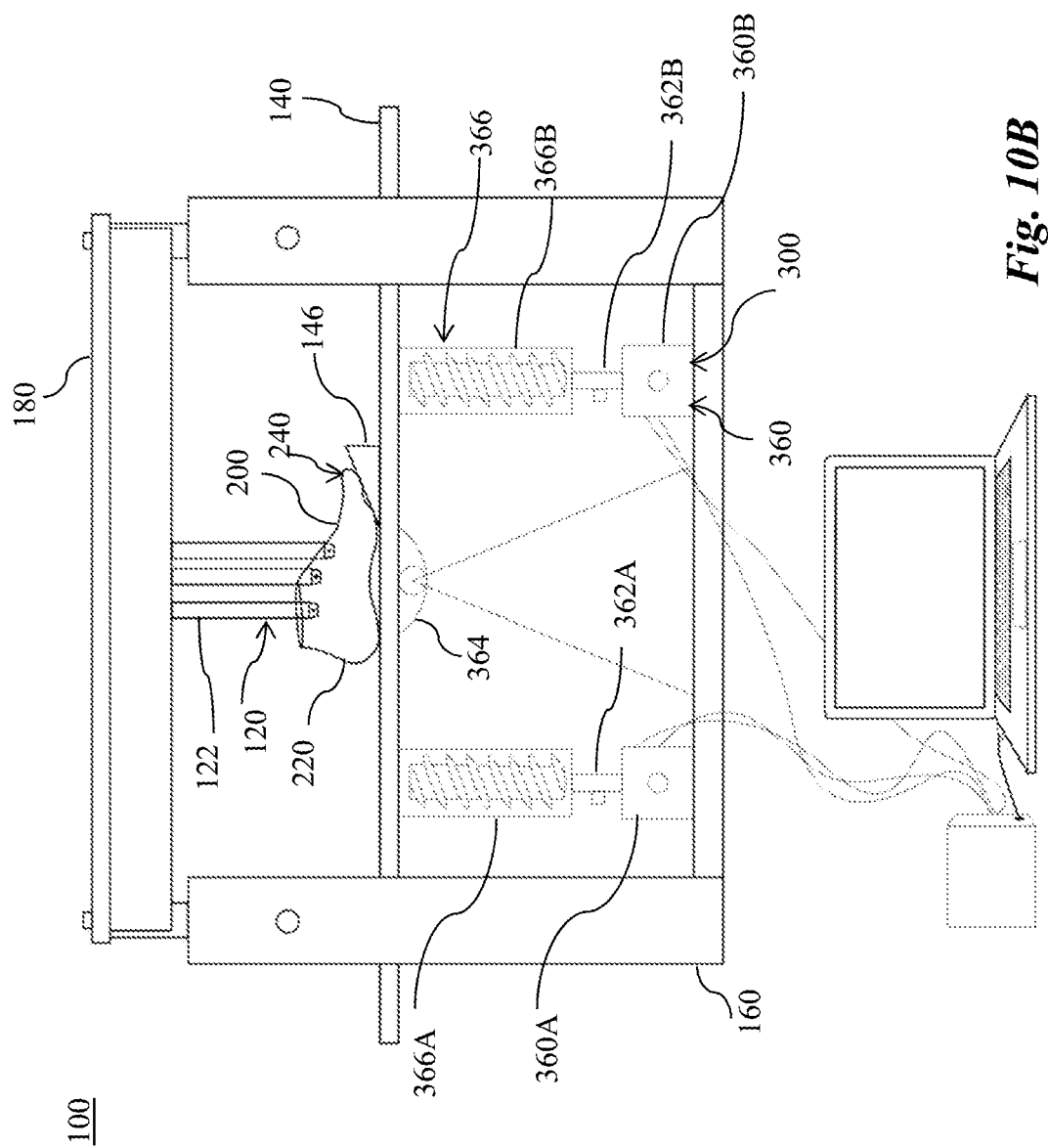

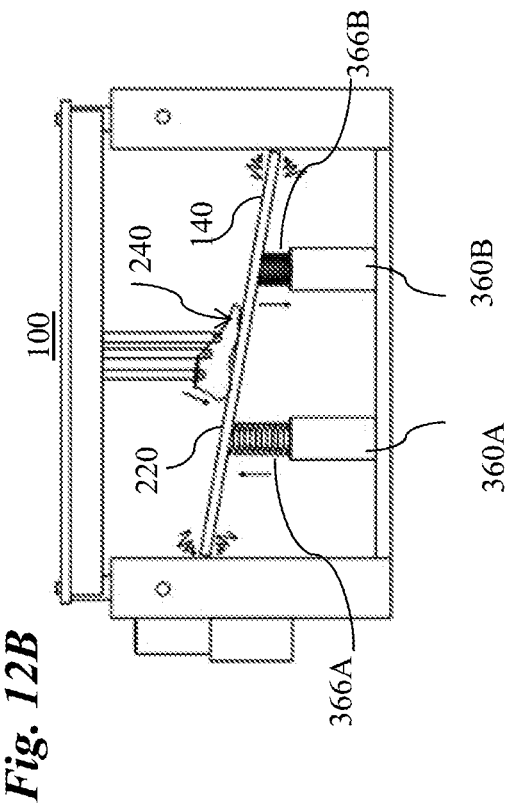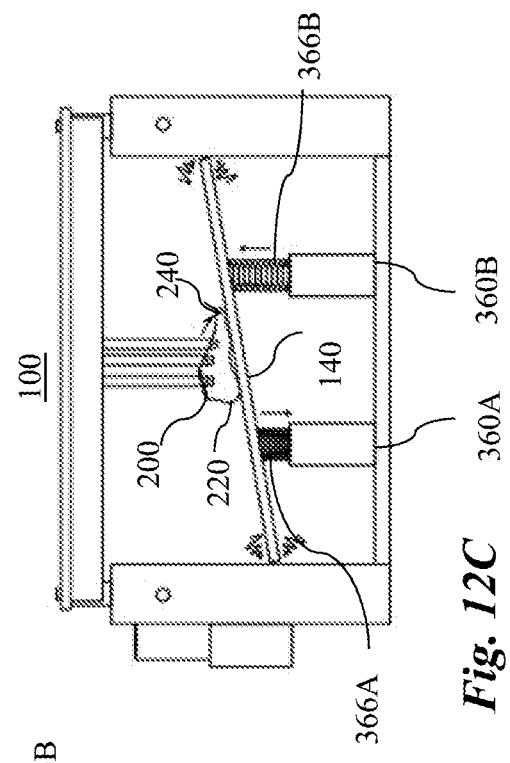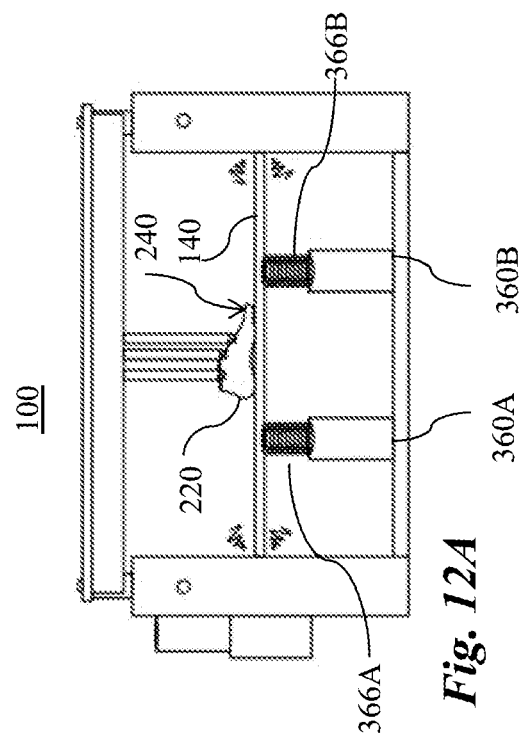
Fig. 12B
Fig. 12C
Fig. 12A

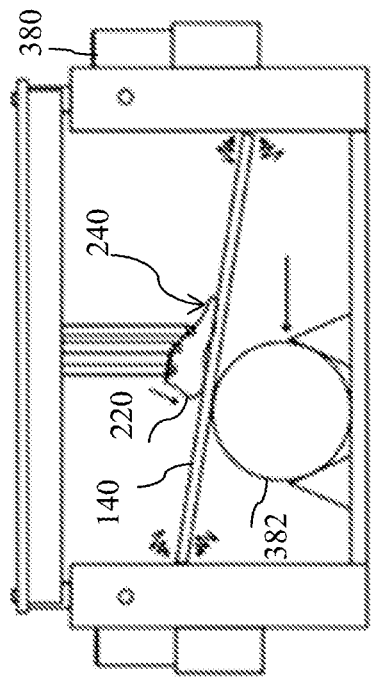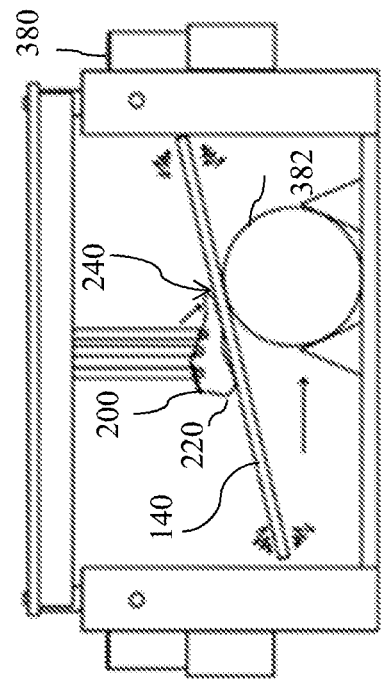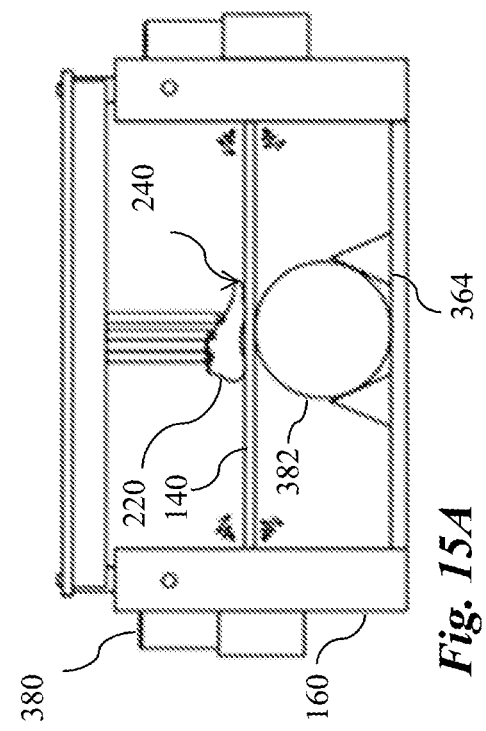
Fig. 15B
Fig. 15C
Fig. 15A

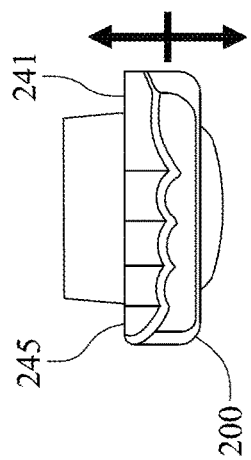
Fig. 22B
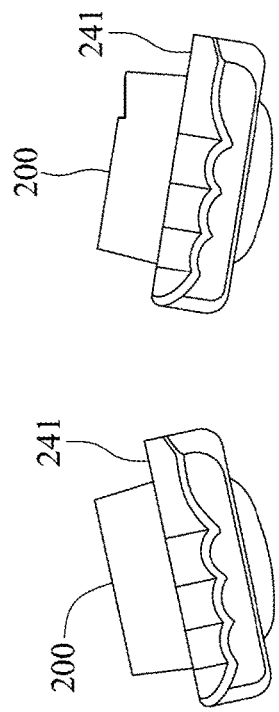
Fig. 22D
Fig. 22C
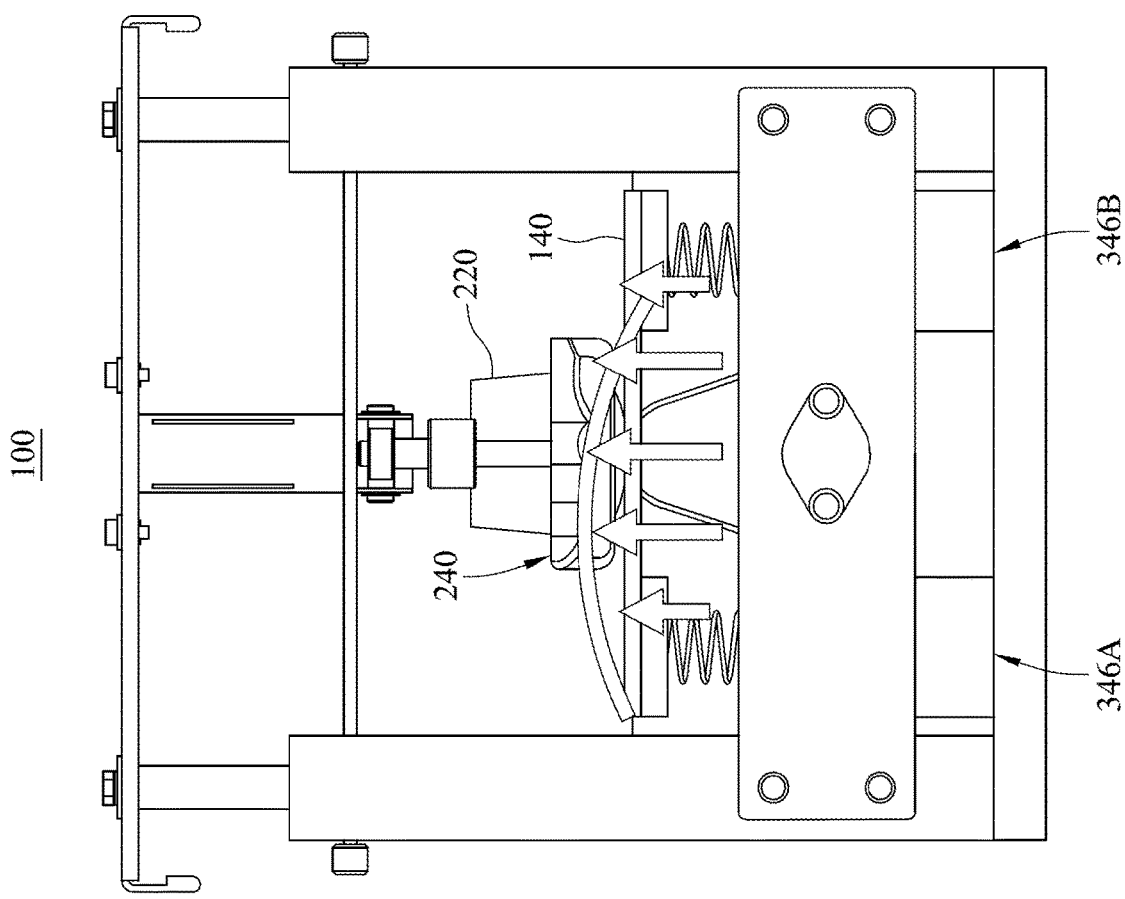
Fig. 22A

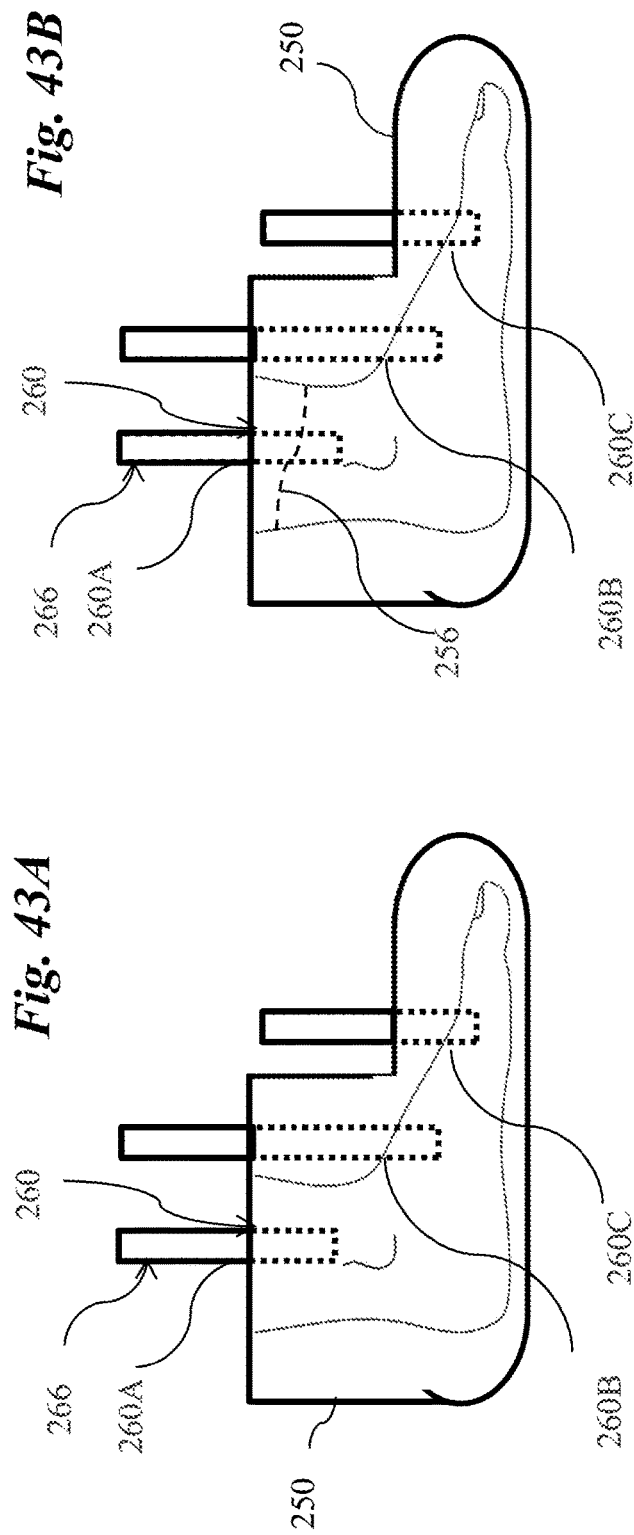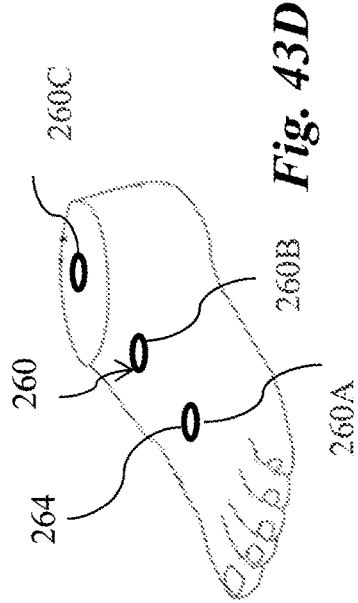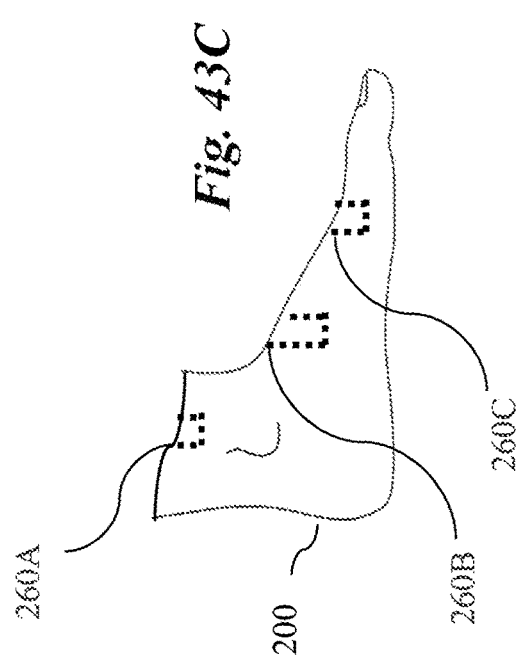

APPARATUS FOR ADJUSTING A SHOE AND METHODS FOR MAKING AND USING THE SAME

CROSS-REFERENCE TO RELATED APPLICATIONS

This application is a continuation-in-part of co-pending U.S. patent application Ser. No. 16/778,773, which was filed on Jan. 31, 2020, and claims priority to U.S. provisional patent application, Ser. No. 62/800,258, filed on Feb. 1, 2019. Priority to the preceding patent applications is expressly claimed, and the disclosures of the preceding patent applications are hereby incorporated herein by reference in their entireties and for all purposes.

FIELD

The disclosed embodiments relate generally to footwear and more particularly, but not exclusively, to an apparatus for adjusting a shoe and methods for making and using the same.

BACKGROUND

Shoes are a necessity for daily life. When wearing comfortable and properly-shaped shoes, human body can stand, sit or move with correct full-body posture and avoid discomfort or injury. Further, shoes provide a foundation for an image that a person wants to broadcast to the world. For example, different shoes present an identity of a person differently. If a person can wear any shoes comfortably, he/she can send a desired image to the world confidently at any time.

Most people buy generic shoes that are not custom made. Such shoes may not fit a person's feet perfectly and can result in many problems. For example, a toe having an abnormal bend in the middle joint, or hammer toe, may rub against internal surface of a shoe and develop blisters. The person thus stops wearing the shoe or wears the shoe in pain until the blisters heal. Thus, the person may break in the shoe but does so via a painful process.

Existing shoe stretchers tend to overstretch or understretch a shoe. As a result, the stretched shoe still does not fit a foot perfectly and is still uncomfortable to wear.

In view of the foregoing, there is a need for solutions to improve shoe stretchers that overcome drawbacks of existing solutions and adjust shoes with high precision and accuracy.

BRIEF DESCRIPTION OF THE DRAWINGS

FIGS. 9A-9C are exemplary diagrams illustrating other alternative embodiments of the apparatus of FIG. 6 in a resting state, a heel-press state and a toe-press state, respectively.

FIG. 10A is an exemplary detail drawing illustrating another alternative embodiment of the apparatus of FIG. 1, wherein the apparatus includes one or more actuators.

FIG. 10B is an exemplary detail drawing illustrating another alternative embodiment of the apparatus of FIG. 1, wherein the apparatus includes a toe flexing device.

FIGS. 12A-12C are exemplary diagrams illustrating other alternative embodiments of the apparatus of FIG. 10A in a resting state, a heel-press state and a toe-press state, respectively.

FIGS. 15A-15C are exemplary diagrams illustrating other alternative embodiments of the apparatus of FIG. 13 in a resting state, a heel-press state and a toe-press state, respectively.

FIG. 22A is an exemplary detail drawing illustrating an alternative embodiment of the apparatus of FIG. 21, wherein the apparatus is viewed from toes of a model foot.

FIGS. 22B-22D are exemplary diagrams illustrating alternative embodiments of the model foot of FIG. 22A in a neutral position, supination and pronation, respectively.

FIGS. 43A-43D are exemplary diagrams illustrating an embodiment of a process for making the model foot of FIG. 20, wherein the attachment points are defined concurrent with formation of the model foot.

Figure 1:
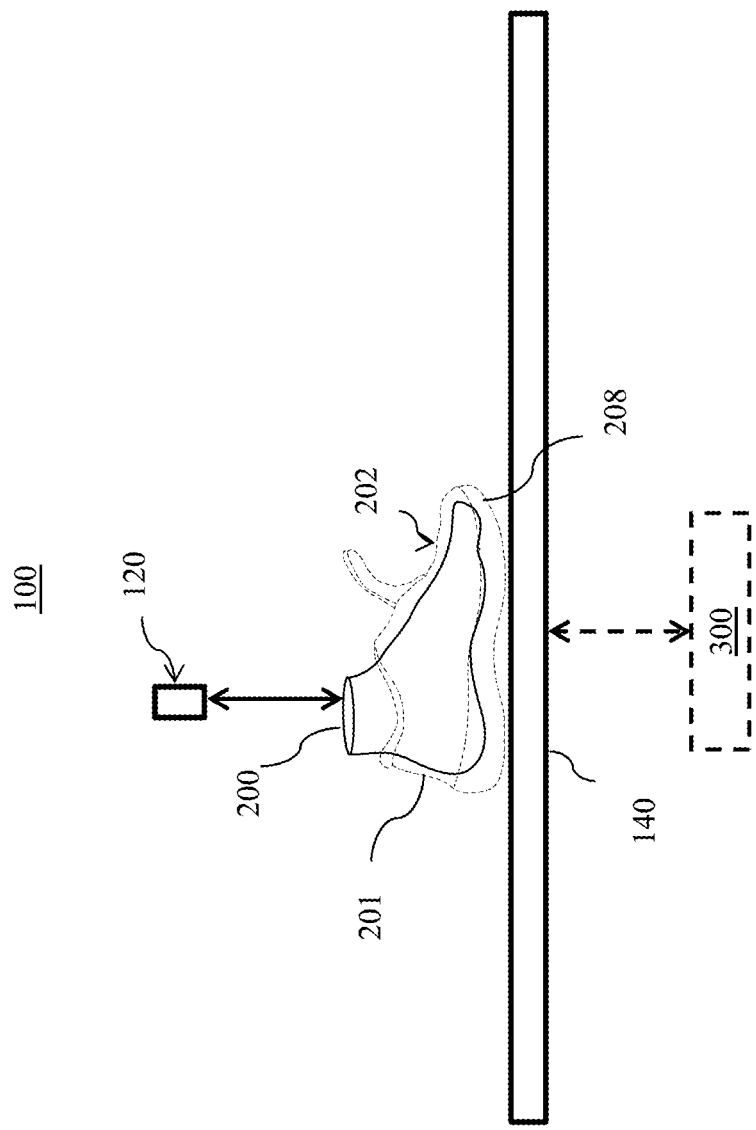
FIG. 1 is an exemplary diagram illustrating an embodiment of an apparatus for adjusting a shoe.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available shoe stretchers are incapable of adjusting shoes with accuracy, apparatuses and methods for adjusting shoes that can overcome the drawbacks as set forth above can prove desirable and provide a basis for a wide range of applications, such as customizing shoes for anyone, breaking in new sports footwear for athletes, improving comfort level for people in professions that require wearing numerous new shoes (for example, runway models). This result can be achieved, according to one embodiment disclosed herein, by an apparatus 100 for adjusting a shoe as illustrated in FIG. 1.

The apparatus 100 is shown in FIG. 1 as including a platform 140. FIG. 1 further shows an optional model foot 200 for being at least partially disposed within a shoe 202. The shoe 202 is shown as resting on the platform 140. Stated somewhat differently, a bottom of the shoe 202 is at least partially in contact with the platform 140.

In one embodiment, the model foot 200 can be supported in a predetermined (preferably fixed) position and/or manner. The platform 140 can engage the shoe 202 and move (for example, rocking repeatedly back and forth or in any preselected pattern and/or manner) relative to the model foot 200 to mimic actual human steps and thus break in the shoe 202.

FIG. 1 shows the apparatus 100 as further including an optional coupling structure 120 configured to be connected to the model foot 200. The coupling structure 120 can be in a predetermined position relative to the platform 140. In one embodiment, the model foot 200 can be releasably attached to the coupling structure 120. Stated somewhat differently, the coupling structure 120 can be a part of the apparatus 100 while the model foot 200 can be removable from the coupling structure 120 and/or customized. For example, the coupling structure 120 can be connected to, integrated with, be a part of, be in place of, and/or function as, the top assembly 180. Additionally and/or alternatively, the coupling structure 120 can be at least partially integrated with the model foot 200. For example, the coupling structure 120 can be an extension of the model foot 200. Additionally and/or alternatively, a portion of the coupling structure 120 can be a part of the apparatus 100 and another portion of the coupling structure 120 can be integrated with the model foot 200.

The apparatus 100 can include an optional platform control system 300 for controlling the platform 140. The platform control system 300 can be configured to control a position and/or motion of the platform 140 relative to the coupling structure 120. Stated somewhat differently, when the model foot 200 is connected with the coupling structure 120, the platform control system 300 can control a position and/or motion of the platform 140 relative to the model foot 200. When the platform 140 moves relative to the model foot 200 wearing the shoe 202 and contacts the shoe 202, the model foot 200 can apply pressure to the shoe 202. The model foot 200 can thus adjust or stretch the shoe 202. Adjusting the shoe 202 can include stretching, and/or changing a shape of the shoe 202. The shoe 202 can include a sole 208 and an upper portion 201 that collectively hold the model foot 200 in the shoe 202. In some embodiments, the internal surface of the upper portion 201 can be stretched to better accommodate a natural foot.

In one embodiment, the natural foot can have a foot deformation (or foot abnormality). Exemplary foot deformations can include a deformed toe, bunions, etc. An exemplary deformed toe can be misaligned with all other toes. Such deformed toes can include a hammer toe, a claw toe, a mallet toe, a curled toe, or a combination thereof. The model foot 200 can exactly replicate the foot deformation and stretch the toe box at the upper portion 201 of the shoe 202, so the toe box can accommodate the deformed toe without applying strong force on the deformed toe. Similarly, the shoe 202 can accommodate the bunion. The natural foot can avoid getting blisters on the deformed toe, bunion or other foot deformation that can be incurred during a shoe break-in process.

Advantageously, the model foot 200 can be a surrogate to a natural foot (or a biological foot, or a human foot) in adjusting the shape of the shoe 202. Upon the shoe 202 being adjusted, the natural foot can wear the shoe 202 with comfort. The natural foot does not need to break in the shoe by prolonged wearing. Painful symptoms from breaking the shoe 202, such as blisters, can be eliminated.

Although FIG. 1 one shows model foot 200 for adjusting one shoe 202 for illustrative purposes only, a plurality of uniform and/or different model feet 200 can be used for adjusting uniform and/or different model feet 200 in parallel and/or series in the apparatus 100. The plurality of model feet 200 can share a common coupling structure 120, use respective coupling structures 120, or a combination thereof.

Figure 2:
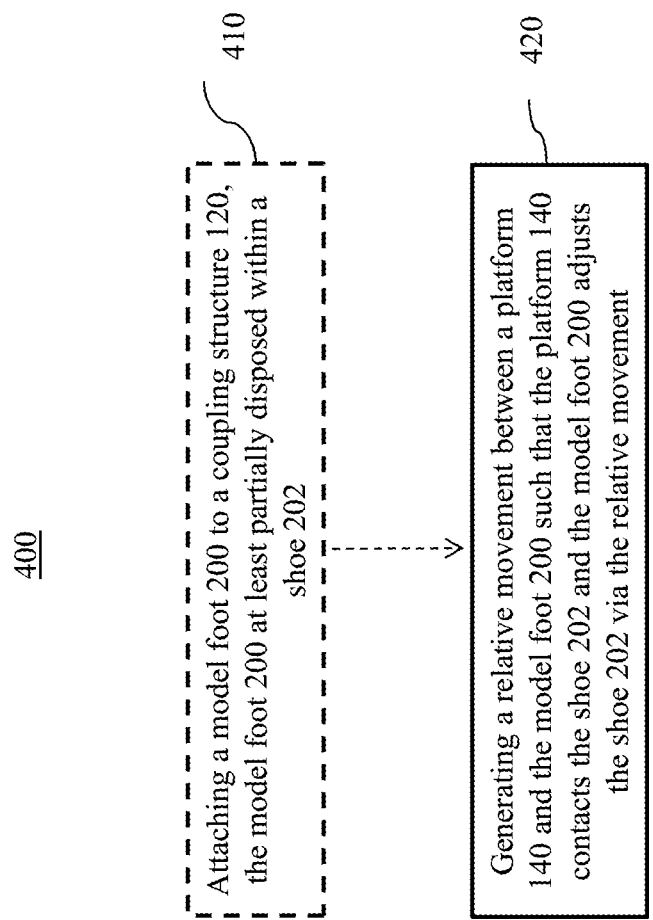
FIG. 2 is an exemplary top-level flow chart illustrating an embodiment of a method for adjusting a shoe.

Turning to FIG. 2, an exemplary method 400 for adjusting the shoe 202 is shown. The model foot 200 can optionally be attached, at 410, to the coupling structure 120. The model foot 200 can wear the shoe 202. In one embodiment, the model foot 200 can be attached to the coupling structure 120 and the shoe 202 can be put on the model foot 200. In another embodiment, the shoe 202 can be put on the model foot 200 and the model foot 200 wearing the shoe can be attached to the coupling structure 120. In yet another embodiment, the model foot 200 can remain attached to the coupling structure 120 and wear a plurality of uniform and/or different shoes 202 sequentially to adjust each of the shoes 202 one at a time.

A relative movement can be generated, at 420, between the platform 140 and the model foot 200, such that the platform 140 can contact the shoe 202 and the model foot 200 can adjust the shoe 220 via the relative movement. During the relative movement, because the platform 140 is in contact with the shoe 202, the model foot 200 can move within the shoe 202 and apply pressure to the shoe 202. Selected location(s) on the shoe 202 can be stretched under the pressure to conform the shape of the selected locations to the shape of the model foot 200, and thus ultimately to the foot of the shoe wearer. The selected locations can be, for example, on the toe, heel, vamp, welt and/or the sole of the shoe 202.

The relative movement can include any suitable motion for the model foot 200 to press on the platform 140 and enabling sliding and/or bending of the model foot 200 in the shoe 202. In one embodiment, the relative movement can include a simulated walking motion. Stated somewhat differently, the model foot 200 can walk on the platform 140 while wearing the shoe 202. For example, the model foot 200 can be stationary or static, and the platform 140 can press against a heel 220 (shown in FIG. 3A) of the model foot 200 and then press against toes 240 (shown in FIG. 3A) of the model foot 200. To simulate an actual human walk, the pressing motion can include the platform 140 rolling against the heel 220 and/or the toes 240 to imitate motion of a natural foot rolling against ground when making a step. Advantageously, the model foot 200 can stretch the shoe 202 in a manner similar to human walk.

In another embodiment, the relative movement can include a vibrating motion. Stated somewhat differently, the model foot 200 can vibrate against the platform 140 while wearing the shoe 202. The vibration can be in any selected directions model foot 200 including, for example, up and down, side to side, front to back. For example, the model foot 200 can be stationary or static and the platform 140 can press against a bottom of the shoe 202 (shown in FIG. 1) while vibrating. The vibration can result in sliding and/or rubbing motion of the model foot 200 against the shoe 202 and achieve adjustment of the shoe 202.

Figure 3A:
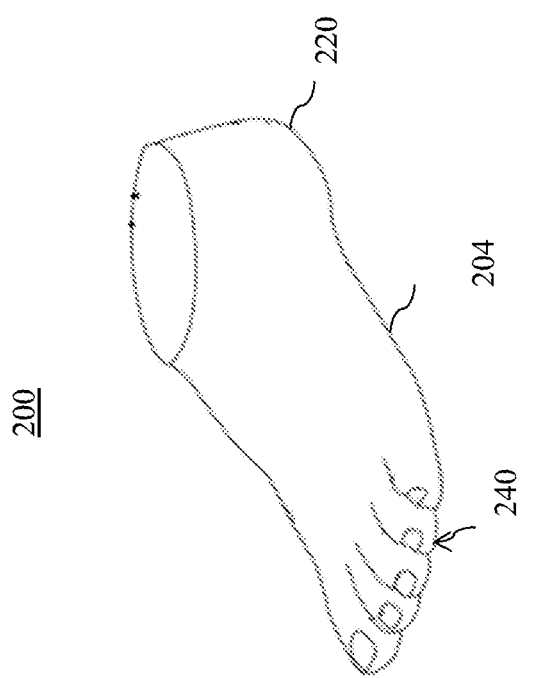
FIG. 3A is an exemplary diagram illustrating an alternative embodiment of a model foot for use with the apparatus of FIG. 1.

Turning to FIG. 3A, an exemplary model foot 200 is shown. The model foot 200 can have a shape, size, and/or dimension that at least partially simulates a shape, size, and/or dimension of a natural foot. When the model foot 200 wears the shoe 202 (shown in FIG. 1), the model foot 200 can push against at least a portion of an internal surface (not shown) of the shoe 202, such that the portion being pushed can be stretched or expanded. In one embodiment, the model foot 200 can include at least a heel 220 and/or a plurality of toes 240 that respectively simulate a heel and/or toes of the natural foot. A heel (not shown) and a toe box (not shown) of the shoe 202, when new or unstretched, are most likely to cause discomfort. Advantageously, stretching of the heel and the toe box of the shoe 202 can be ensured. FIG. 3A shows the model foot 200 as having an appearance of an entire natural foot.

The model foot 200 can be at least partially made using a method for replicating a sample foot (not shown). An exemplary sample foot can be a natural foot or any man-made surrogate object for simulating a natural foot. Additionally and/or alternatively, the sample foot can be a virtual foot, or an electronic image of a foot in two- or three-dimensions.

In one embodiment, the sample foot can be based on a natural foot of a person. Thus, the model foot 200 can be at least partially an exact replica of the natural foot, so the shoe 202 can be stretched to fit the natural foot. Stated somewhat differently, the model foot 200 can include at least one modeling portion and the modeling portion can be any portion that exactly replicates the shape of at least a part of the natural foot.

In one embodiment, the model foot 200 can include a modeling portion exactly replicating the shape of toes and/or heel of the natural foot. For example, the modeling portion can be a first foot portion 211 (shown in FIGS. 4A, 25 and 27A). Additionally and/or alternatively, the model foot 200 can include a modeling portion exactly replicating the shape of a part of the natural foot that is not the toes or heel (such as the top or dorsum of the natural foot). For example, the modeling portion can be a second foot portion 212 (shown in FIG. 4A). In another embodiment, the model foot 200 can include one modeling portion exactly replicating the shape of the entire natural foot. Advantageously, the person can experience great comfort when wearing the stretched shoe 202. However, even if a different person wears the shoe, he/she may still experience comfort because the shoe 202 has been stretched in the apparatus 100 and the stretching can be more effective than conventional stretching methods.

In selected embodiments, an exemplary method can include three-dimensional (3D) printing (or additive manufacturing), casting (for example, life casting), or a combination thereof.

In an exemplary 3D printing process, the sample foot, or an equivalent thereof, can be scanned. A 3D printer can build the model foot 200 under computer control and based on images from scanning the sample foot. The 3D printing process can include, for example, extrusion deposition binder jetting, directed energy deposition, material jetting, powder bed fusion, sheet lamination, vat photopolymerization, stereolithography, or a combination thereof.

An exemplary model foot 200 can be at least partially made of an elastic material. Exemplary elastic material can include rubber, silicone, and/or the like. Thus, the model foot 200 can fit in the shoe 202 and, when inside the shoe 202, push against an interior region and/or interior surface the shoe 202. Advantageously, the model foot 200 can simulate the mechanical characteristics of the natural foot. In one embodiment, the model foot 200 can make movements within the shoe 202, including spreading and/or compressing under pressure from the platform 140 (shown in FIG. 1), traveling within the shoe 202, or a combination thereof. Such movements, which are in conjunction with the relative movement between the model foot 200 and the platform 140 can stretch the shoe 202 effectively and simulate how the natural foot stretches the shoe 202.

In one embodiment, the model foot 200 can be made using one method, and/or made of a uniform material. In one example, the model foot 200 can be made using 3D printing. An exemplary model foot 200 can be made of rubber. In another example, the model foot 200 can be made using casting. An exemplary model foot 200 can be made of silicone.

In one embodiment, the model foot 200 can be made using life casting. An exemplary life casting process can include casting a mold 250 (shown in FIGS. 3C-3E) from the natural foot. The mold 250 can be made of any suitable molding material. An exemplary molding material can include Alja-Safe™ alginate, available from Smooth-On, Inc., located in Macungie, Pennsylvania. Additionally and/or alternatively, an exemplary molding material can include gypsum plaster or plaster of Paris. Additionally and/or alternatively, an exemplary molding material can include Body Double™ Silk mold rubber, available from Smooth-On, Inc. An exemplary mold 250 can be soft enough to be detached from the natural foot without being damaged.

A casting material can be placed into the mold 250. Exemplary casting material can include a silicone rubber. Optionally, the second foot portion 212 (shown in FIG. 27A) can be inserted into the casting material and locked in place in the mold (by any suitable tools, jigs, rigs, for example) before placing, or curing, of the casting material of the first foot portion 211 (shown in FIG. 27A). Thus, the second foot portion 212 can be fixedly embedded in the first foot portion 211 upon curing and/or solidification of the casting material. Optionally, openings (not shown) can be cut through selected locations on the mold 250 before placing, or curing, of the casting material, such that suitable mechanical structure (such as nuts, bolts, brackets, molds, etc.) can be fixed at the locations during curing of the casting material. Thus, upon curing of the casting material, the attachment point 260 (shown in FIG. 16) can be defined on the model foot 200 and attachments, such as attachment point loop 262 (shown in FIG. 17), can be connected to the model foot 200.

Figure 3B:
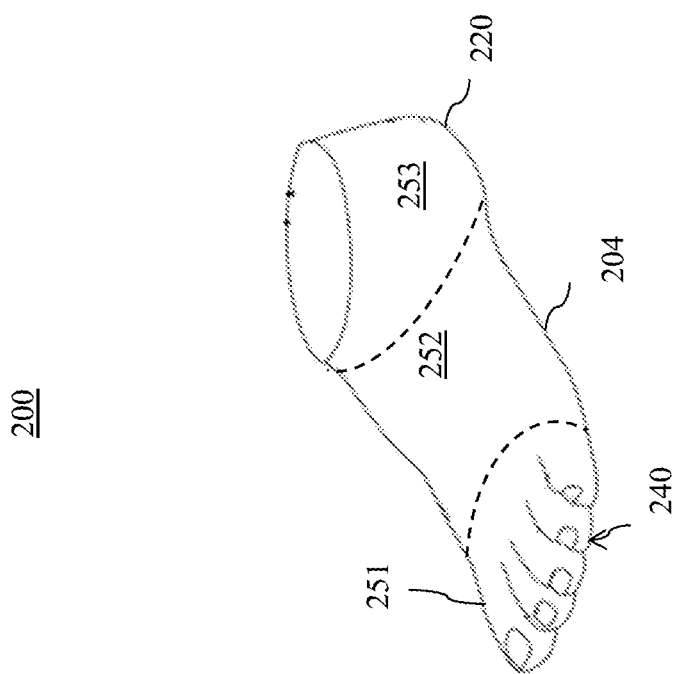
FIG. 3B is an exemplary diagram illustrating an alternative embodiment of the model foot of FIG. 3A, wherein the model foot includes three foot sub-portions.

Turning to FIG. 3B, the model foot 200 is shown as exactly replicating the shape of the entire natural foot. The model foot 200 is shown as including first, second and third sub-portions 251-253. The first and third foot sub-portions 251, 253 include the toes 240 and the heel 220, respectively. The second sub-portion 252 can include the remaining portion (or mid portion) of the model foot 200.

In one embodiment, the first and third foot sub-portions 251, 253 can be made of a first material. The second sub-portion 252 can be made of a second material. The first material can be stronger (or denser, or harder) than the second material. Thus, the toes 240 and/or the heel 220 can mimic bones of the foot and withstand rubbing against the shoe 202 (shown in FIG. 1). The second material can be softer (and/or more compliant) than the first material. Thus, the model foot 200 can be compressed to fit in the shoe 202 and can expand to rub against the shoe 202 as a natural foot does. Additionally and/or alternatively, the second sub-portion 252 can compress with pressure from the platform 140 (shown in FIG. 1). Such compression can result in a spreading motion that simulates spreading of the natural foot when the natural foot fully rests on a surface.

In one embodiment, the first material can have a Shore hardness ranging from 25A to 45A, a tensile strength ranging from 550 psi (pound-force per square inch) to 700 psi, an 100% modulus ranging from 60 psi to 120 psi, an Elongation (@) Break ranging from 300% to 750%, a Die B Tear Strength ranging from 104 pli (pounds per lineal inch) to 110 pli. The second material can have a Shore hardness ranging from 5A to 20A, a tensile strength ranging from 400 psi to 500 psi, an 100% modulus ranging from 15 psi to 50 psi, an Elongation (@) Break ranging from 800% to 1200%, a Die B Tear Strength ranging from 100 to 103 pli. For example, the first material can include a silicone, such as Sorta Clear™ 37, available from Smooth-On, Inc. The second material can include a silicone, such as Dragon Skin™ 10 Medium, available from Smooth-On, Inc.

The sub-portions 251-253 can be made using any suitable methods. In one example, the sub-portions 251-253 can be formed individually and, after the formation, be bonded together. In another example, each of the sub-portions 251-253 can be connected or bonded during the formation.

Although FIG. 3B shows the model foot 200 as including the first, second and third foot sub-portions 251-253 for illustrative purposes only, the model foot 200 can include, and/or be partitioned into, any number of uniform and/or different sub-portions, without limitation, and each of the sub-portions can be made of a suitable material and/or process to mimic property of the natural foot.

Figure 3D:
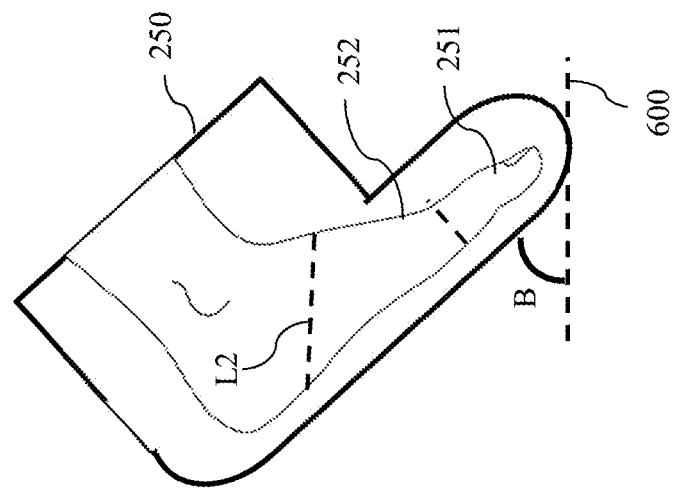
FIGS. 3C-3F are exemplary diagrams of a mold during an embodiment of a process for making the model foot of FIG. 3B.
Figure 3C:
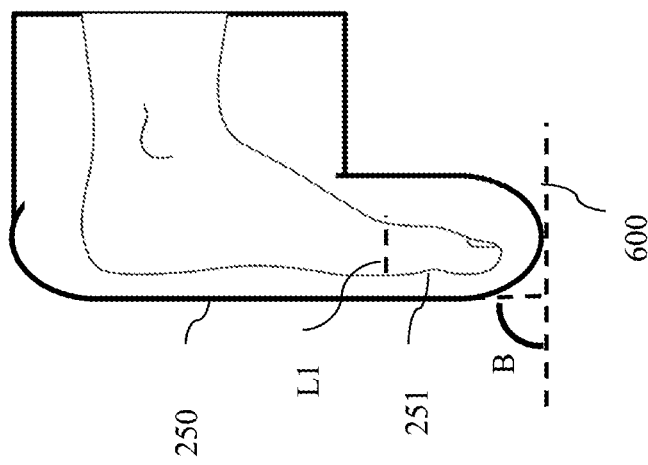
Figure 3F:
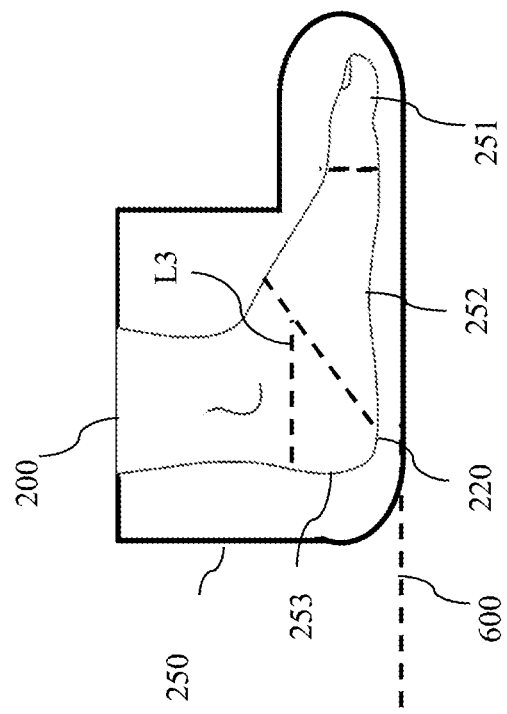
Figure 3E:
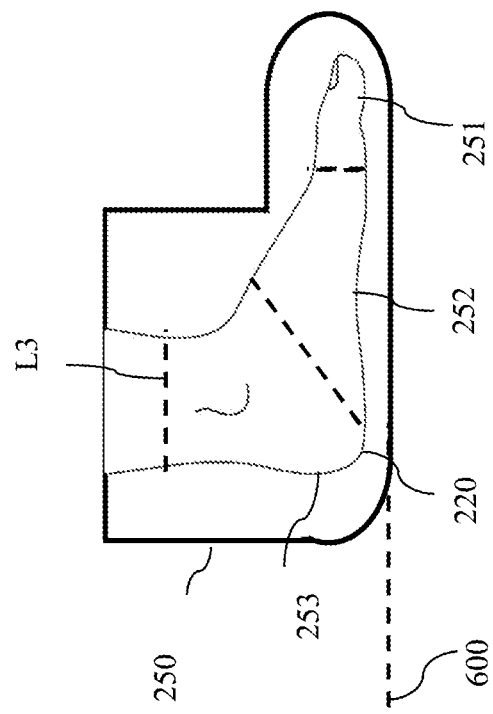

FIGS. 3C-3E show the mold 250 during an exemplary process for making the model foot 200 (shown in FIG. 3B). Turning to FIG. 3C, the mold 250 is shown as defining a bottom 254 that forms an angle B with a level surface 600. The angle B can be, for example, 90 degrees. The first material can be placed into the mold 250 to reach a first level L1 such that the first material can form the first foot sub-portion 251 that includes the toes 240 (shown in FIG. 4A).

Turning to FIG. 3D, the angle B can be smaller than the angle B shown in FIG. 3C. The second material can be placed into the mold 250 to reach a second level L2 such that the second material can form the second foot sub-portion 252 that includes a middle portion of the bottom 204 (shown in FIG. 4A) of the model foot 200. The second material can be placed into the mold 250 when the first foot sub-portion 251 is partially cured. For example, the second material can be placed into the mold 250 when the first foot sub-portion 251 has been cured for half the time needed for full curing. Advantageously, the first foot sub-portion 251 can be sufficiently solidified to remain in shape and still be able to bond with the second foot sub-portion 252.

Turning to FIG. 3E, the angle B can be smaller than the angle B shown in FIG. 3D. For example, the angle B can be 0 degrees. The first material can be placed into the mold 250 to reach a third level L3 such that the first material can form the third foot sub-portion 253 that includes the heel 220. The first material can be placed into the mold 250 when the second foot sub-portion 252 is partially cured. For example, the first material can be placed into the mold 250 when the second foot sub-portion 252 has been cured for half the time needed for full curing. Advantageously, the second foot sub-portion 252 can be sufficiently solidified to remain in shape and still be able to bond with the third foot sub-portion 253. By adjusting the angle B, the model foot 200 can advantageously be made with sub-portions of different materials in a simple manner.

Although the first and third foot sub-portions 251, 253 are set forth above as being made of the first material for illustrative purposes only, the first and third foot sub-portions 251, 253 can be made of uniform and/or different materials, without limitation. Although FIGS. 3C-3E show the first, second and third foot sub-portions 251-253 as being made sequentially for illustrative purposes only, the first, second and third foot sub-portions 251-253 can be made in any suitable sequence, without limitation.

Turning to FIG. 3F, the third level L3 is shown as being lower than the second foot sub-portion 252 when the model foot 200 stands on the ground 600. The third level L3 is thus lower than the third level L3 shown in FIG. 3E. The third level L3 can be selected within a range from a minimum height to a maximum height. At the minimum height, the third foot sub-portion 253 can be formed to include at least the heel 220. The maximum height can be equal to the height of the model foot 200. Stated somewhat differently, the third level L3 is not necessarily higher than the second foot sub-portion 252 and can be selected base on certain factors including, for example, the type of shoe 202 (shown in FIG. 1) and/or cost of manufacturing.

Figure 4A:
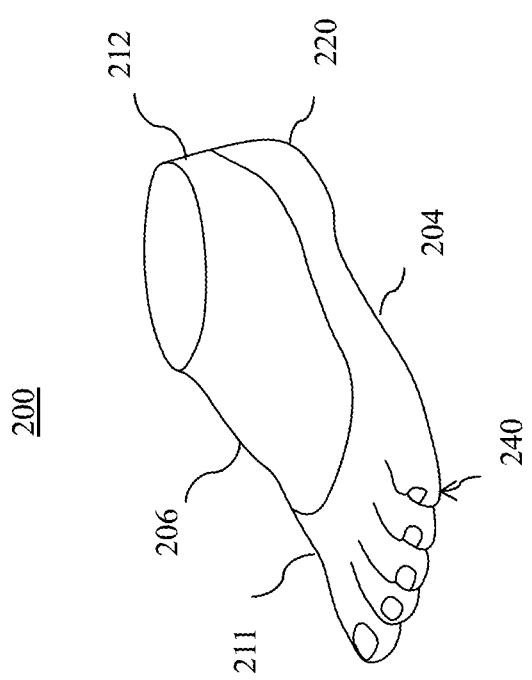
FIG. 4A is an exemplary diagram illustrating an alternative embodiment of the model foot of FIG. 3A, wherein the model foot includes first and second foot portions.

Turning to FIG. 4A, the model foot 200 is shown as including first and second foot portions 211, 212. The first and second foot portions 211, 212 can be made using uniform and/or different methods. Additionally and/or alternatively, the first and second foot portions 211, 212 can be made using uniform and/or different materials. When the first and second foot portions 211, 212 are made of different materials, the first and second foot portions 211, 212 can have different properties and/or manufacturing cost. Advantageously, the model foot 200 can be further customized to fit a great variety of needs of stretching the shoe 202 (shown in FIG. 1).

FIG. 4A shows the first foot portion 211 as including the toes 240, the heel 220 and a bottom 204 of the model foot 200 that is between the toes 240 and the heel 220. The second foot portion 212 is shown as including a top (or dorsum) 206 adjacent to an ankle (not shown). Stated somewhat differently, the first foot portion 211 can be distal from the ankle and the second foot portion 212 can be proximal to the ankle.

In one embodiment, the first foot portion 211 can be made of rubber using 3D printing. The second foot portion 212 can be made of any suitable material (for example, plastic or wood) and have a generic or un-customized shape that can be used in combination with a variety of first foot portions 211. The 3D printed first foot portion 211 can be attached to the second foot portion 212. Advantageously, the rubber can allow the model foot 200 to be flexible enough to fit into the shoe 202. The cost of 3D printing can be reduced while customized stretching by the heel 220 and the toes 240 can still be achieved.

In another embodiment, the first and second foot portions 211, 212 can be made to have a customized shape by, for example, using casting and/or 3D printing. In one example, the first foot portion 211 can be made of a first silicone. The second foot portion 212 can be made of a second silicone. The first silicone can be stronger than the second silicone. Thus, the toes 240 and/or the heel 220 can withstand rubbing against the shoe 202. The second silicone can be softer than the first silicone. Thus, the model foot 200 can be compressed to fit in the shoe 202 and can expand to rub against the shoe 202 as a natural foot does. In another example, the first foot portion 211 can be softer than the second foot portion 212.

Figure 4B:
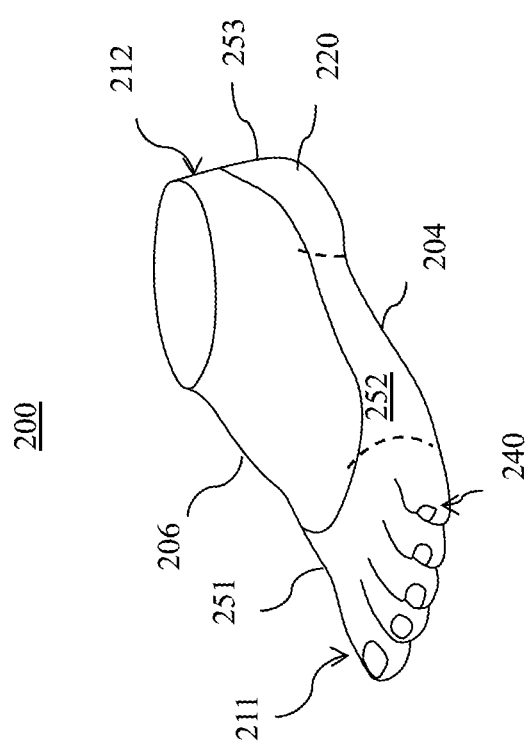
FIG. 4B is an exemplary diagram illustrating an alternative embodiment of the model foot of FIG. 4A, wherein the first foot portion includes three foot sub-portions.

Turning to FIG. 4B, the first foot portion 211 is shown as including the first, second and third sub-portions 251-253. The first and third foot sub-portions 251, 253 include the toes 240 and the heel 220, respectively. The second sub-portion 252 can include the remaining portion of the first foot portion 211.

In one embodiment, similar to the model foot 200 as set forth in FIG. 3B, the second sub-portion 252 can be softer (and/or more compliant) than the first and third foot sub-portions 251, 253. Thus, the toes 240 and/or the heel 220 can mimic bones of the foot and withstand rubbing against the shoe 202 (shown in FIG. 1). The second sub-portion 252 can spread under pressure from the platform 140 (shown in FIG. 1) to simulate spreading of the natural foot when the natural foot fully rests on a surface.

Figure 5:
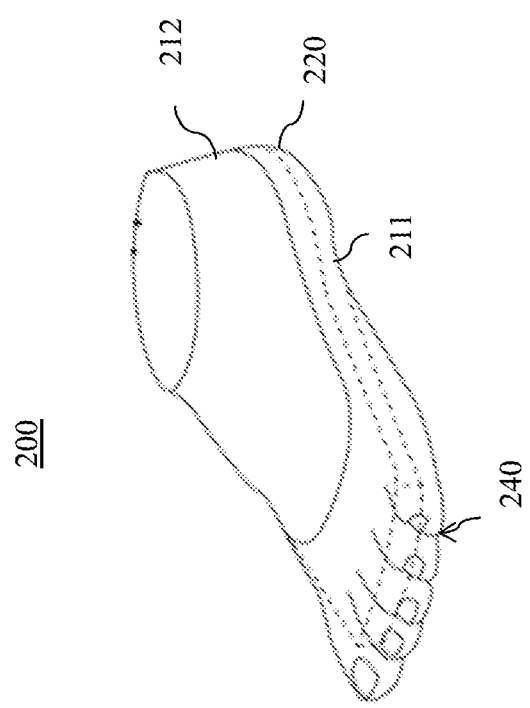
FIG. 5 is an exemplary detail drawing illustrating another alternative embodiment of the model foot of FIG. 4A.

Turning to FIG. 5, a detail drawing of a selected alternative embodiment of the model foot 200 of FIG. 4 is shown. The first foot portion 211 is shown as wrapping the second foot portion 212 (shown in dashes). Stated somewhat differently, the first foot portion 211 can be a shell and the second foot portion 212 can be a core or filler wrapped in the shell. A thickness of the first foot portion 211 can be selected to adjust property and/or manufacturing cost of the model foot 200. Stated somewhat differently, the second foot portion 212 can be at least partially disposed in the first foot portion 211.

Figure 6:
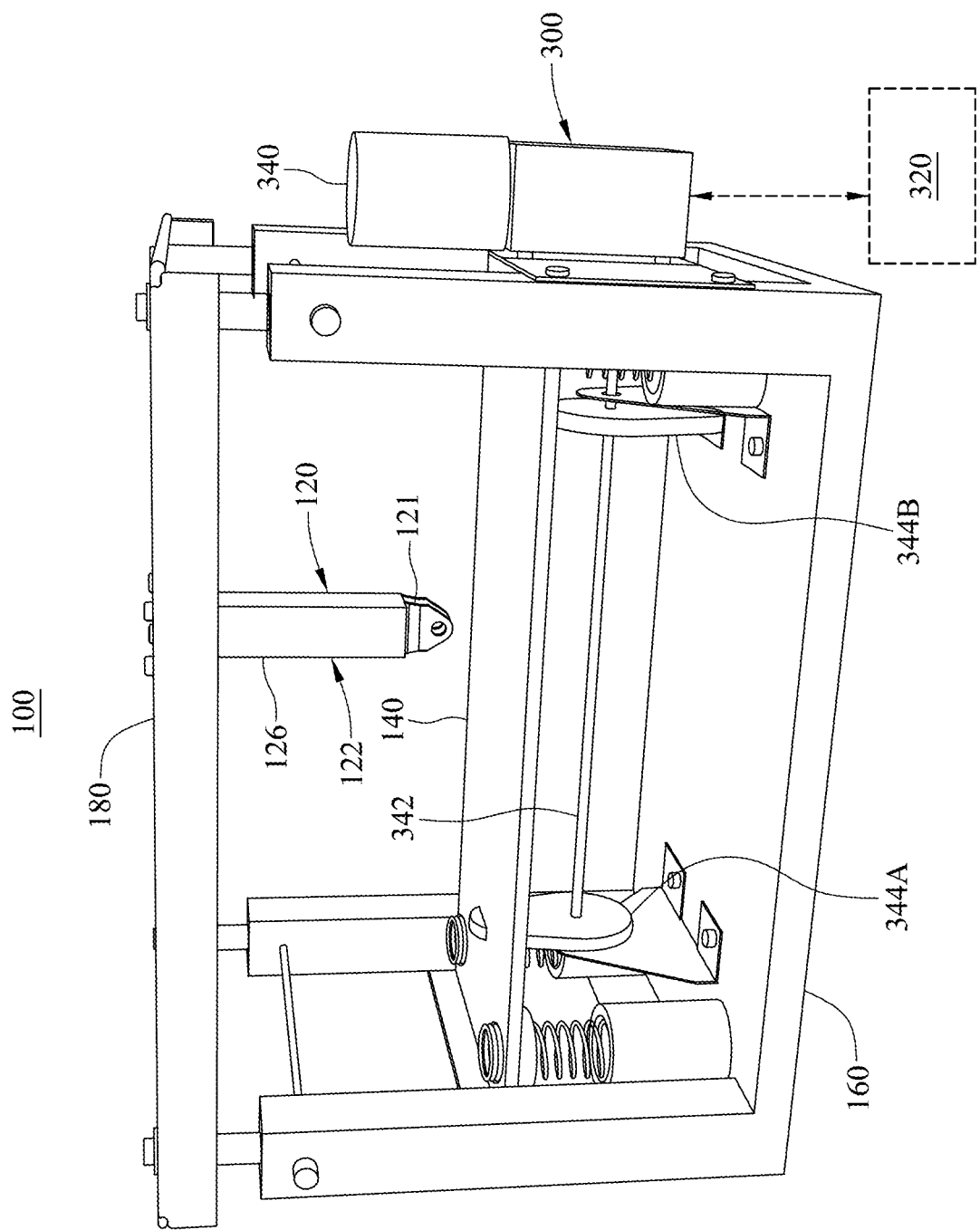
FIG. 6 is an exemplary detail drawing illustrating an alternative embodiment of the apparatus of FIG. 1, wherein the apparatus includes a rocker spindle.

Turning to FIG. 6, another exemplary embodiment of the apparatus 100 is shown. The coupling structure 120 is shown as including at least one arm 122. The arm 122 can have a first end region 121 proximal to the platform 140 and configured to connect to the model foot 200 (shown in FIG. 1). The arm 122 can have a second end region 126 distal from the platform 140 and connected to a top assembly 180. The apparatus 100 is shown as including a support frame 160. The support frame 160 and the top assembly 180 can collectively provide a framework for at least partially containing the platform control system 300, the coupling structure 120 and/or the platform 140.

The platform control system 300 is shown as including a motor 340 driving a rocker spindle 342 separated from the model foot 200 by the platform 140. The platform control system 300 further includes at least two rotary members 344A, 344B each coupled to two opposite end regions of the shaft 342. Each of the rotary members 344A, 344B is shown as having an egg shape, or an oval shape with one axis of symmetry. Stated somewhat differently, each of the rotary members 344A, 344B can have a maximum radius opposite to a minimum radius, optionally with a smooth transition therebetween. In other words, each of the rotary members 344A, 344B has a wide half and a narrow half located opposite to the wide half.

The rotary members 344A, 344B are shown as being oriented with a selected phase difference. Stated somewhat differently, when the wide half of the rotary member 344A is in contact with the platform 140, the wide half of the rotary member 344B is not in contact with the platform 140. Thus, when the motor 340 drives the rocker spindle 342 to rotate, the rotary members 344A, 344B can alternately raise the platform 140 such that the platform 140 can tilt in an alternate manner. In one embodiment, the phase difference can be, for example, 180 degrees. Stated somewhat differently, when the wide and narrow halves of the rotary member 344A are respectively proximal to and distal from the platform 140, the narrow and wide halves of the rotary member 344B are respectively proximal to and distal from the platform 140. Optionally, the platform control system 300 can include a controller 320 for providing instruction to the motor 340.

Figure 7:
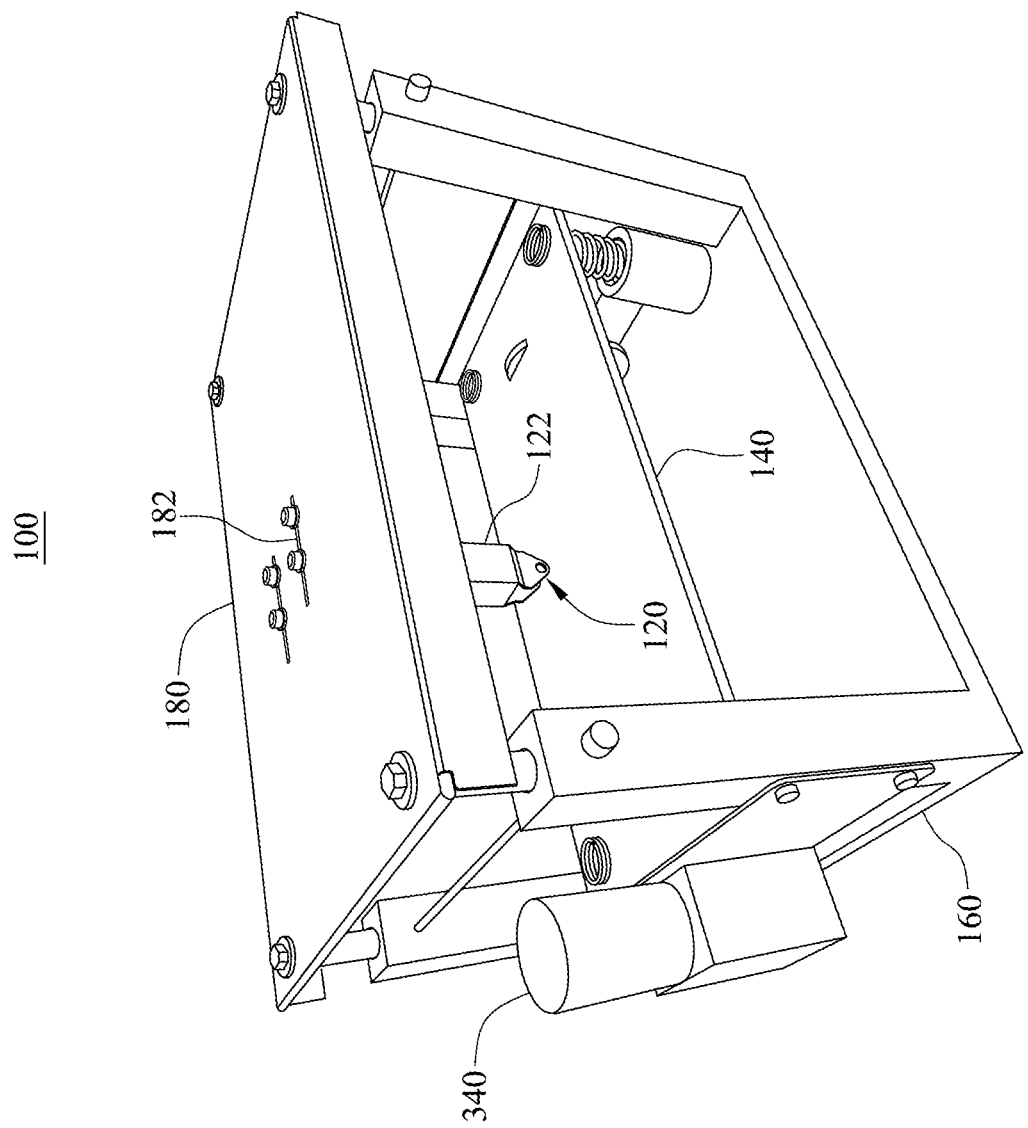
FIG. 7 is an exemplary detail drawing illustrating an alternative embodiment of the apparatus of FIG. 6, wherein the apparatus includes a top assembly defining a coupling structure slot.

Turning to FIG. 7, the top assembly 180 is shown as defining at least one coupling structure slot 182. The coupling structure 120 can be connected at a selected location on the top assembly 180 via the assembly slot 182. For example, the arm 122 can be connected to the top assembly 180 in any suitable manner including, for example, via a fastener, such as a bolt. Additionally and/or alternatively, the arm 122 and the top assembly 180 can be joined via a mechanical connection such as cooperating detents including any combination of mating elements, such as blocks, tabs, pockets, slots, ramps, locking pins, cantilevered members, support pins, and the like, that may be selectively or automatically engaged and/or disengaged to couple or decouple the arm 122 and the top assembly 180.

In one embodiment, the arm 122 can be fixedly coupled to the top assembly 180. In another embodiment, a connection between the arm 122 and the top assembly 180 can be at least partially spring-loaded. When pressure is applied to the arm 122 by the platform 140, the spring (not shown) of the connection can absorb some of the pressure. The arm 122 can have small or negligible movement relative to the platform 140. Advantageously, damage to the arm 122, the top assembly 180, and/or the connections thereof, can be prevented.

In one embodiment, the arm 122 can be fixedly coupled to the model foot 200 (shown in FIG. 1). In another embodiment, a connection between the arm 122 and the model foot 200 can be spring-loaded. When pressure is applied to the model foot 200 by the platform 140, the spring at the connection can absorb at least some of the pressure. The arm 122 and the model foot 200 can have small or negligible movement relative to a movement of the platform 140. Damage to the arm 122, the model foot 200, and/or the connections thereof, can be prevented.

Figure 8:
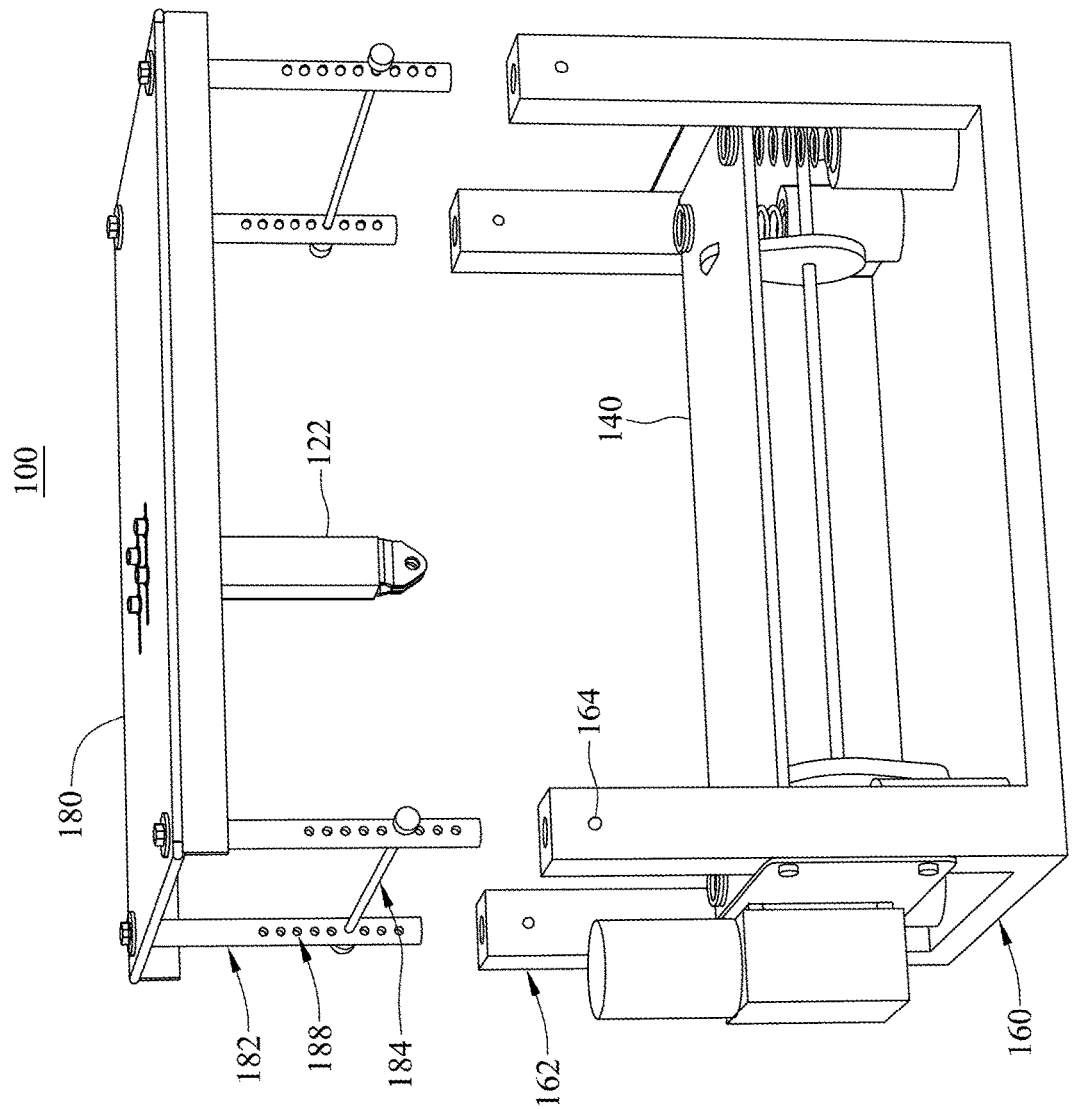
FIG. 8 is an exemplary detail drawing illustrating another alternative embodiment of the apparatus of FIG. 6, wherein the apparatus includes a top assembly that is adjustable.

Turning to FIG. 8, the top assembly 180 is shown as including a rectangular plate having four corner regions each connected with a top assembly support member 182. The top assembly support member 182 is shown as being elongated and defining a column of position selection holes 188. A position selector 184 is shown as being an elongated pin that can pass through two selected position selection holes 188 of two adjacent top assembly support members 182.

The support frame 160 is shown as including four support frame receiving members 162. Each support frame receiving member 162 is shown as being elongated and defining a positioning slot 164. The position selector 184 can be positioned to pass through the two position selection holes 188 of the two adjacent top assembly support members 182. At the same time, the position selector 184 can be positioned in the positioning slots 164 of two adjacent support frame receiving member 162. By selecting the position selection hole 188 to accommodate the position selector 184, a distance between the top assembly 180 and the platform 140 can be selected. Advantageously, even if the arm 122 or the platform control system 300 remain unchanged, the apparatus 100 can have greater flexibility in adapting to a great variety of shoes 202 (shown in FIG. 1) and adjusting a pressure of the platform 140 on the model foot 200.

Turning to FIG. 9A, the apparatus 100 is shown as being in a resting state. The rotary members 344A, 344B are shown as being oriented to be detached from the platform 140. In the resting state, the platform 140 platform 140 can apply pressure, or apply no pressure, to both the heel 220 and the toes 240.

Turning to FIG. 9B, the apparatus 100 is shown as being in a heel-press state. The rotary member 344A is shown as pressing up the platform 140. The platform 140 can thus press on the heel 220. Stated somewhat differently, the wide half of the rotary member 344A can be in contact with, and press up, the platform 140. The heel-press state can simulate a motion of a heel presses on the ground when a natural foot starts a step.

Although FIG. 9B shows the toes 240 as being in contact with the platform 140 for illustrative purposes only, the toes 240 does not necessarily contact or press on the platform 140.

Turning to FIG. 9C, the apparatus 100 is shown as being in a toe-press state. The rotary member 344B is shown as pressing up the platform 140. The platform 140 can thus press on the toes 240. Stated somewhat differently, the wide half of the rotary member 344B can be in contact with, and press up, the platform 140. The toe-press state can simulate a motion of the toes presses on the ground when a natural foot completes a step.

The apparatus 100 can repeat a cycle that sequentially includes the heel-press state, the resting state and the toe-press state to simulate a step. Advantageously, when the model foot 200 wears the shoe 202 (shown in FIG. 1), the model foot 200 can stretch the shoe 202 in a manner similar to the natural foot walking in the shoe 202, so the shoe 202 can be stretched more accurately.

Although FIG. 9C shows the heel 220 as being in contact with the platform 140 for illustrative purposes only, the heel 220 does not necessarily contact or press on the platform 140.

Additionally and/or alternatively, the motor 340 can introduce a vibration motion when the rotary member 344A and/or the rotary member 344B presses on the platform 140. The vibration can make the model foot 200 move within the shoe 202 and stretch the shoe 202. For example, the motor 340 can include a vacuum motor (not shown). A rotor (not shown) of the motor 340 can be connected with the shaft 342 via a hose clamp. The vacuum motor can place the shaft 342 off balance and achieve vibration.

Turning to FIG. 10A, another exemplary apparatus 100 is shown. The coupling structure 120 is shown as including a predetermined number of arms 122. The platform control system 300 is shown as including at least two actuators 360A, 360B each being configured to alternately raise two opposite end regions of the platform 140. Stated somewhat differently, the actuator 360A can be configured to raise and/or lower an end region of the platform 140 proximal to the heel 220. The actuator 360B can be configured to raise and/or lower an end region of the platform 140 proximal to the toes 240.

The actuators 360A, 360B can each include suitable motors for respectively moving pressure components 366A, 366B under a control signal including, for example, electric current, hydraulic fluid pressure, or pneumatic pressure. The actuators 360A, 360B can respectively drive the pressure components 366A, 366B via worm gears, for example. Exemplary actuators 360A, 360B can include electric motor, pneumatic motors, and/or hydraulic motors.

The platform control system 300 is shown as including a controller 320 configured to generate programming instruction that can control speed, frequency, and/or intensity of movement generated by the actuators 360A, 360B. The controller 320 can include a computer that is programmed to instruct the actuators 360A, 360B. The platform control system 300 is shown as including an optional interface unit 322 configured to convert electrical power of standard computer interface output (for example, such as the Universal Serial Bus, Ethernet or RS-232) to power required by the actuators 360A, 360B. The interface unit 322 can provide power and pulses of the actuators 360A, 360B. Software running on the controller 320 can trigger the interface unit 322. The interface unit 322 can send signals, such as pulses, to the actuators 360A, 360B.

The actuators 360A, 360B can be instructed to move the pressure components 366A, 366B with a selected phase difference. Stated somewhat differently, when the pressure component 366A raises the platform 140, the pressure component 366B does not raise the platform 140. When the pressure component 366B raises the platform 140, the pressure component 366A does not raise the platform 140. Thus, the pressure components 366A, 366B can alternately raise the platform 140 such that the platform 140 can tilt in an alternate manner. In one embodiment, the phase difference can be, for example, 180 degrees. Stated somewhat differently, when the pressure component 366A raises the platform 140, the pressure component 366B lowers the platform 140. When the pressure component 366B raises the platform 140, the pressure component 366A lowers the platform 140.

The apparatus 100 is shown as including a stabilizing member 364 configured to support and/or stabilizing the platform 140. The stabilizing member 364 is shown as including a structure fixed to the support frame 160 that is connected to the platform 140. The stabilizing member 364 can be rotatably connected to a center region of the platform 140. Advantageously, when the platform 140 is only supported by the stabilizing member 364, the platform 140 can be parallel to the ground.

The apparatus 100 is shown as including optional sensors 362A, 362B respectively configured to sense a height of the pressure components 366A, 366B. For example, when a height of the pressure components 366A reaches a selected value, the sensors 362A can communicate with the controller 320, so the controller 320 can instruct the actuator 360A to stop raising or lowering the pressure components 366A. Exemplary sensors 362A, 362B can include gear tooth sensors.

Although FIG. 10A shows the apparatus 100 as including two actuators 360A, 360B and two pressure components 366A, 366B for illustrative purposes only, the apparatus 100 can include any predetermined number of uniform and/or different actuators 360 and any preselected number of uniform and/or different pressure components 366, without limitation.

In one embodiment, the pressure components 366A, 366B can be located along a center line of the model foot 200. Stated somewhat differently, the model foot 200 can, similar to a natural foot, be in a neutral position on the platform 140. In the neutral position, the model foot 200 does not roll to a left or a right side of the model foot 200. Additionally and/or alternatively, the pressure components 366A, 366B can be shifted to a right and/or left of the center line such that the model foot 200, during operation of the apparatus 100, can roll to the right and/or the left side. Advantageously, the model foot 200 can simulate pronation and/or supination of a natural foot and the stretching of the shoe 202 (shown in FIG. 1) can be further customized. In one embodiment, additional actuators 360 and/or pressure components 366 can be used for increased flexibility of simulating more complex gait (or push and roll) of a natural foot. For example, two pressure components 366 can be respectively located on the left and right sides of the model foot 200.

Turning to FIG. 10B, the apparatus 100 is shown as including a toe flexing device 146 disposed between the toes 240 and the platform 140. The toe flexing device 146 is shown as having a wedge shape and can force the toes 240 to flex distally from the platform 140 to a great extent.

In one embodiment, in a toe-press state (shown in FIG. 12C, for example), the toes 240 may flex by a limited amount on a planar-shaped platform 140. By inserting the toe flexing device 146 beneath the toes 240, the toes 240 can be forced to bend more in the shoe 202 (shown in FIG. 1). The toe-pressing state can thus better simulate actual walking motion and result in effective stretching of the shoe 202.

Although FIG. 10B shows the toe flexing device 146 is used on the platform 140 that is controlled by the actuators 360 for illustrative purposes only, the toe flexing device 146 can be implemented on the platform 140 controlled in any other manners (for example, as shown in FIG. 1), without limitation.

Figure 11:
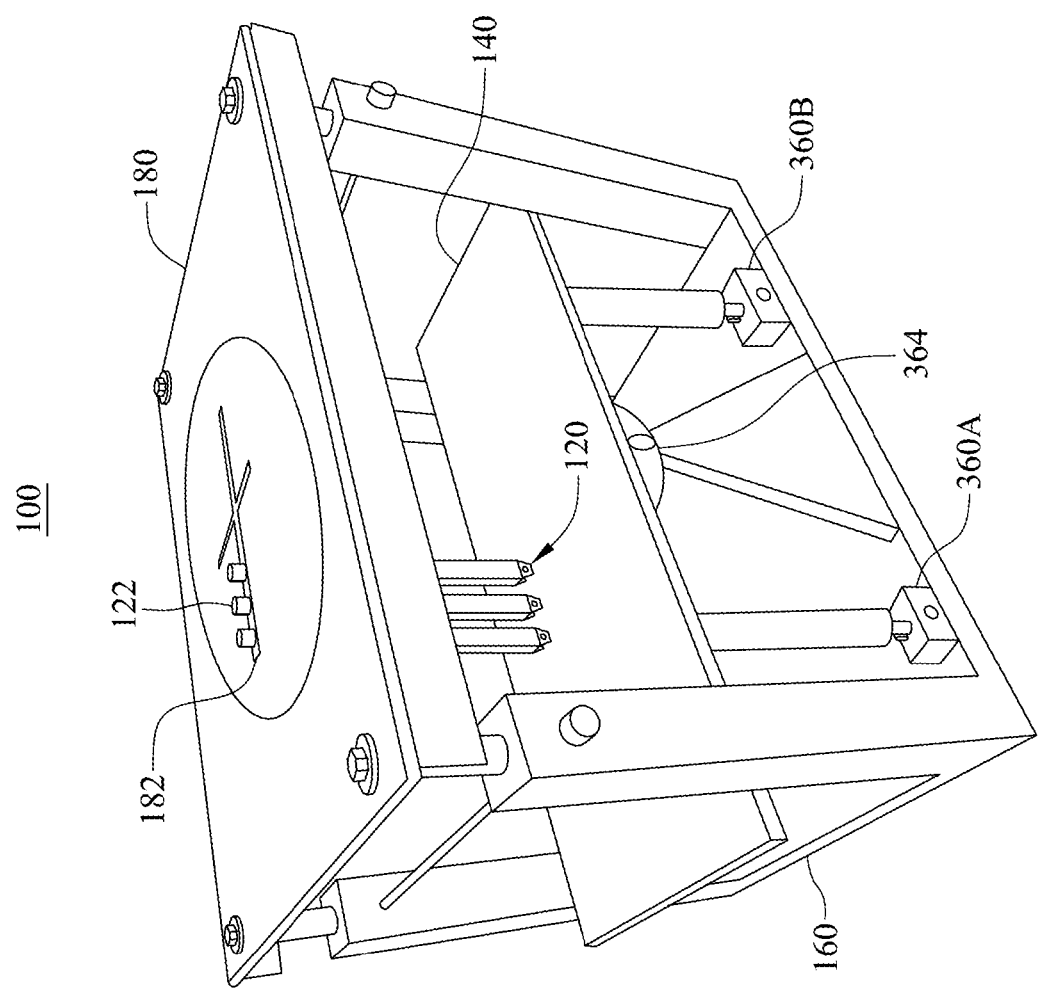
FIG. 11 is an exemplary detail drawing illustrating an alternative embodiment of the apparatus of FIG. 10A, wherein the apparatus includes a top assembly defining a coupling structure slot.

Turning to FIG. 11, the top assembly 180 is shown as defining at least one coupling structure slot 182. Each arm 122 can be connected at a selected location on the top assembly 180 via the assembly slot 182. For example, the arm 122 can be connected to the top assembly 180 and/or the connected to the model foot 200 in a manner similar to the manner as described herein with reference to FIG. 7.

FIG. 11 shows the arms 122 as being parallel and arranged in a straight line in the coupling structure slot 182 for illustrative purposes only, the arms 122 can be arranged in any locations relative to each other. Although the coupling structure slot 182 is shown as having a shape of a cross for illustrative purposes only, the coupling structure slot 182 can have any shape, without limitation.

Turning to FIG. 12A, the apparatus 100 is shown as being in a resting state. The pressure components 366A, 366B can evenly support the platform 140. In the resting state, the platform 140 can apply pressure to both the heel 220 and the toes 240.

Turning to FIG. 12B, the apparatus 100 is shown as being in a heel-press state. The pressure component 366A is shown as pressing up the platform 140. The platform 140 can thus press on the heel 220 of the model foot 200. The heel-press state can simulate a motion of a heel first presses on the ground when a natural foot starts a step.

Although FIG. 12B shows the toes 240 as being in contact with the platform 140 for illustrative purposes only, the toes 240 does not necessarily contact, or press on, the platform 140.

Turning to FIG. 12C, the apparatus 100 is shown as being in a toe-press state. The pressure component 366B is shown as pressing up the platform 140. The platform 140 can thus press on the toes 240. The toe-press state can simulate a motion of the toes pressing on the ground when the natural foot completes a step.

The apparatus 100 can repeat a cycle that sequentially includes the heel-press state, the resting state and the toe-press state to simulate a step. Advantageously, when the model foot 200 wears the shoe 202 (shown in FIG. 1), the model foot 200 can stretch the shoe 202 in a manner similar to the natural foot walking in the shoe 202, so the shoe 202 can be stretched more accurately.

Although FIG. 12C shows the heel 220 as being in contact with the platform 140 for illustrative purposes only, the heel 220 does not necessarily contact, or press on, the platform 140.

Additionally and/or alternatively, the actuator 360A and/or the actuator 360B can be configured to generate a vibrating motion such that the pressure component 366A and/or the pressure component 366B vibrates the platform 140. The vibration can make the model foot 200 move within the shoe 202 and stretch the shoe 202. For example, the motor 340 can include a vibration motor (not shown) to generate micro-motions in the platform 140.

Figure 13:
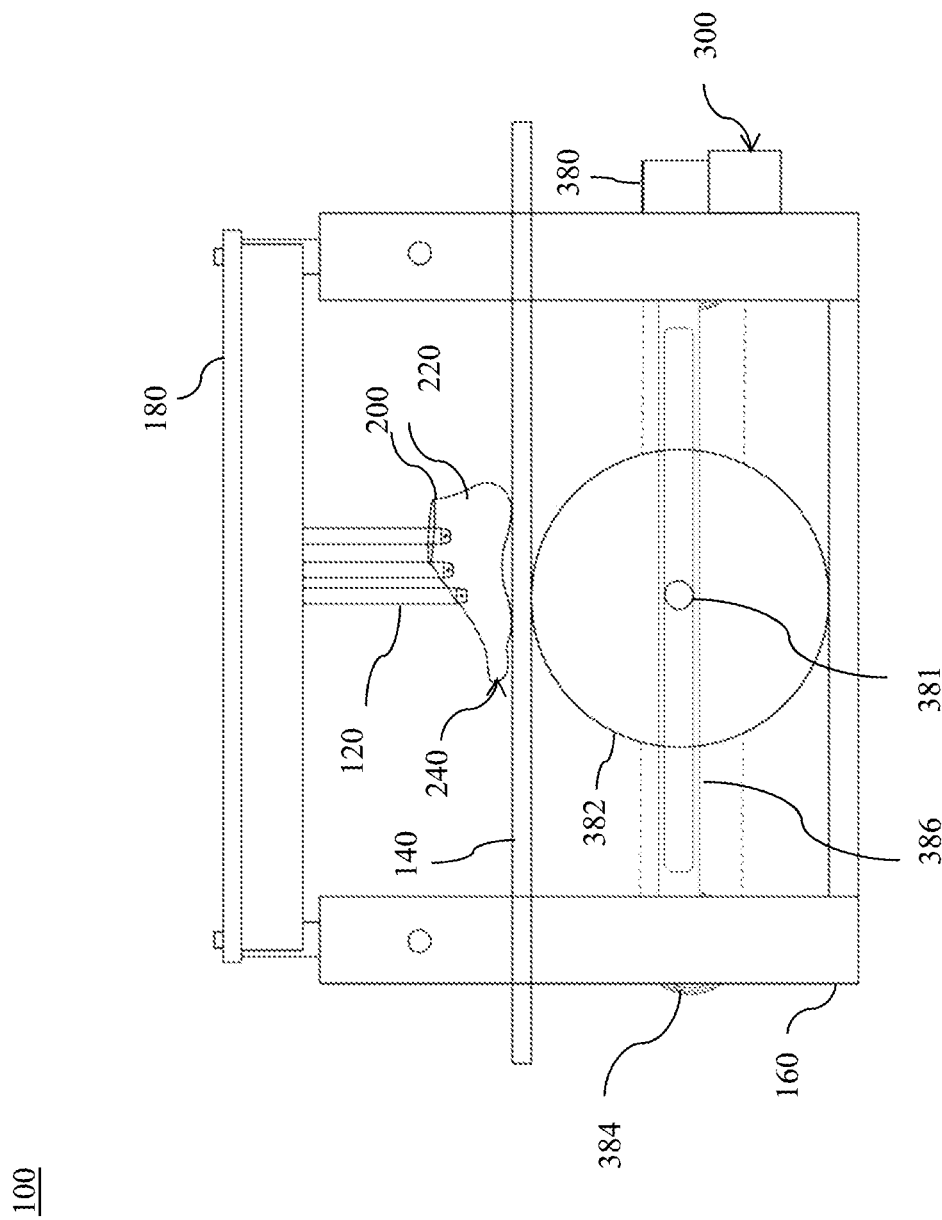
FIG. 13 is an exemplary detail drawing illustrating yet another alternative embodiment of the apparatus of FIG. 1, wherein the apparatus includes a roller.

Turning to FIG. 13, an exemplary apparatus 100 is shown. The coupling structure 120 is shown as including three arms 122. The platform control system 300 is shown as including a roller 382 separated from the model foot 200 by the platform 140. The roller 382 is shown as having a circular cross section when viewed at the side of the model foot 200. Exemplary roller 382 can be cylindrical, spherical, or the like. The roller 382 is shown as including a roller shaft 381 defining a central axis of the circular cross section of the roller 382. The apparatus 100 is shown as including a roller rail 386 that accommodates the roller shaft 381. Thus, when the roller 382 rotate about the roller shaft 381, the roller 382 can roll on the platform 140 between the heel 220 and the toes 240 repeatedly along a track defined by the roller rail 386. The roller 382 can thus press the platform 140 alternately on the heel 220 and the toes 240.

The platform control system 300 is shown as including a motor 380 and at least one roller translator 384 each being driven by the motor 380 and configured to rotate the roller 382. The roller translator 384 can include any device and/or structure that can make a movement under control of the motor 380 and convert the movement into rotation and/or translation motions of the roller 382. Exemplary roller translator 384 can include a gear, worm gear, sprocket, chain, or a combination thereof. Optionally, the platform control system 300 can include the controller 320 (shown in FIG. 10A) and/or the interface unit 322 (shown in FIG. 10A) for providing instruction to the motor 380.

Figure 14:
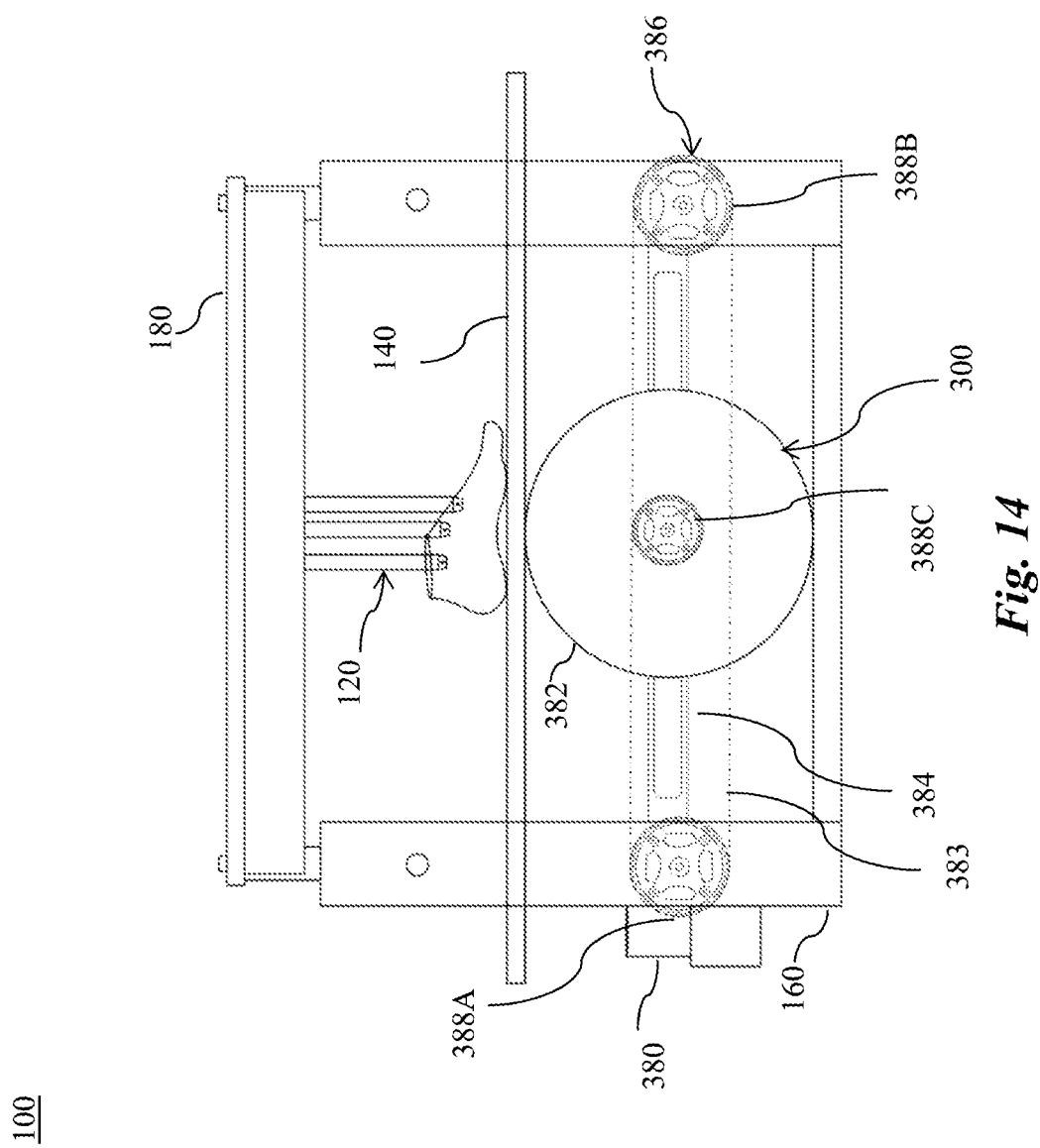
FIG. 14 is an exemplary detail drawing illustrating an alternative embodiment of the apparatus of FIG. 13, wherein the apparatus includes a chain for driving the roller.

Turning to FIG. 14, a detail drawing of an exemplary roller translator 384 is shown. The roller translator 384 is shown as including sprockets 388A-388C each meshing with, and enclosed by, a chain (or track, belt) 383. The sprocket 388C can be fixedly connected to the roller 382 at a center of the circular cross section of the roller 382. When the motor 380 drives the sprocket 388A to rotate, the sprocket 388A can drive the chain 383 to move. The chain 383 can thus drive the sprockets 388B, 388C. Accordingly, the sprocket 388C can drive the roller 382 to rotate and translate along the roller rail 384. When the motor 380 reverses a driving direction, the chain 383 can move in an opposite direction and the roller 382 can reverse direction of rolling.

Turning to FIG. 15A, the apparatus 100 is shown as being in a resting state. The roller 382 is shown as being at a middle of the platform 140. In the resting state, the platform 140 can apply pressure to both the heel 220 and the toes 240.

FIG. 15A shows the apparatus 100 as including the stabilizing member 364 for limiting a moving range of the roller 382. The stabilizing member 364 can include one or more structures slidingly coupled to the support frame 160 and configured to block the roller 382 from moving out of the support frame 160. The stabilizing member 364 is shown as triangular plates surrounding the roller 382 for illustrative purposes.

Turning to FIG. 15B, the apparatus 100 is shown as being in a heel-press state. The roller 382 is shown as rolling to be proximal to the heel 220 and pressing up the platform 140 against the heel 220. The heel-press state can simulate a motion of a heel first presses on the ground when a natural foot starts a step.

Although FIG. 15B shows the toes 240 as being in contact with the platform 140 for illustrative purposes only, the toes 240 does not necessarily contact or press on the platform 140.

Turning to FIG. 15C, the apparatus 100 is shown as being in a toe-press state. The roller 382 is shown as rolling to be proximal to the toes 240 of the model foot 200 and pressing up the platform 140 against the toes 240. The toe-press state can simulate a motion of the toes presses on the ground when a natural foot completes a step.

The apparatus 100 can repeat a cycle that sequentially includes the heel-press state, the resting state and the toe-press state to simulate a step. Advantageously, when the model foot 200 wears the shoe 202 (shown in FIG. 1), the model foot 200 can stretch the shoe 202 in a manner similar to the natural foot walking in the shoe 202, so the shoe 202 can be stretched more accurately.

Although FIG. 15C shows the heel 220 as being in contact with the platform 140 for illustrative purposes only, the heel 220 does not necessarily contact or press on the platform 140.

Additionally and/or alternatively, the motor 380 can introduce a vibration motion when the roller 382 presses on the platform 140. For example, the motor 380 can reverse direction at a selected frequency, so the roller 382 can roll back and forth within a small distance and at the frequency. The vibration can make the model foot 200 move within the shoe 202 and stretch the shoe 202. For example, the motor 380 can include the vacuum motor (not shown). The rotor (not shown) of the vacuum motor can be connected with the roller shaft 381 (shown in FIG. 13) via the hose clamp, and/or in any suitable manner coupled with one or more of the sprockets 388A-388C. The vacuum motor can place the roller shaft 381, and/or the sprockets 388A-388C, off balance and achieve vibration.

Figure 16:
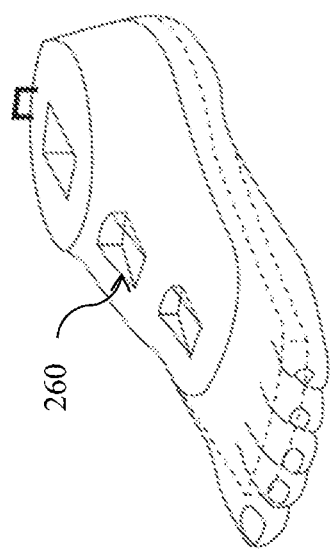
FIG. 16 is an exemplary diagram illustrating another alternative embodiment of the model foot of FIG. 3A, wherein the model foot includes at least one attachment point.

Turning to FIG. 16, the model foot 200 is shown as including a predetermined number of attachment points 260. Each attachment point 260 can include a location, and any structure attached thereon, on the model foot 200 for connecting the model foot 200 to the coupling structure 120 (shown in FIG. 1) or the arm 122 (shown in FIG. 6). Each attachment point 260 is shown as defining a concaved slot on the model foot 200 and any optional device (not shown) located in the slot. As shown in FIG. 16, the slot can be made by cutting dent into the model foot 200. Advantageously, the slot can accommodate the device while does not increase a size of the model foot 200.

In one embodiment, each attachment point 260 can be connected to one arm 122. Exemplary attachment point 260 can be connected to the arm 122 via fastening, bolting, cooperating detents, or a combination thereof.

Although FIG. 16 shows three attachment points 260 arranged in a row for illustrative purposes only, the model foot 200 can include one attachment point 260 or any number of uniform and/or different attachment points 260, without limitation. The attachment point(s) 260 can be located on any suitable position(s) on the model foot 200 and arranged in any manner, without limitation. The attachment points 260 be uniform and/or different in shape, size and/or dimension.

Figure 17:
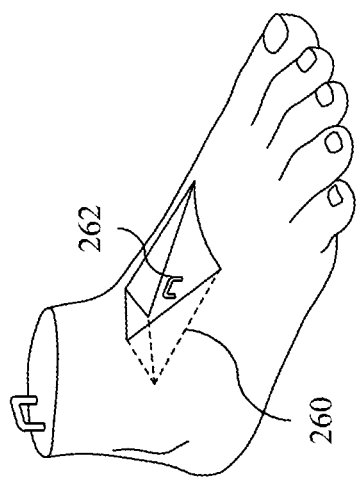
FIG. 17 is an exemplary diagram illustrating an alternative embodiment of the model foot of FIG. 16, wherein the attachment point includes an attachment point loop.

Turning to FIG. 17, the attachment point 260 is shown as including an attachment point loop 262. The attachment point loop 262 can be used as an anchor point for the coupling structure 120 (shown in FIG. 1) or the arm 122 (shown in FIG. 6). For example, the arm 122 can include a hook (not shown) at the end region of the arm 122 for engaging the attachment point loop 262.

Figure 18A:
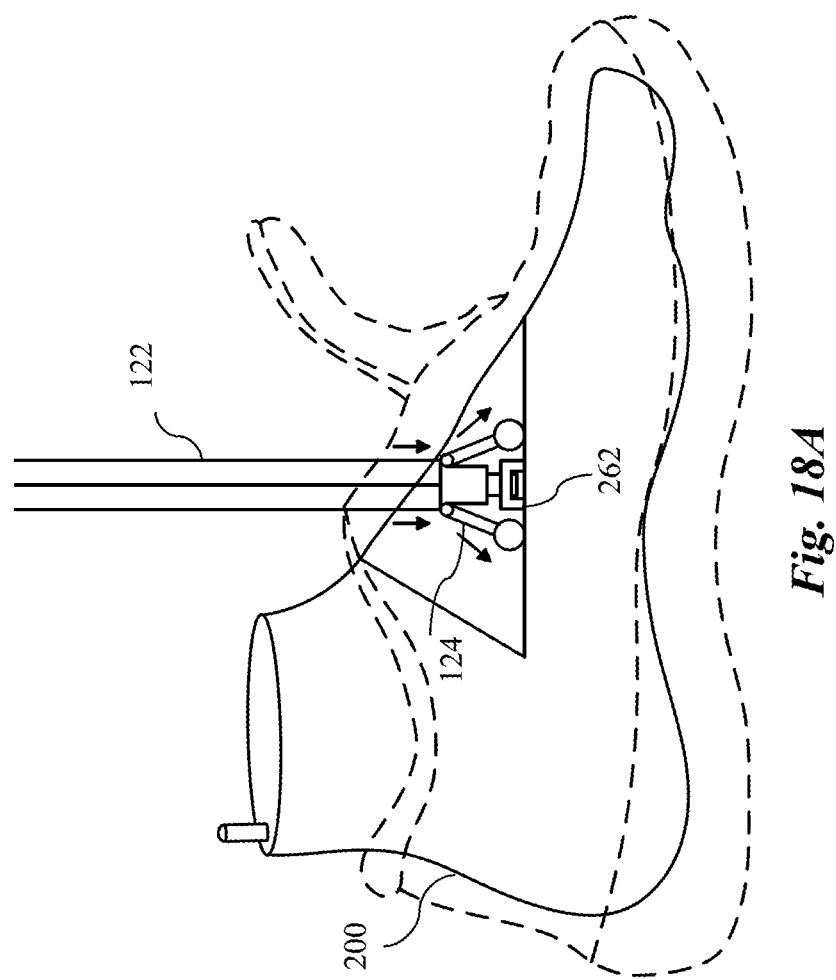
FIGS. 18A-18B are exemplary diagrams illustrating other alternative embodiments of the model foot of FIG. 16, wherein the attachment point includes expansion members before and after expansion, respectively.

Turning to FIG. 18A, the arm 122 can include two expansion members 124 at the end region of the arm 122. The expansion members 124 can be spring loaded. When the arm 122 is not pressed against the model foot 200, the expansion members 124 can be located close to each other, or in a closed configuration.

Figure 18B:
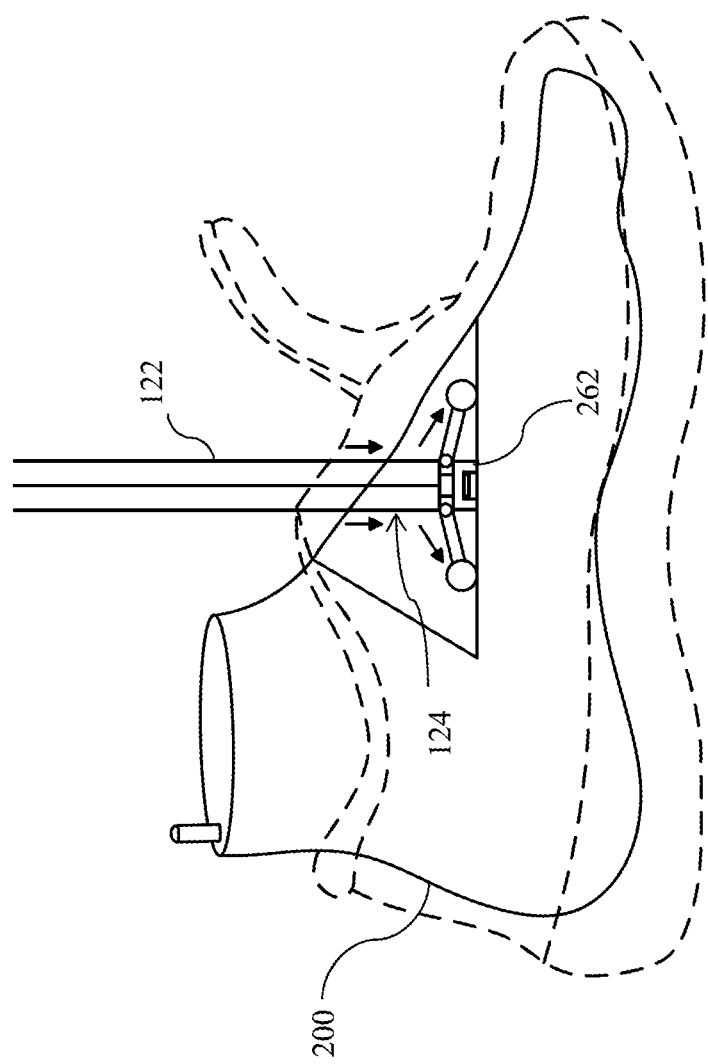

Turning to FIG. 18B, the expansion members 124 are shown as being in a spreading configuration, similar to a pair of bird wings, when pressed against the model foot 200. Advantageously, the spread expansion members 124 can apply force to a broader area of the model foot 200, improve balance of the model foot 200, and prevent damage of the model foot 200.

Although FIGS. 18A and 18B show two expansion members 124 as being oppositely arranged for illustrative purposes only, the arm 122 can include any number of uniform and/or different expansion members 124, without limitation. The expansion members 124 can be arranged in any selected manner, without limitation.

Figure 19:
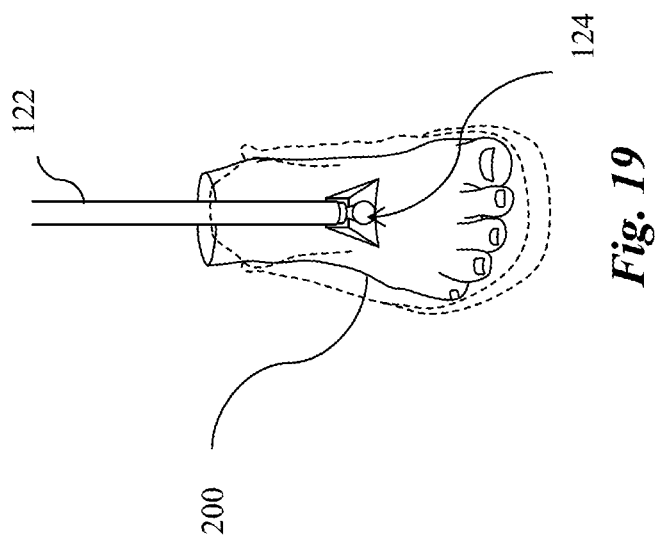
FIG. 19 is an exemplary diagram illustrating another alternative embodiment of the model foot of FIGS. 18A-18B, wherein the attachment point includes a pressure component.

Turning to FIG. 19, the model foot 200 is shown as being viewed from the arm 122. The expansion member 124 is shown as having an end region having a spherical shape. The end region can be configured to roll during spreading of the expansion member 124. Advantageously, damage of the model foot 200 can be prevented.

Figure 20:
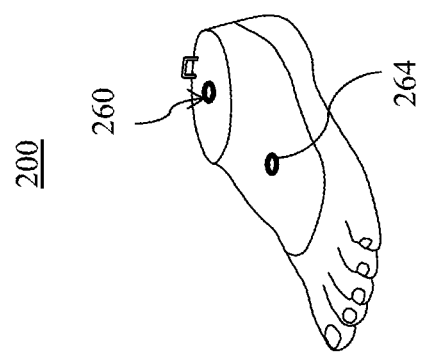
FIG. 20 is an exemplary diagram illustrating another alternative embodiment of the model foot of FIG. 16, wherein the attachment point defines a fastening point.

Turning to FIG. 20, the model foot 200 is shown as including two attachment points 260. The attachment point 260 is shown as defining a fastening point 264 on the model foot 200. The fastening point 264 can be made by cutting grooves into the model foot 200. The arm 122 can be connected to the model foot 200 via fastening by bolting, screwing, or the like. Advantageously, the attachment point 260 does not increase a size of the model foot 200.

Figure 21:
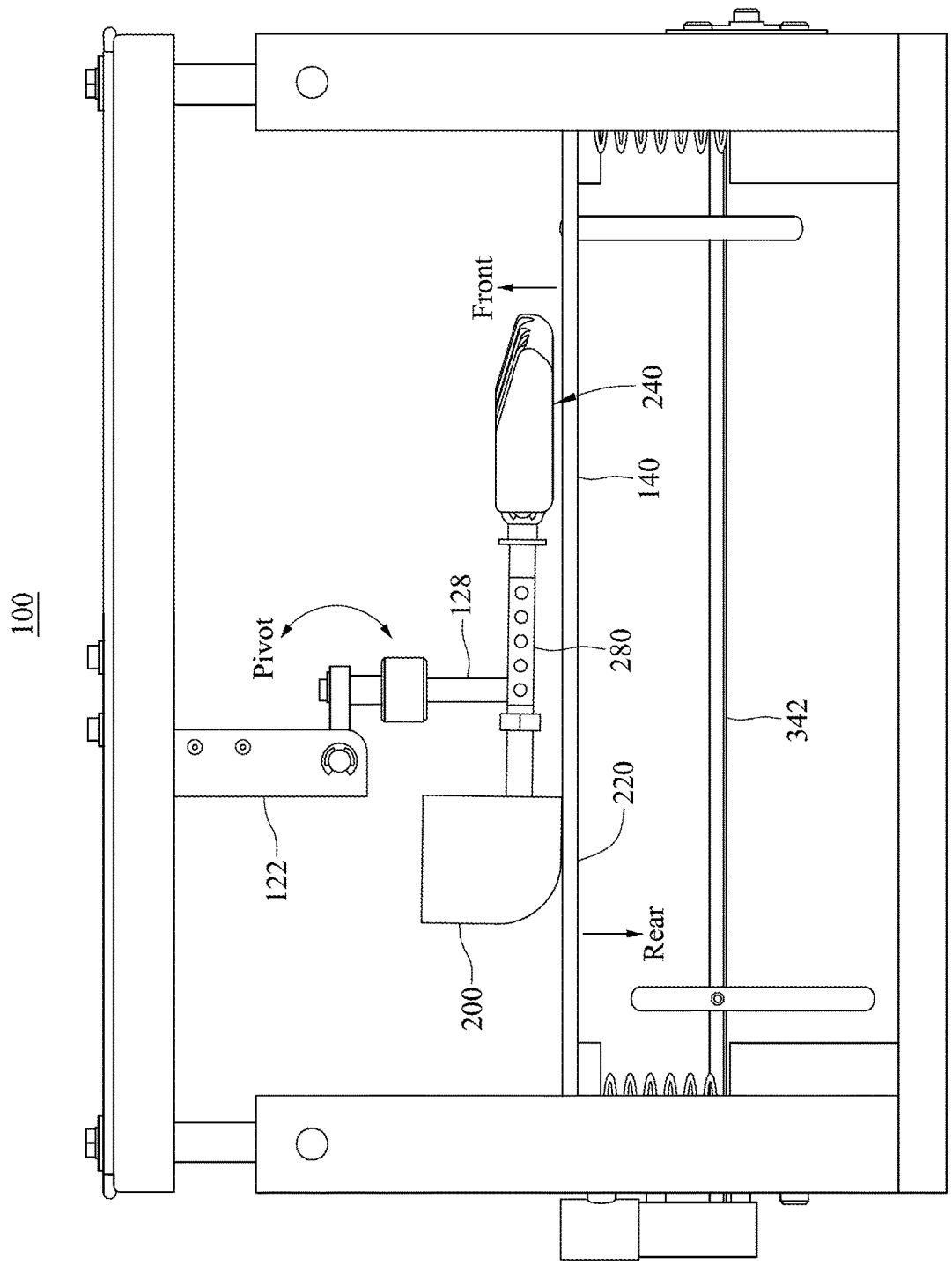
FIG. 21 is an exemplary detail drawing illustrating another alternative embodiment of the apparatus of FIG. 6, wherein the apparatus includes a pivot member.

Turning to FIG. 21, the model foot 200 is shown as including a foot core 280 connecting the heel 220 and the toes 240. The arm 122 and the foot core 280 are shown to be connected via a pivot member 128. The pivot member 128 can be fixedly connected to the foot core 280 and pivotably connected to the arm 122.

The pivot member 128 can pivot about the end region of the arm 122. An angle (not shown) between the foot core 280 and the platform 140 can thus be adjusted. Stated somewhat differently, the foot core 280 can be in a non-parallel position relative to the platform 140 in the resting state (shown in FIG. 9A). Advantageously, the model foot 200 can wear the shoe 202 (shown in FIG. 1) with a high heel and the pivot member 128 can raise the heel 220 to fit in the shoe 202. Further, when the rocker spindle 342 rotates, the shoe 202 with the high heed does not constrain movement of platform 140.

Turning to FIG. 22A, the apparatus 100 viewed from the toes 240 to the heel 220. Springs 346A, 346B can be respectively positioned under right and left sides of the model foot 200 for applying pressure to the model foot 200 via the platform 140.

FIG. 22B shows that the model foot 200 is in a neutral position. The model foot 200 is shown as including a big toe 241 and a pinky toe 245. In the neutral position, the model foot 200 does not roll inward (proximally to the big toe 214 and distally from the pinky toe 245). Stated somewhat differently, the model foot 200 does not pronate. Further, in the neutral position, the model foot 200 does not roll outward (distally from the big toe 214 and proximally to the pinky toe 245). Stated somewhat differently, the model foot 200 does not supinate.

FIG. 22C shows that the model foot 200 as rolling outward or as supinating. In one embodiment, in the apparatus 100 (shown in FIG. 22A), a pressure applied to the platform 140 (shown in FIG. 22A) by the spring 346A (shown in FIG. 22A) can be greater than the pressure applied to the platform 140 by the spring 346B (shown in FIG. 22A). The apparatus 100 can thus simulate supination. Additionally and/or alternatively, the springs 346A, 346B can apply equal pressure on the platform 140 while the model foot 200 can be aligned so as to tilt outward to simulate supination.

FIG. 22D shows that the model foot 200 as rolling inward or as having pronation. In one embodiment, in the apparatus 100 (shown in FIG. 22A) a pressure applied to the platform 140 (shown in FIG. 22A) by the spring 346A (shown in FIG. 22A) can be weaker than the pressure applied to the platform 140 by the spring 346B (shown in FIG. 22A). The apparatus 100 can thus simulate pronation. Additionally and/or alternatively, the springs 346A, 346B can apply equal pressure on the platform 140 while the model foot 200 can be aligned so as to tilt inward to simulate pronation.

Figure 23:
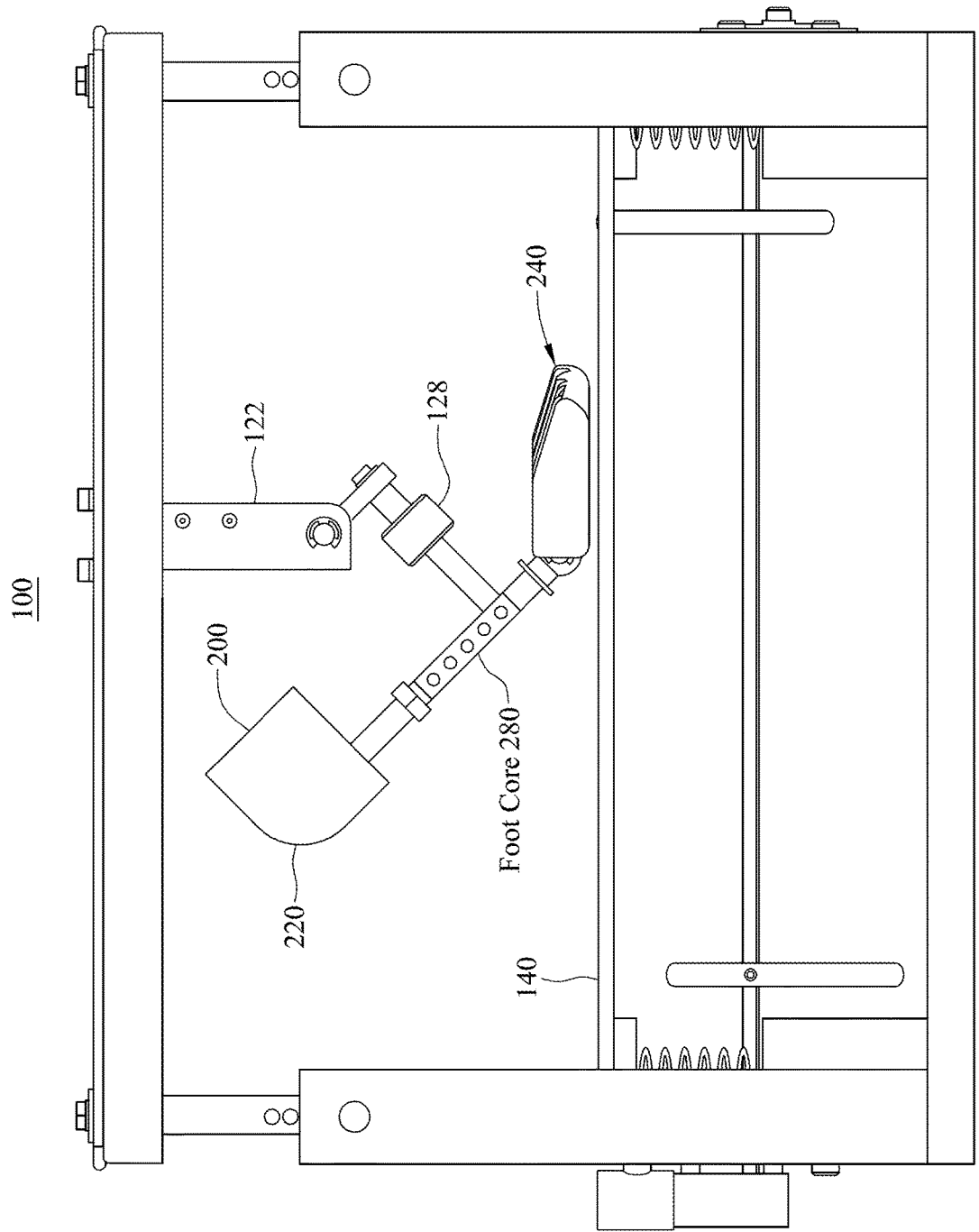
FIG. 23 is an exemplary detail drawing illustrating another alternative embodiment of the apparatus of FIG. 21, wherein the pivot member is shown as being pivoted.

Turning to FIG. 23, the pivot member 128 is shown as pivoting about the end region of the arm 122. The foot core 280 is shown as being moved to be non-parallel to the platform 140 and non-parallel to the toes 240. Thus, the model foot 200 can lift the heel 220 away from the platform 140 and simulate posture of the natural foot when wearing the shoe 202 (shown in FIG. 1) that has a high heel.

Figure 24:
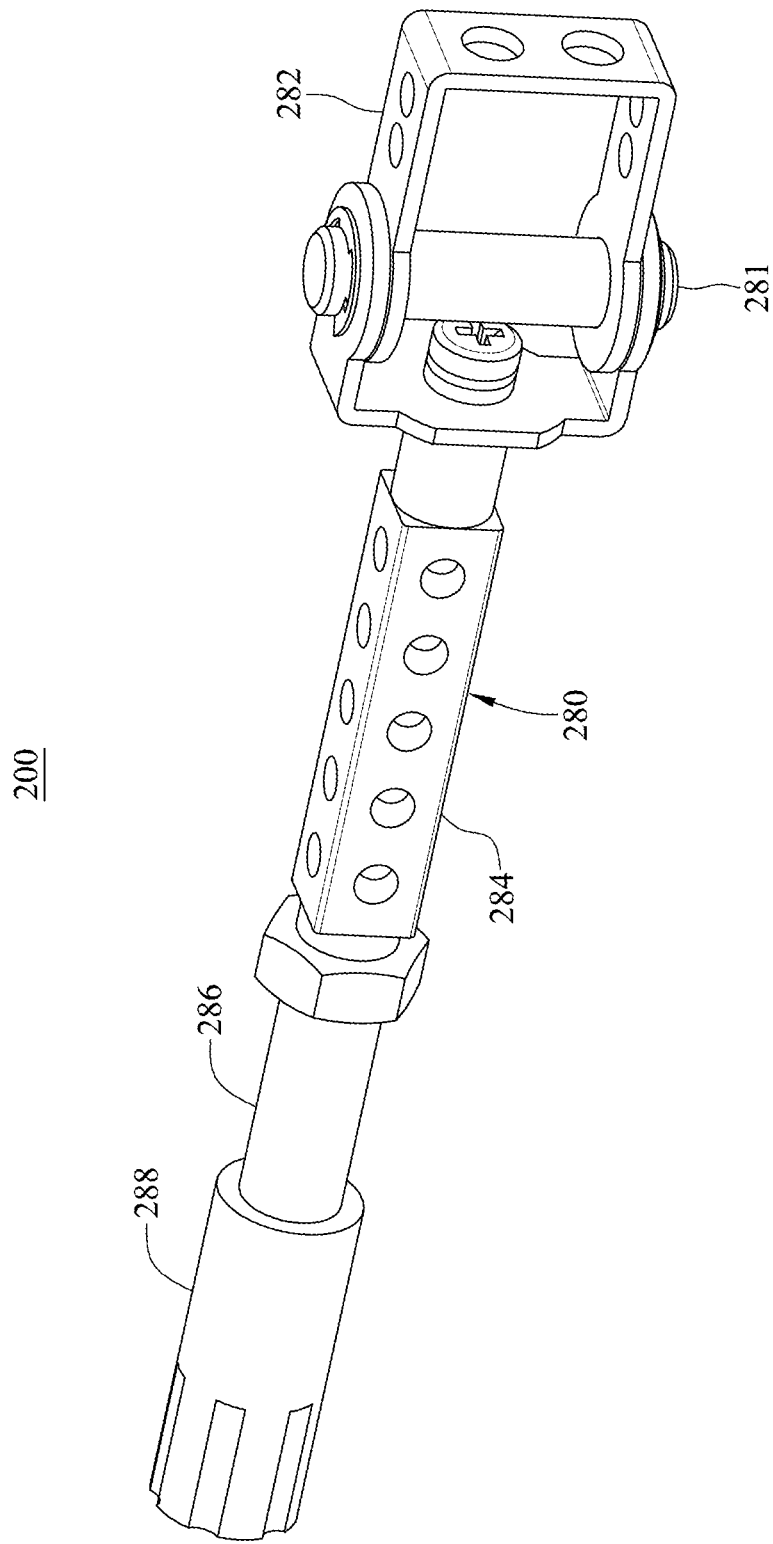
FIG. 24 is an exemplary detail drawing illustrating another alternative embodiment of the model foot of FIG. 21, wherein a foot core of the model foot is shown.

Turning to FIG. 24, a detail drawing of an exemplary model foot 200 is shown. The model foot 200 is shown as including a toe connector 282 fixedly coupled to the toes 240 (shown in FIG. 21). The foot core 280 is shown as including a first core connector 284 coupled to the toe connector 282, a second core connector 284 coupled to the first core connector 284, and a heel connector 288 coupled to the second core connector 284. The heel 220 (shown in FIG. 21) can be fixedly coupled with the heel connector 288.

The foot core 280 is shown as including a toe pivot joint 281 rotatably coupled to the first core connector 284 and the toe connector 282. The foot core 280 can pivot about the toe pivot joint 281, so the model foot 200 can bend at the toe pivot joint 281 and simulate the natural foot when wearing the shoe 202 (shown in FIG. 1) with high heel.

Exemplary first core connector 284 can define holes, such as #10-32 threaded holes. The holes can be used to attach the model foot 200 to the pivot member 128 (shown in FIG. 21).

Exemplary second core connector 286 can have an adjustable length for adapting to shoes 202 (shown in FIG. 1) of different sizes (or lengths). For example, the second core connector 286 can have threads such as #7/16-20 threads/inch, and a 1 plus 5/8 inch adjustment range.

Exemplary heel connector 288 can optionally be configured to adjust the length of the model foot 200. For example, the heel connector 288 can have threads such as #7/16-20 threads/inch. In one embodiment, the heel connector 288 can make fine length adjustment and the second core connector 286 can make coarse length adjustment.

Figure 25:
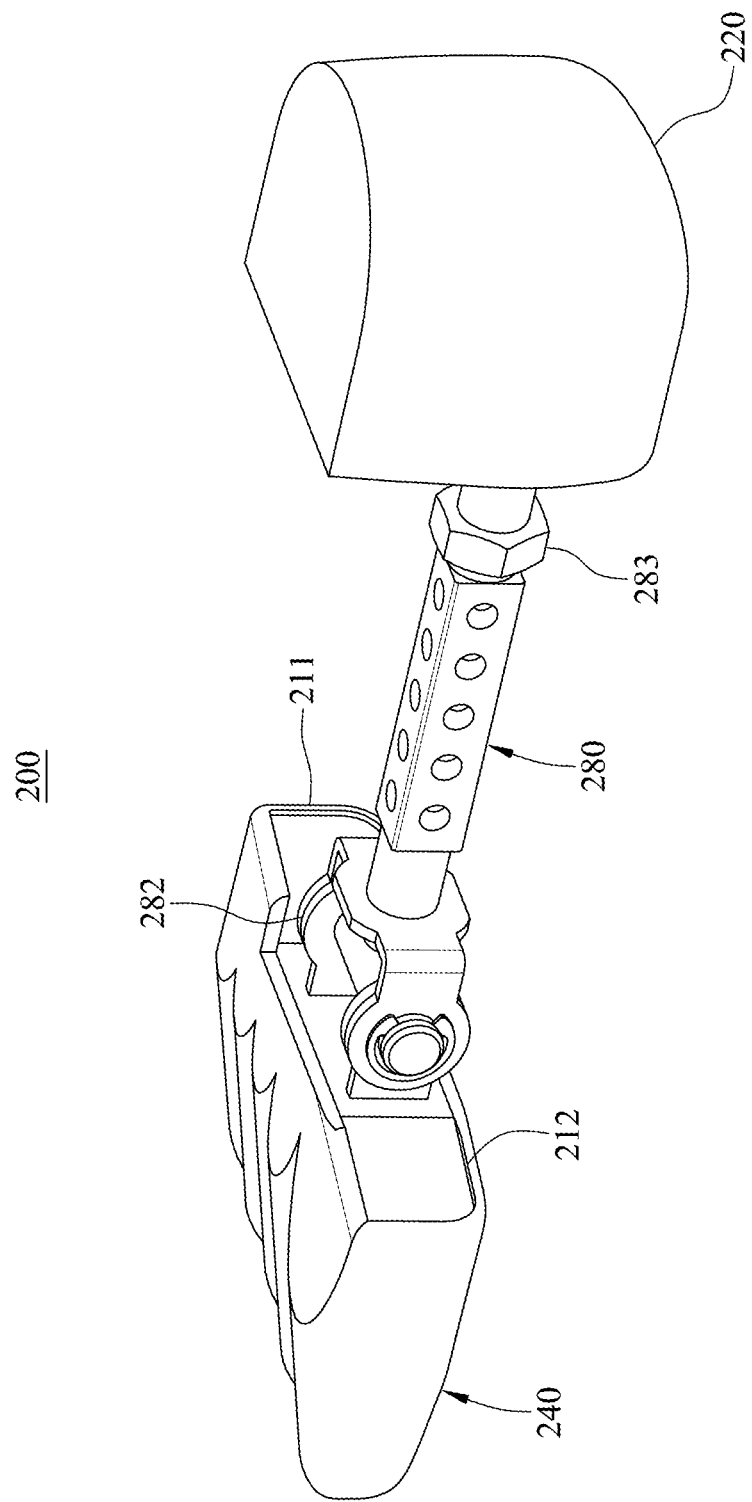
FIG. 25 is an exemplary detail drawing illustrating another alternative embodiment of the model foot of FIG. 22A, wherein the toes of the model foot is made of two materials.

Turning to FIG. 25, a detail drawing of an exemplary model foot 200 is shown. The toes 240 are shown as including the second foot portion 212 and the first foot portion 211 that covers the second foot portion 212 as a shell. The first foot portion 211 can be made using 3D printing. The second foot portion 212 can be made of potting compound and can fill within the first foot portion 211. Advantageously, the cost of 3D printing can be reduced while customized stretching by the toes 240 can still be achieved.

In one embodiment, the toe connector 282 and the toes 240 can be aligned, manually and/or by using a fixture. Advantageously, the toes 240 and the foot core 280 can be appropriately aligned relative to the arm 122 (shown in FIG. 21) and the platform 140 (shown in FIG. 21).

The model foot 200 is shown as including a nut 283 that can be configured to turn to push and/or pull the heel 220 forward and/or backward when the heel 220 is in the shoe 202 (shown in FIG. 1). The nut 283 can optionally be threaded. Being able to retract the heel 220 toward the toe 240, the model foot 200 can be more easily placed inside the shoe 202.

Figure 26:
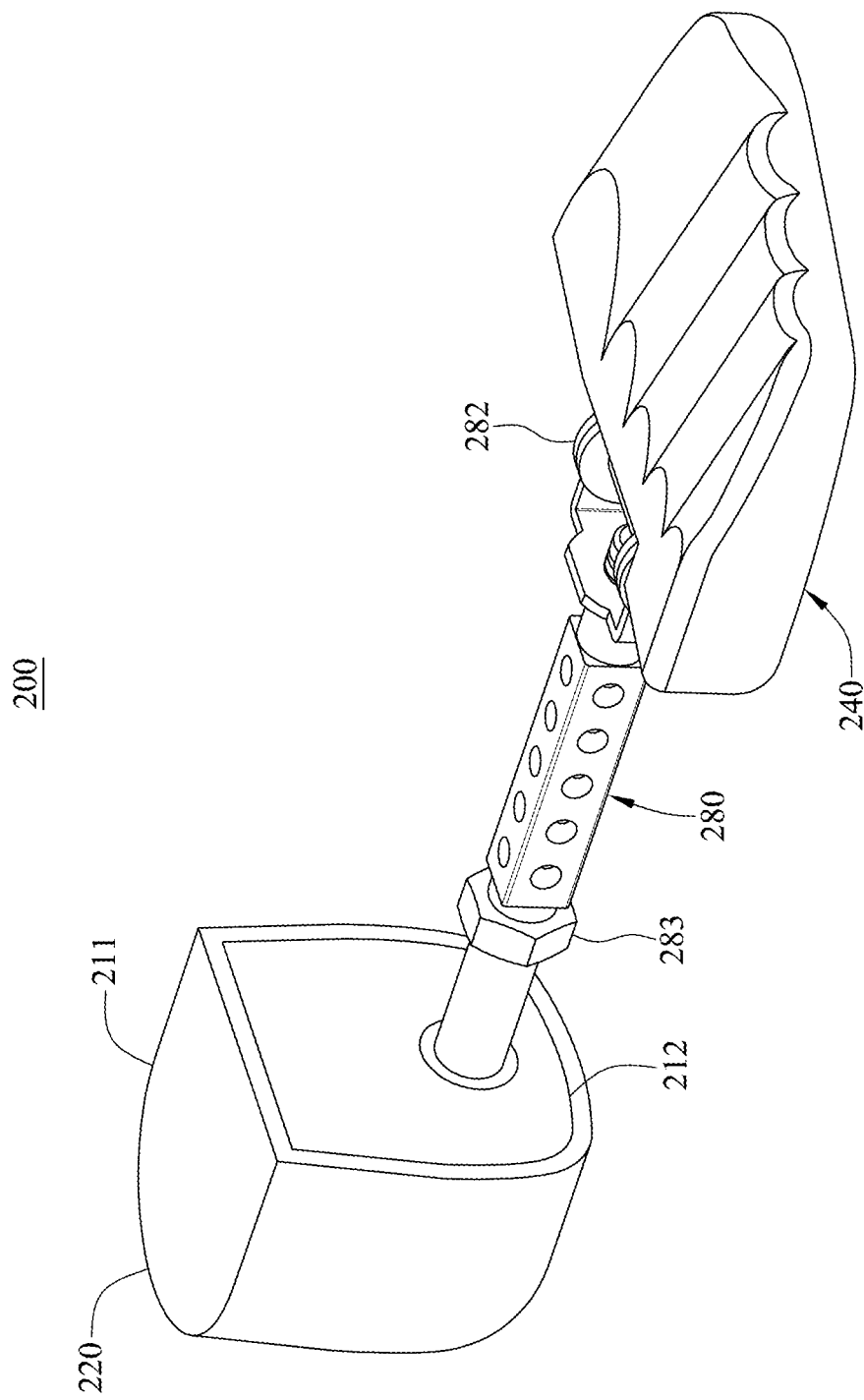
FIG. 26 is an exemplary detail drawing illustrating yet another alternative embodiment of the model foot of FIG. 22A, wherein a heel of the model foot is made of two materials.

Turning to FIG. 26, a detail drawing of an exemplary model foot 200 is shown. The heel 220 is shown as including the second foot portion 212 and the first foot portion 211 that covers the second foot portion 212 as a shell. The first foot portion 211 can be made using 3D printing. The second foot portion 212 can be made of potting compound and can fill within the first foot portion 211. Advantageously, the cost of 3D printing can be reduced while customized stretching by the heel 220 can still be achieved.

In one embodiment, the heel connector 288 and the heel 220 can be aligned, manually and/or by using a fixture. For example, the heel 220 can be placed in a fixture. The fixture can hold the nut 283 and the heel 220 in proper alignment before filling the potting compound in the first foot portion 211. Advantageously, the heel 220 and the foot core 280 can be appropriately aligned relative to the arm 122 (shown in FIG. 21) and the platform 140 (shown in FIG. 21).

Figure 27A:
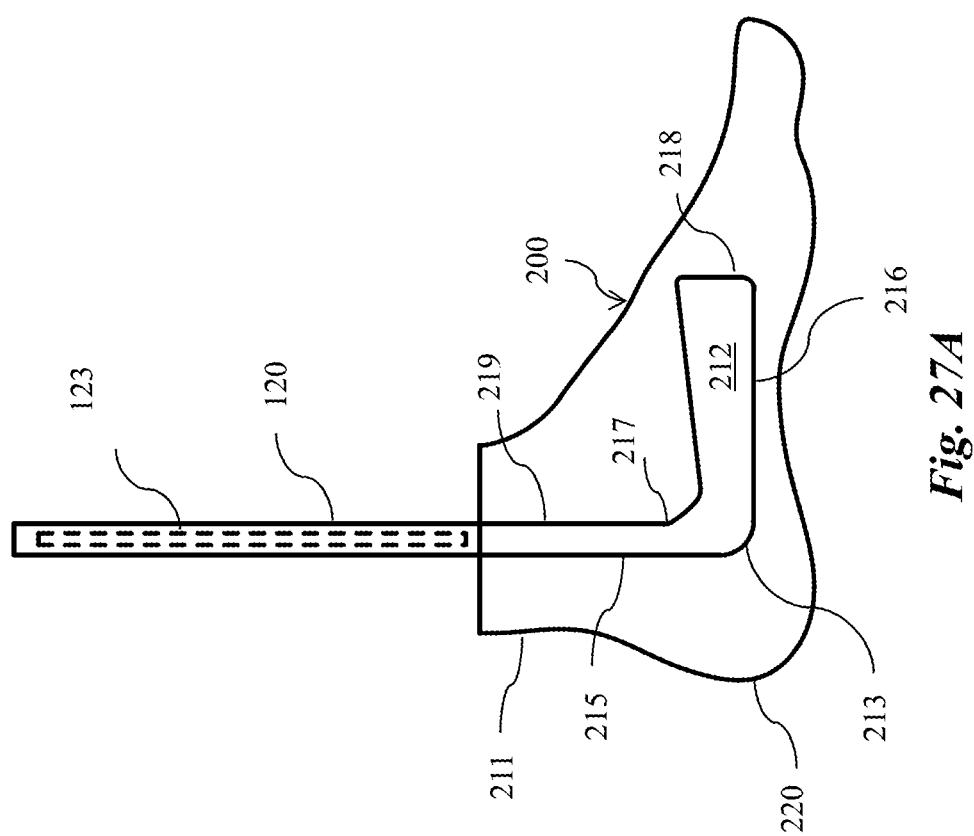
FIG. 27A is an exemplary diagram illustrating another alternative embodiment of the model foot of FIG. 3A, wherein the model foot is attached to a coupling structure.

Turning to FIG. 27A, an exemplary model foot 200 is shown as including the first foot portion 211 with the second foot portion 212 embedded therein. The first foot portion 211 can replicate an external shape of the entire natural foot. The second foot portion 212 can be an endoskeleton or core of the model foot 200. The second foot portion 212 can include a foot segment 216 including first and second end regions 218, 213 distal from and proximal to the heel 220 of the first foot portion 211, respectively. The second foot portion 212 can include a leg segment 215 including a first leg end region 217 joining with the second foot end region 213 and a second leg end region 219 attached to an end region of the coupling structure 120.

In one embodiment, the second foot portion 212 can be more rigid than the first foot portion 211. Advantageously, the second foot portion 212 can simulate stiffness of an internal bone structure of the natural foot. Additionally and/or alternatively, the second foot portion 212 can distribute any force applied to the model foot 200 throughout the first foot portion 211 to achieve accurate compression of the first foot portion 211.

The coupling structure 120 can include a post that can have an elongated shape. The coupling structure 120 can define one or more slots 123 arranged in a column for attaching to the top assembly 180 (shown in FIG. 28, for example). Advantageously, the slots 123 can achieve adjustable distance between the model foot 200 and the top assembly 180.

Figure 27B:
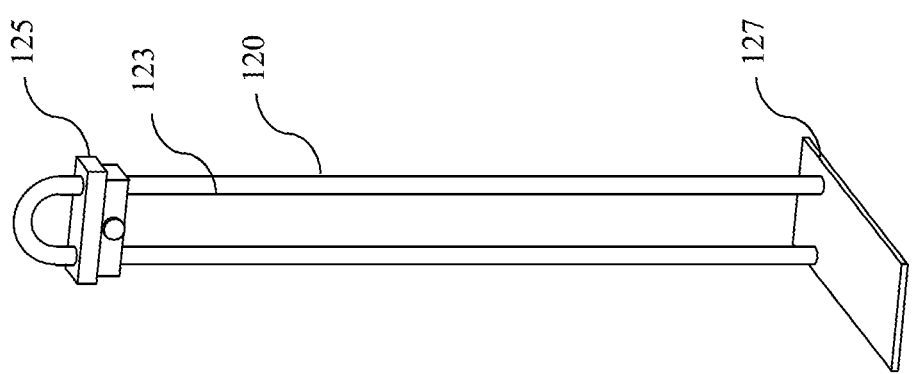
FIG. 27B is an exemplary diagram illustrating an alternative embodiment of the coupling structure of FIG. 27A.

Turning to FIG. 27B, another exemplary alternative embodiment of the coupling structure 120 is shown. The coupling structure 120 of FIG. 27B can include a U-shaped post that can have an elongated shape and that defines a slot 123 for attaching to the top assembly 180 (shown in FIG. 28, for example) via a clip 125. Advantageously, the plurality of slots 123 can achieve adjustable distance between the model foot 200 and the top assembly 180 by adjusting position of the clip 125 in the slot 123. The coupling structure 120 can include a connector plate 127 for bonding to the model foot 200.

Figure 28:
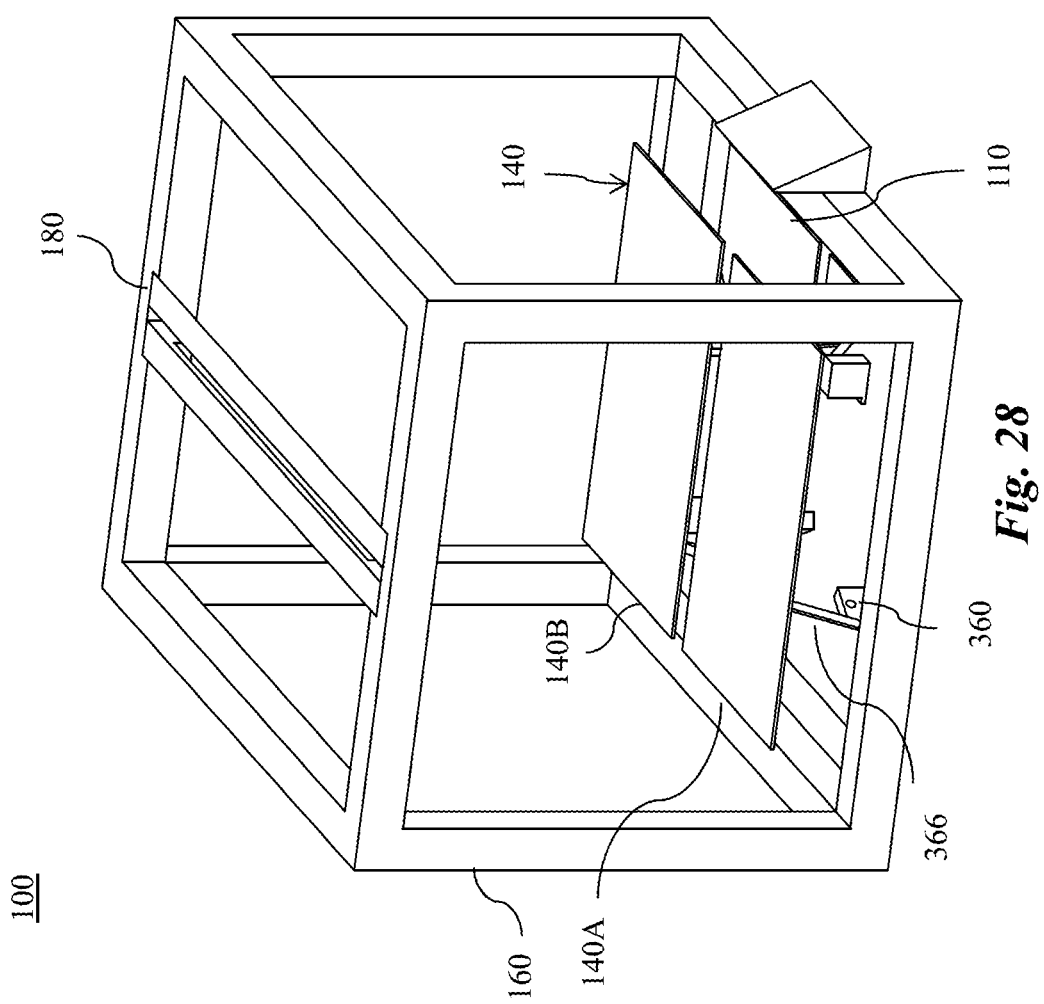
FIG. 28 is an exemplary diagram illustrating another alternative embodiment of the apparatus of FIG. 1, wherein the apparatus includes a plurality of platforms.

Turning to FIG. 28, an exemplary detail drawing illustrating an alternative embodiment of the apparatus 100 is shown. The apparatus 100 is shown as including two platforms 140, including platforms 140A, 140B. The apparatus 100 is shown as including the top assembly 180 that can be connected directly and/or indirectly to one or more model feet 200 (shown in FIG. 1). In one embodiment, each of the platforms 140 can be moved relative to a selected model foot 200 in uniform and/or different manners, respectively. Advantageously, the apparatus 100 can be used for adjusting a plurality of shoes 202 (shown in FIG. 1). For example, one apparatus 100 can be used for adjusting a pair of shoes 202 simultaneously.

Figure 29:
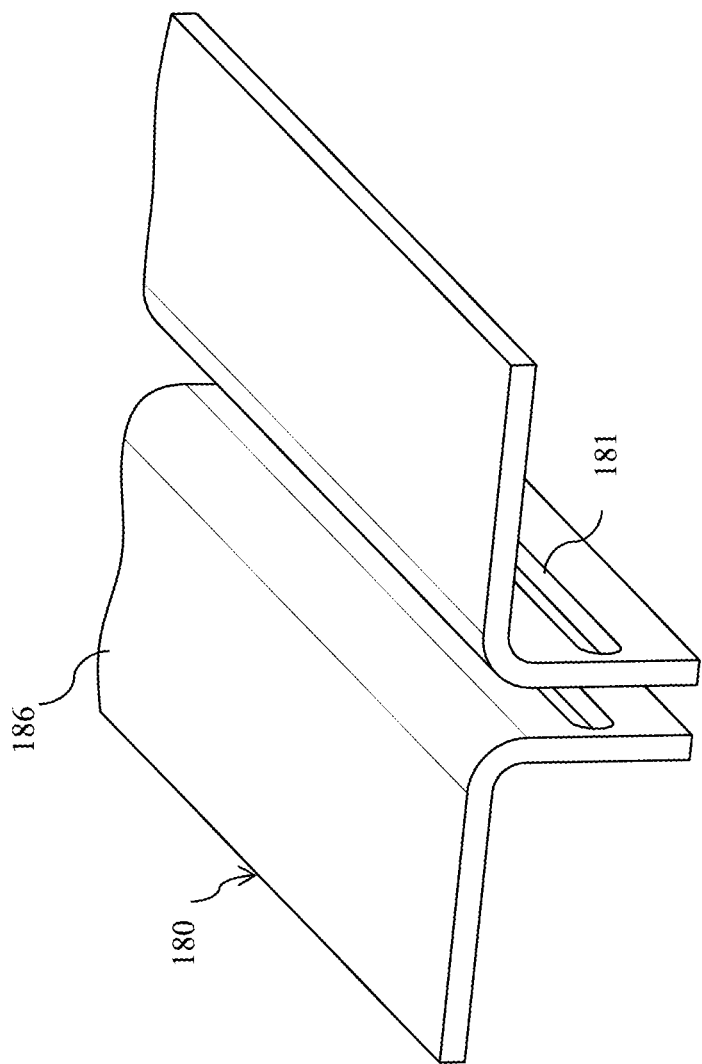
FIG. 29 is an exemplary diagram illustrating an embodiment of a top assembly 180 on the apparatus of FIG. 28.

Turning to FIG. 29, the top assembly 180 is shown as including one or more bars 186 each defining a slot 181. The coupling structure 120 (shown in FIG. 27A) can be fixed to the bars 186 by clamping using a bolt and/or nut via the slot 181 and the slot 123 (shown in FIG. 27A). The bars 186 can be connected to the support frame 160 (shown in FIG. 28) via any suitable locking mechanism including, for example, nuts, bolts, pins springs, latches and/or cooperating detents.

Figure 30:
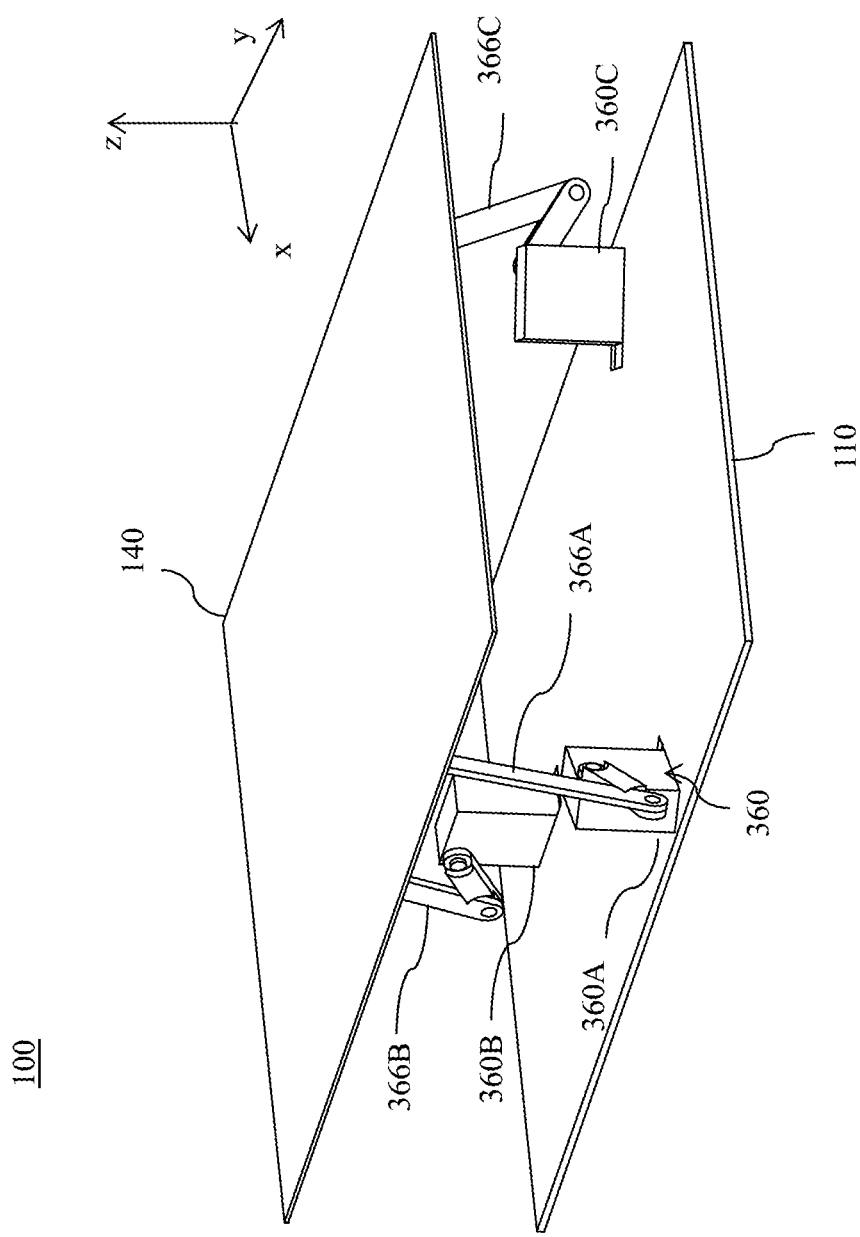
FIG. 30 is an exemplary diagram illustrating the apparatus of FIG. 28, wherein one of the platforms is shown.

Turning to FIG. 30, the platform 140 is shown as being connected to a base member 110. The base member 110 can be a part of the support frame 160 (shown in FIG. 28). Three actuators 360A-360C can be attached to the base member 110, optionally at mutually orthogonal positions. Exemplary actuators 360A-360C can each include a rotary actuator. For example, the rotary actuator can include a rotational servo. The actuators 360A-360C can control movement of the pressure components 366A-366C. Each of the pressure components 366A-366C are shown as including a crank linkage with one or more links and can be connected to the platform 140 via a pivotable joint (not shown). An exemplary pivotable joint can include a ball joint.

The actuators 360A-360C can be configured to generate rotational and/or translational movements of the platform 140 relative to the model foot 200 (shown in FIG. 1) about one or more axes. In one embodiment, the platform 140 can rotate about x axis to reach selected pitch position(s) to simulate dorsiflexion and plantarflexion of the model foot 200. Additionally and/or alternatively, the platform 140 can rotate about y axis to reach selected roll positions to simulate pronation and supination of the model foot 200. Additionally and/or alternatively, the platform 140 can translate in z axis to reach selected heave positions to accommodate a height of the heel of the shoe 202 (shown in FIG. 1) and/or ease the process of attaching the model foot 200 to the apparatus 100.

Stated somewhat differently, the platform 140 can be configured to function in the form of a Stewart and/or Stewart-like platform. The apparatus 100 can comprise a traditional six degrees-of-freedom Stewart platform and preferably can simulate a walking motion by using three, or fewer, degrees of freedom. In various embodiments, the platform 140 can simulate the walking motion by using any suitable number of degrees of freedom that is less than, and/or equal to, six. In one embodiment, the apparatus 100 can comprise a Stewart and/or Stewart-like platform for simulating a walking motion by using three, two, or one selected degrees of freedom.

Additionally and/or alternatively, one or more of the actuators 360A-360C to introduce the vibration motion when the pressure components 366A-366C press on the platform 140. The vibration can make the model foot 200 move within the shoe 202 and stretch the shoe 202. For example, a vibration motor (not shown) can be connected to the platform 140 to generate micro-motions in the platform 140.

Figure 31:
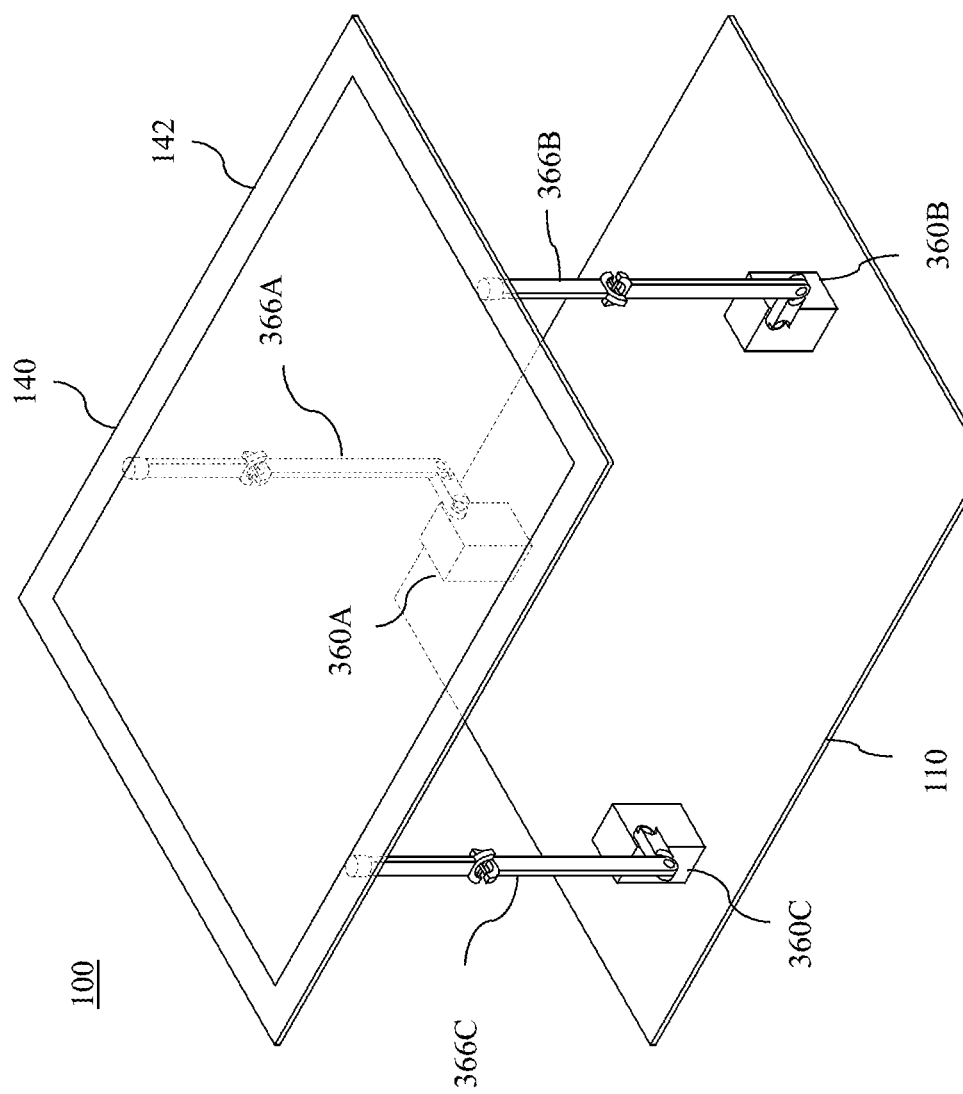
FIG. 31 is an exemplary diagram illustrating the apparatus of FIG. 28, wherein the apparatus includes a surface layer.

Turning to FIG. 31, a surface layer 142 is shown as being disposed on the platform 140 and proximal to the shoe 202 (shown in FIG. 1). The surface layer 142 can be removable, fixed to the platform 140, and/or integrated as a part of the platform 140. The surface layer 142 can simulate texture and/or mechanical properties of a floor or ground upon which the shoe 202 may walk. Advantageously, the apparatus 100 can simulate conditions for actual usage of the shoe 202. When the surface layer 142 is removable, a plurality of different surface layers 142 can be changed. Exemplary surface layers 142 can be wood, artificial or natural turf, carpet, concrete, dance or sport floor, rough and/or uneven surface to simulate rough and/or uneven terrain, and/or the like.

Figure 32:
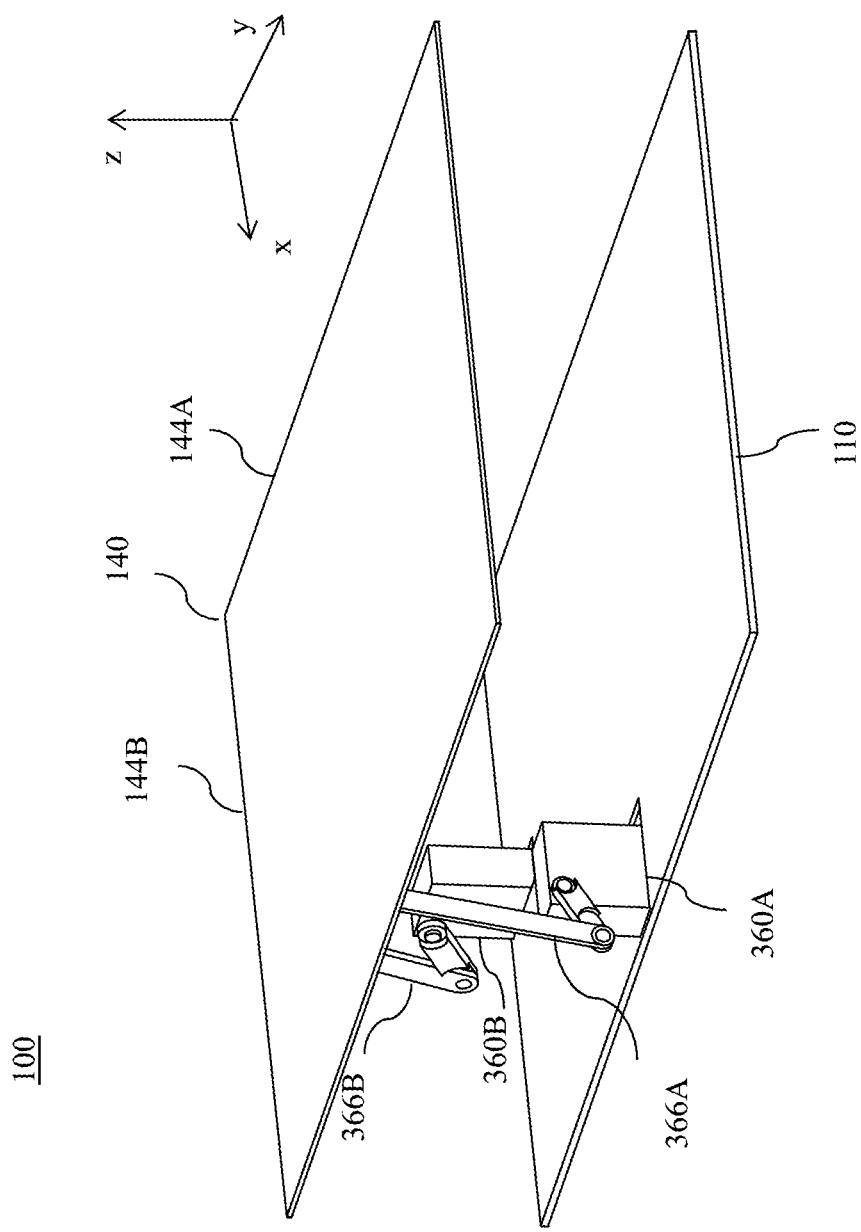
FIG. 32 is an exemplary diagram illustrating another alternative embodiment of the apparatus of FIG. 28, wherein the apparatus includes two actuators.

Turning to FIG. 32, two actuators 360A, 360B are shown as being attached to the base member 110. The actuators 360A, 360B can each include a linear and/or rotary actuator. The actuators 360A-360C can control movement of the pressure components 366A, 366B, respectively. Each of the pressure components 366A, 366B can be connected to the platform 140 via the pivotable joint (not shown).

The actuators 360A, 360B can be attached to the base member 110 optionally at mutually orthogonal positions. The actuators 360A, 360B can be configured to generate rotational movements of the platform 140 relative to the model foot 200 (shown in FIG. 1) about one or more axes. In one embodiment, the actuator 360B can move a side 144B of the platform 140 in z direction, so that the platform 140 can rotate about x axis to reach selected pitch position(s) to simulate dorsiflexion and plantarflexion of the model foot 200. Additionally and/or alternatively, the actuator 360A can move a side 144A of the platform 140 in z direction, so that the platform 140 can rotate about y axis to reach selected roll positions to simulate pronation and supination of the model foot 200. Stated somewhat differently, the platform 140 can function as a Stewart platform but using two degrees-of-freedom to simulate a walking motion. In one embodiment, the actuators 360A, 360B can drive the platform 140 to simultaneously cycle through a plurality of pitch positions and a plurality of roll positions.

Additionally and/or alternatively, one or more of the actuators 360A, 360B can introduce the vibration motion when the pressure components 366A, 366B press on the platform 140. The vibration can make the model foot 200 move within the shoe 202 (shown in FIG. 1) and stretch the shoe 202.

Figure 33:
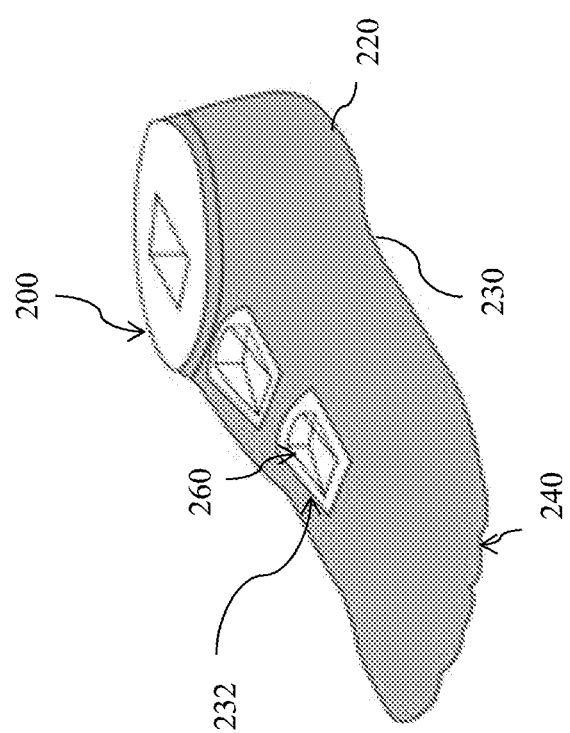
FIG. 33 is an exemplary detail drawing illustrating another alternative embodiment of the model foot of FIG. 16, wherein the model foot is disposed within a sock.

Turning to FIG. 33, the model foot 200 is shown as wearing a sock 230. The sock 230 is shown as covering at least the heel 220, the toes 240, or a combination thereof. The sock 230 can be more slippery against the shoe 202 (shown in FIG. 1) than the model foot 200 is. Stated somewhat differently, a friction between the shoe 202 and the model foot 200 can be greater than a friction between the shoe 202 and the sock 230. Exemplary sock 230 can made of silk, natural and/or engineered spider silk, satin, nylon, polyester, polyester and spandex, or a combination thereof.

The sock 230 can increase sliding and/or slipping of the model foot 200 against the shoe 202 and prevent the model foot 200 from sticking to the shoe 202. Advantageously, the model foot 200 can slide in the shoe 202 during operation of the apparatus 100 (shown in FIG. 1) and stretch the shoe 202. Additionally and/or alternatively, the model foot 200 wearing the sock 230 can slip easily into the un-stretched shoe 202.

The model foot 200 is shown as defining three attachment point openings 232 each being shaped to expose one of the attachment points 260. As shown in FIG. 33, the attachment point openings 232 can define a hole cut in the sock 230. Advantageously, the attachment points 260 can be connected to the coupling structure 120 (shown in FIG. 1).

Figure 34:
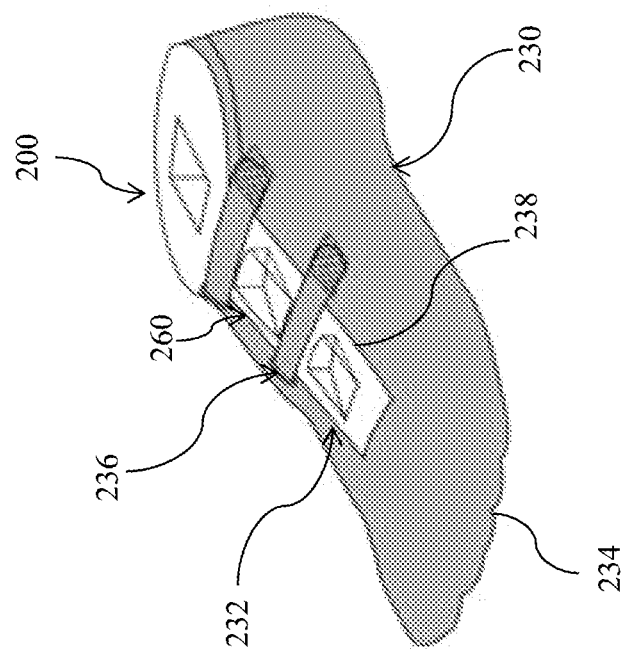
FIG. 34 is an exemplary detail drawing illustrating an alternative embodiment of the model foot of FIG. 33, wherein the sock includes a closure member.

Turning to FIG. 34, the sock 230 is shown as including a sock base 234. The sock base 234 is shown as being shaped to define an opening 238 to expose a plurality of attachment point openings 232. The sock 230 is shown as including a closure 236 between two adjacent attachment point openings 232. The closure 236 can include an elongated piece of material that spans across the opening 238 and have two end regions configured to attach to the sock base 234. Advantageously, the sock base 234 can more completely cover the model foot 200 to increase slipping and, at the same time, the attachment points 260 can be exposed. The sock base 234 with the closure 236 can adapt to the model foot 200 that have different numbers and arrangements of attachment points 260.

Figure 35:
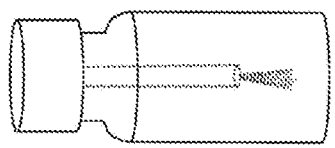
FIG. 35 is an exemplary diagram illustrating an embodiment of a stretching enhancer used on the model foot of FIG. 3.

Turning to FIG. 35, a stretching enhancer 500 is shown. The stretching enhancer 500 can include a material that can moisten, soften, and/or weaken a material of the shoe 202 (shown in FIG. 1) to increase efficacy of, or expedite, the stretching. Exemplary stretching enhancer 500 can include a liquid, a gel, or a combination thereof. Exemplary gel can include an alcohol gel and/or a leather stretch liquid.

The stretching enhancer 500 can be sprayed on the model foot 200. Additionally and/or alternatively, the stretching enhancer 500 can be applied to selected locations on the model foot 200 where more stretching is needed (for example, on locations corresponding to hot spots on the natural foot). FIG. 35 shows the stretching enhancer 500 in a bottle with a brush (optionally attached to a lid of the bottle) and the brush can be used for applying the stretching enhancer 500 with precision.

Figure 36C:
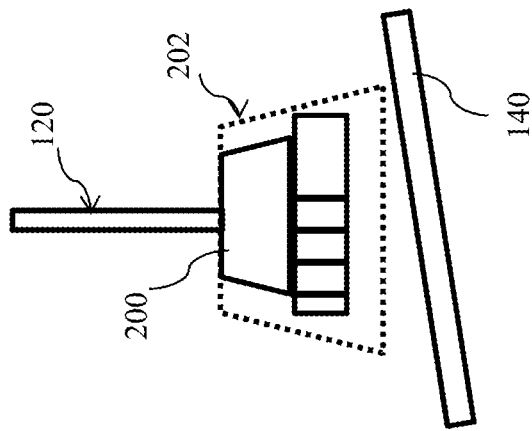
FIGS. 36A-36C are exemplary diagrams illustrating other alternative embodiments of the apparatus of FIG. 1 during a lateral rolling movement.
Figure 36B:
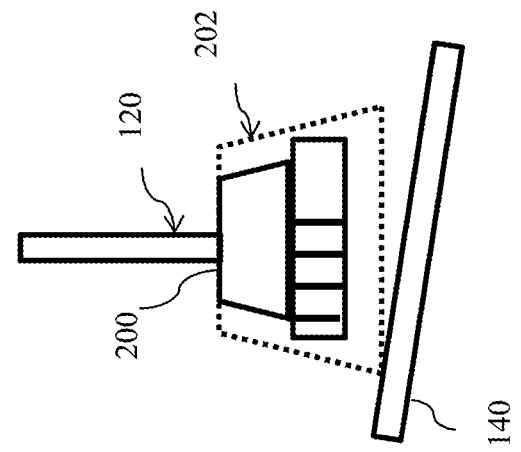
Figure 36A:
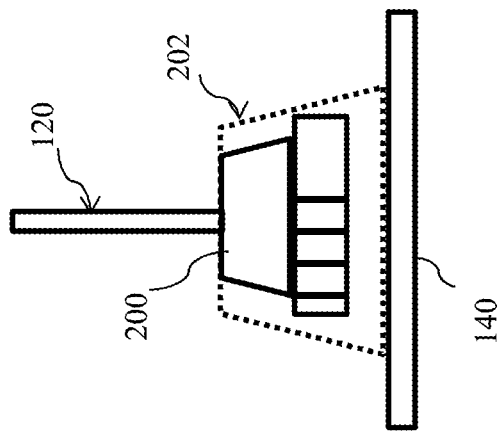

FIGS. 36A-36C show positions of the platform 140 relative to the model foot 200 in a lateral rolling movement. Turning to FIG. 36A, a front view of the model foot 200 and the platform 140 are shown. The model foot 200 is in the neutral position. Turning to FIG. 36B, the model foot 200 is supinating. Stated somewhat differently, the platform 140 presses on an outward edge of the model foot 200. The outward edge of the model foot 200 is distal from the big toe. Turning to FIG. 36C, the model foot 200 is pronating. Stated somewhat differently, the platform 140 presses on an inward edge of the model foot 200. The inward edge of the model foot 200 is proximal to the big toe.

By control the platform 140 in the apparatus 100 shown in FIGS. 22A, 30 and/or 32, the platform 140 can switch and/or roll between the pronating state and the supinating state in any selected sequence, with the neutral state therebetween, to simulate lateral rolling movement of the model foot 200. The lateral rolling movement can occur when a natural foot walks on rough and/or uneven terrain during, for example, hiking. Advantageously, when the model foot 200 wears the shoe 202 (shown in FIG. 1), the model foot 200 can stretch the shoe 202, such as a hiking shoe, in a manner similar to actual usage condition of the shoe 202. The lateral rolling movement can be alternative and/or additional to the simulated walking movement and/or vibration of the platform 140.

Figure 37:
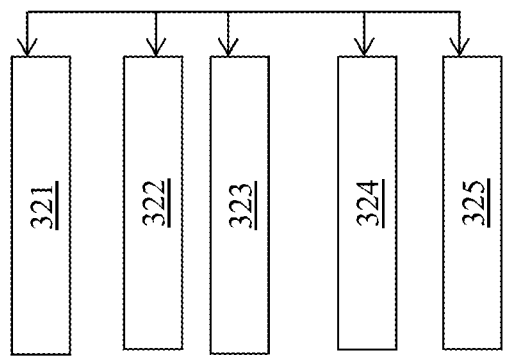
FIG. 37 is an exemplary diagram illustrating an embodiment of a controller of a platform control system of FIG. 1.

Turning to FIG. 37, an exemplary controller 320 is shown. The controller 320 can be configured for controlling the platform control system 300 (shown in FIG. 1). The controller 320 can include a processor 321. The processor 321 can include one or more general-purpose microprocessors (for example, single or multi-core processors), application-specific integrated circuits, application-specific instruction-set processors, graphics processing units, physics processing units, digital signal processing units, coprocessors, network processing units, encryption processing units, and the like. The processor 321 can execute instructions for implementing the platform control system 300.

As shown in FIG. 37, the controller 320 can include one or more additional hardware components as desired. Exemplary additional hardware components include, but are not limited to, a memory 322 (alternatively referred to herein as a non-transitory computer readable medium). Exemplary memory 322 can include, for example, random access memory (RAM), static RAM, dynamic RAM, read-only memory (ROM), programmable ROM, erasable programmable ROM, electrically erasable programmable ROM, flash memory, secure digital (SD) card, and/or the like. Instructions for implementing the platform control system 300 can be stored on the memory 322 to be executed by the processor 321.

Additionally and/or alternatively, the controller 320 can include a communication module 323. The communication module 323 can include any conventional hardware and software that operates to exchange data and/or instruction between the controller 320 and another computer system (not shown) using any wired and/or wireless communication methods. Exemplary communication methods include, for example, radio, Wireless Fidelity (Wi-Fi), cellular, satellite, broadcasting, or a combination thereof.

Additionally and/or alternatively, the controller 320 can include a display device 324. The display device 324 can include any device that operates to present programming instructions for operating the controller 320. Additionally and/or alternatively, the controller 320 can include one or more input/output devices 325 (for example, buttons, a keyboard, keypad, trackball), as desired.

The processor 321, the memory 322, the communication module 323, the display device 324, and/or the input/output device 325 can be configured to communicate, for example, using hardware connectors and buses and/or in a wireless manner.

Figure 38:
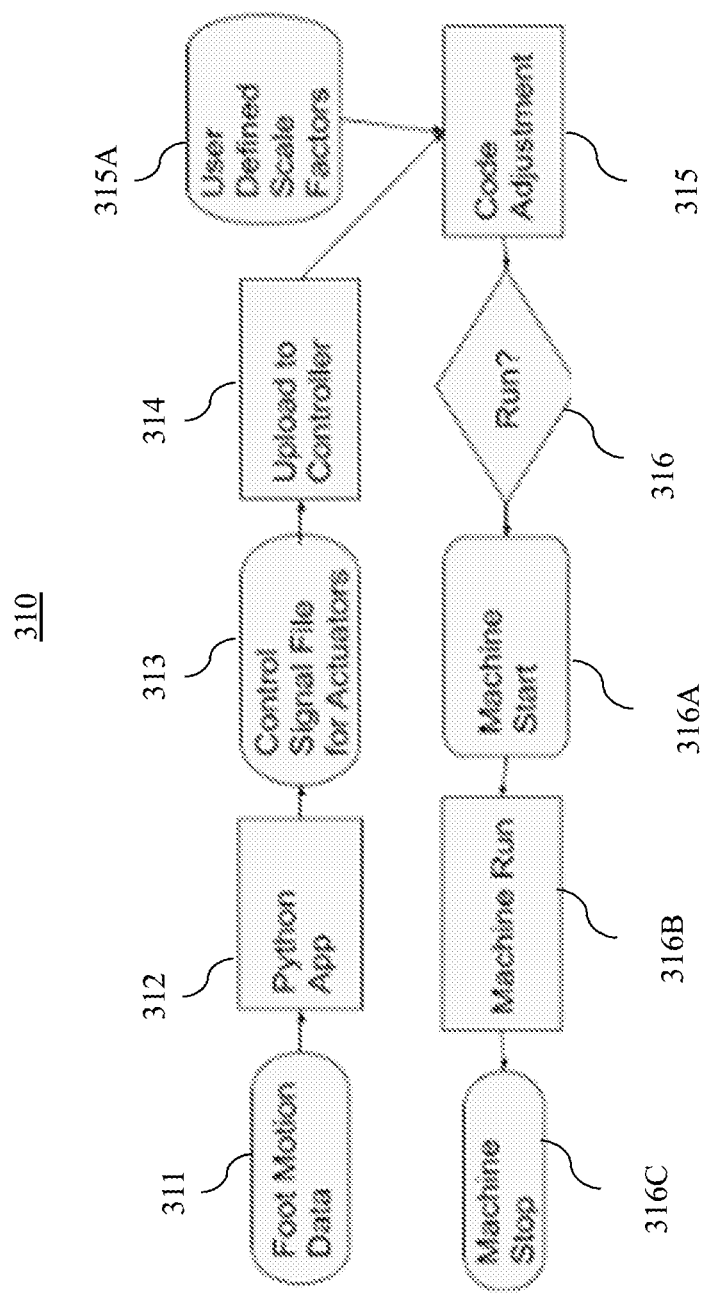
FIG. 38 is an exemplary diagram illustrating an embodiment of a control process implemented on the controller of FIG. 37.

Turning to FIG. 38, an exemplary diagram of an embodiment of a control process 310 is shown. The control process 310 can be implemented on the controller 320 (shown in FIG. 37). The controller 320 can provide a central control panel (not shown), which can provide a user interface with a plurality of controls. Ambulatory motion can be included in the memory 322 (shown in FIG. 37). The user interface can include a power button, start-stop control, and indicator lights. Additionally and/or alternatively, the user interface can present a cycle timer, ambulatory pattern selection, cycle modification to better account for shoe size and type, a keypad for an operator to input the duration (or number of steps) for actuation, the shoe size, the mode of actuation (walking, running, sprinting), or a combination thereof.

The controller 320 can be programmed using any suitable language. An exemplary controller 320 can be written in Arduino and/or Python. Foot motion data can be obtained, at 311. For example, the foot motion data can be obtained by measuring motions of the natural foot on a treadmill with measurement functions, and/or any other foot motion measurement instruments. The foot motion data can be processed, at 312, in a foot data program such that the foot motion data can be converted to control code for the actuators 360 (shown in FIG. 30). The foot data program can include walking simulation data of displacement direction and points of contact with the ground at a set of snapshots or moments within the walking. For example, the foot data program can cyclically run through tables of values of the foot motion data to convert the foot motion data into a table of servo positions. The table of the servo positions can be provided to the control code which can convert the servos positions to pulse-width modulated signals that can be sent to the servos to determine the position.

In one embodiment, the foot data program can utilize angular displacement in the dorsi and/or plantar flexion ranges, inversion and/or eversion ranges, and/or the like, to determine the angle of the platform 140 at a set number of points in each walking cycle (for example, from heel strike to heel strike). At selected displacement angles, the foot data program can determine point of contact of the model foot 200 with the ground at the specific point in the walking cycle. Accordingly, the foot data program can operate in a "flipbook form," where each point of contact coupled with corresponding angles of the platform 140 can be a single frame in the overall motion. By sequencing the individual frames together, the foot data program can create a fluid or continuous motion that can simulate the motion of walking and create accurate actuation.

The control code can be arranged, at 313, in a control signal file optionally having a table structure. The control signal file can optionally be uploaded, at 314, to the controller 320, if the foot data program is run on a computer different from the controller 320. The user can make, at 315A, modifications such as changing shoe size, vertical offset, and run time. For example, the foot data program can take in the shoe size via the user interface to ensure that the actuation makes the platform 140 (shown in FIG. 1) contact the sole of the shoe 202 (shown in FIG. 1) at the appropriate points along the shoe 202 and to scale the points of contact with the platform 140 (shown in FIG. 1) accordingly.

After any changes and the control signal file have been modified, at 315, a motion control program can be run at 316. The user can press, at 316, 'start.' The apparatus 100 (shown in FIG. 1) can start, at 316A. The apparatus 100 can continue running, at 316B, for a selected duration and/or a selected number of steps. Upon completion, the apparatus 100 can stop, at 316C. The user interface can optionally notify the user that the run cycle is complete.

The number of steps can be greater than and/or equal to the minimum number of steps that the natural foot can make to stretch the shoe 202. The number of steps can be smaller than a number of steps that can wear out the shoe 202. The duration can be calculated by multiplying the number of steps and duration of each step. The number of steps can depend on the type of shoe 202. For example, the number of steps can be smaller for a soft leather shoe and greater for a sports cleat. Exemplary number of steps can range from 10,000 to 200,000 or any sub-range therebetween.

Figure 39:
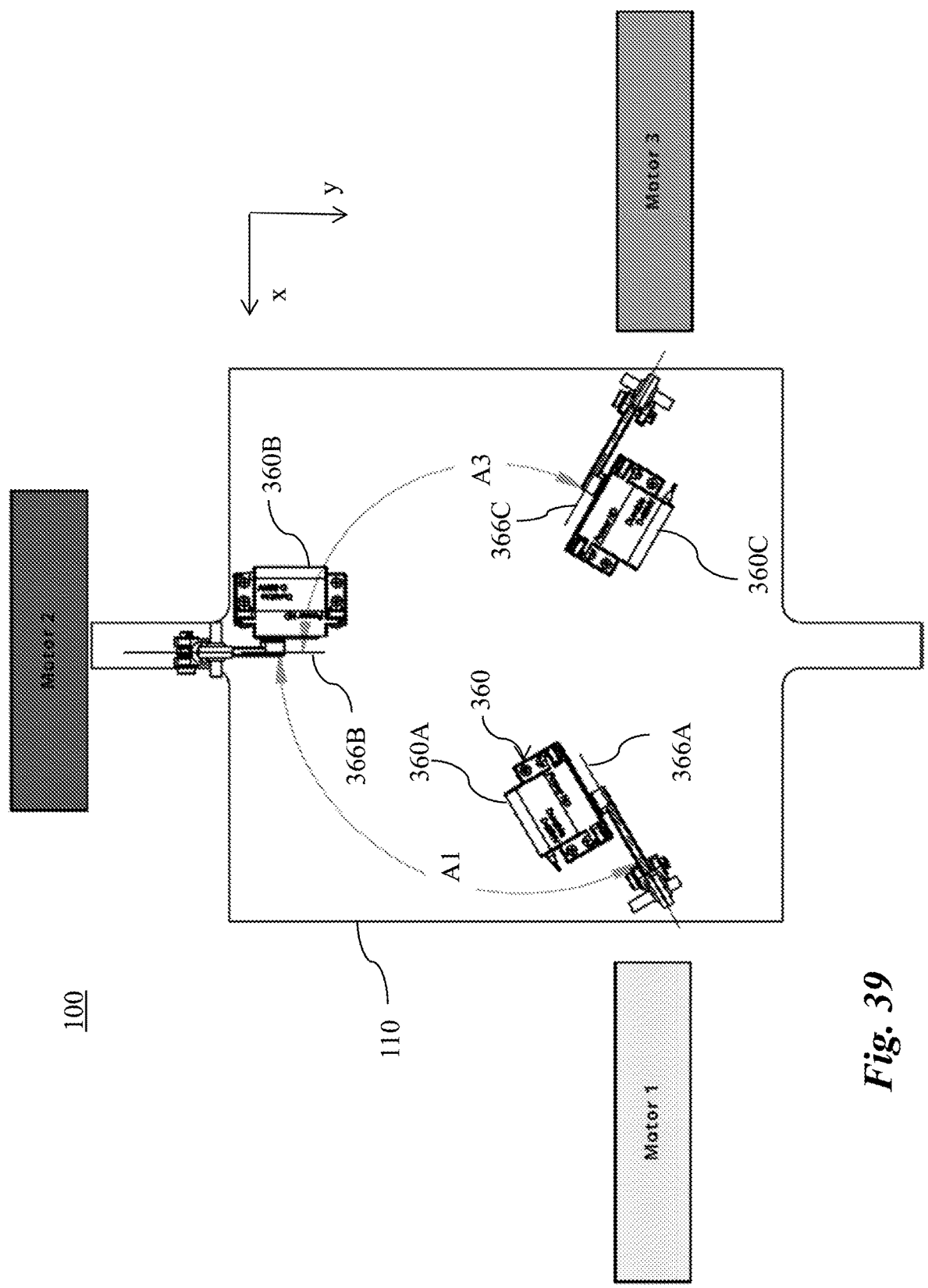
FIG. 39 is an exemplary diagram illustrating another alternative embodiment of the apparatus of FIG. 30, wherein a top view of the apparatus is shown.
Figure 40:
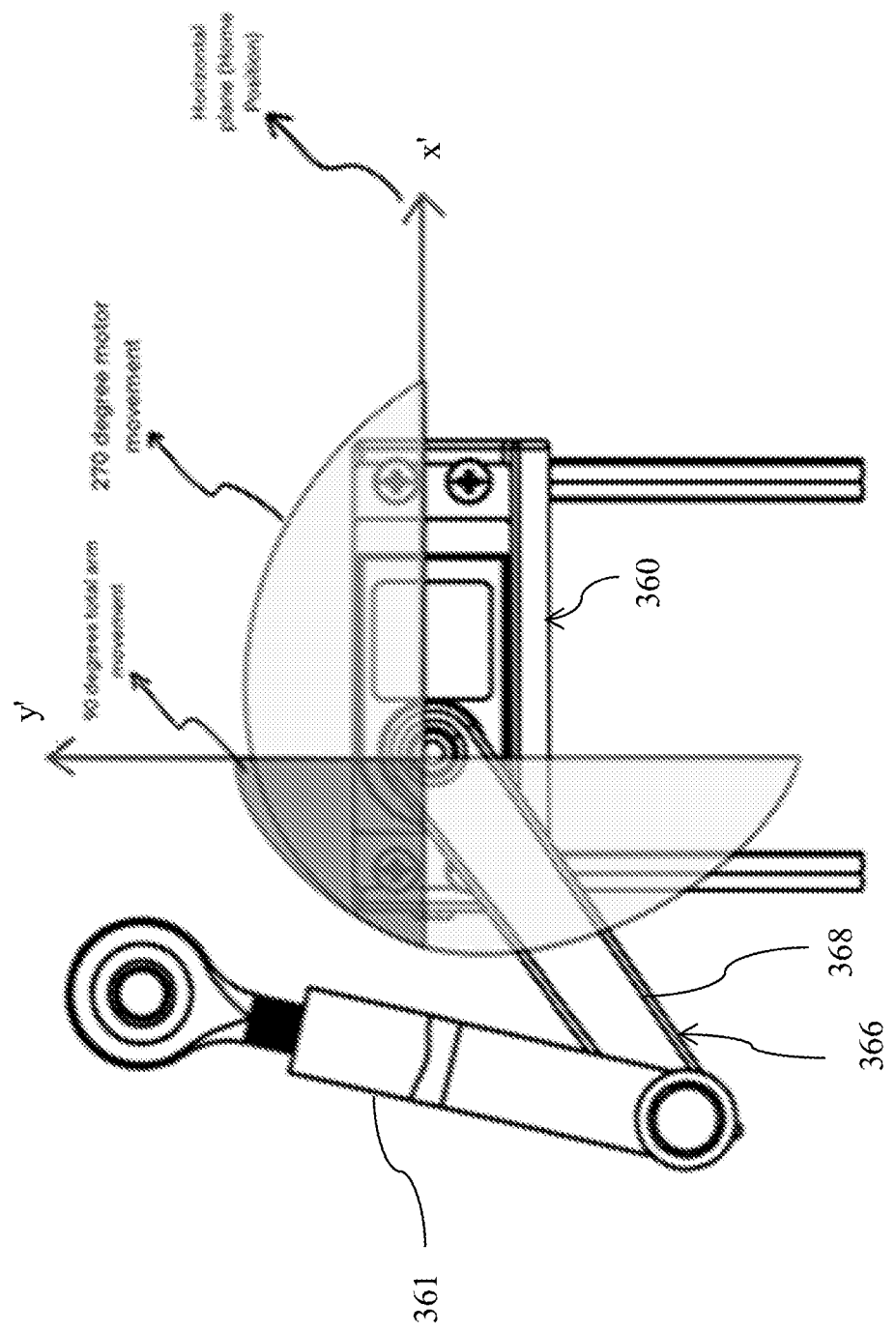
FIG. 40 is an exemplary diagram illustrating an embodiment of an actuator of the apparatus FIG. 39.

Turning to FIG. 39, a top view of an alternative embodiment of the apparatus 100 is shown. The apparatus 100 is similar to apparatus 100 as shown in FIGS. 30-32 and includes the actuators 360A-360C (or the motors 1-3, respectively). The motion of each of the pressure components 366A-366C can define a plane (illustrated as a plane x'-y' as shown in FIG. 40). The planes between the pressure components 366A, 366B are shown as defining an arc with an angle A1. The planes between the pressure components 366B, 366C are shown as defining an arc with an angle A3. The angles A1, A3 can be uniform and/or different. In one embodiment, the angle A1 can be the same as the angle A3. Advantageously, the pressure components 366A, 366C can more easily generate symmetric and/or synchronous movements for the platform 140 (shown in FIG. 30). Stated somewhat differently, the pressure components 366A, 366C can raise and/or lower the platform 140 in synchronization. In one embodiment, the angles A1, A3 can each be 120 degrees.

Turning to FIG. 40, a detail drawing of an exemplary actuator 360 and an exemplary pressure component 366 is shown. A home position of the actuator 360 can be aligned with x' axis that is horizontal with the base member 110 (shown in FIG. 39). For illustrative purpose only, the actuator 360 can be capable of having an angular motion range of 270 degrees. The pressure component 366 is shown as having first and second arms 368, 361. The first arm 368 can be attached to the actuator 360 directly and/or can be configured to move within a motion range of 90 degrees and/or any other angle ranges within the range of 270 degrees. A second arm 361 distal to the actuator 360 can move in a vertical direction based on the angle of the first arm 368. By controlling an angular motion of the pressure components 366, the actuators 360 can drive the platform 140 (shown in FIG. 30) in one or more selected dimensions.

Although FIG. 40 shows a home position of the actuator 360 and the pressure component 366 as being 0 degree in the x'-y' coordinate system for illustrative purposes only, the home positions can be uniform and/or different values for the actuators 360 based on an installation position of each actuator 360, without limitation. Although FIG. 40 shows, for illustrative purposes only, the actuator 360 and the first arm 368 as having angular motion ranges of 270 degrees and 90 degrees, respectively, the actuator 360 and the first arm 368 can have any uniform and/or different motion ranges, without limitation.

Figure 41:
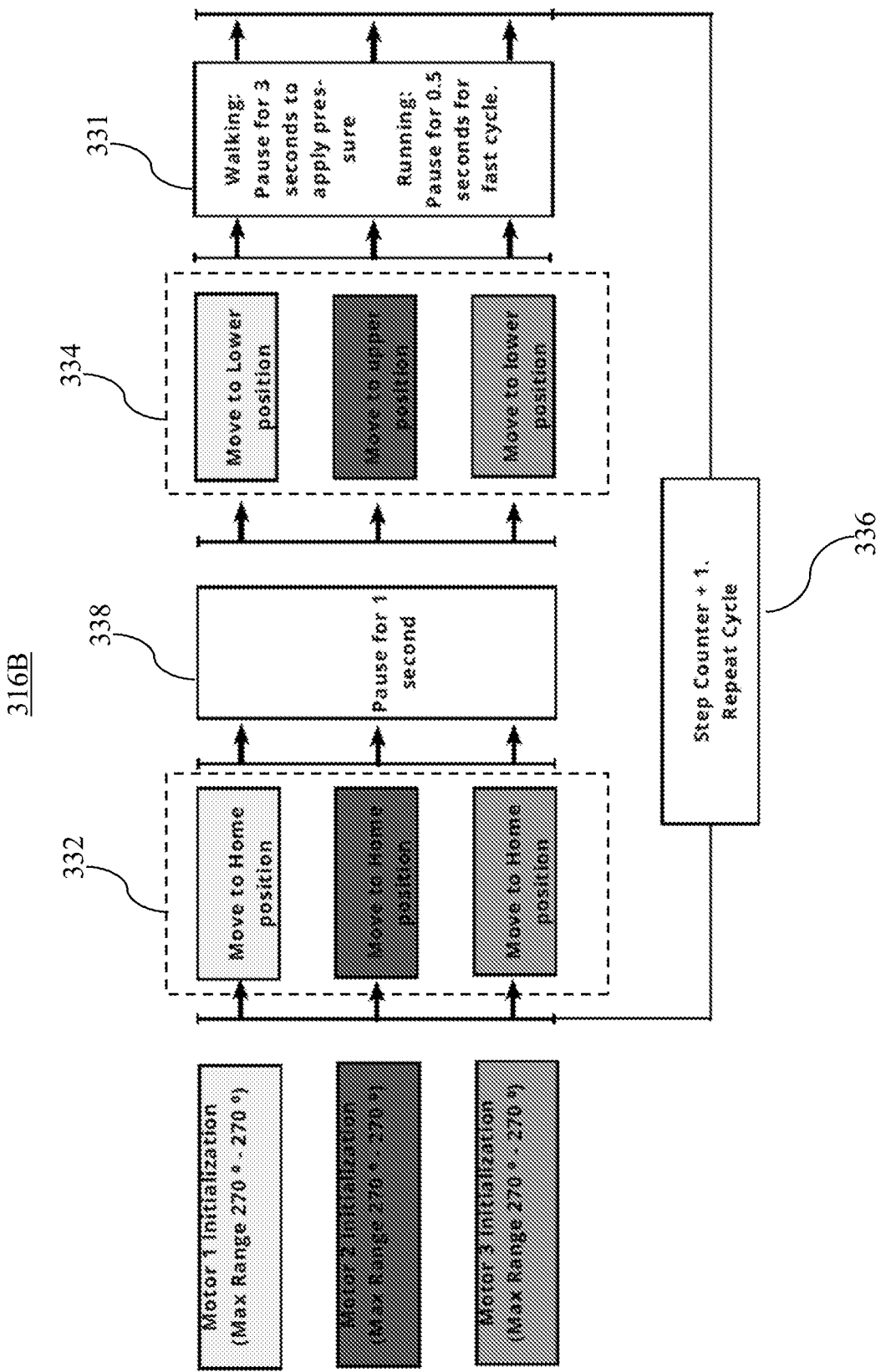
FIG. 41 is an exemplary diagram illustrating an embodiment of the control process of FIG. 38, wherein a movement of a platform is controlled.

Turning to FIG. 41, an exemplary flow chart of Machine Run at 316B (also shown in FIG. 38, for example) is shown. The actuators 360A-360C (shown in FIG. 39) can be moved, at 332, to home positions, respectively. At the home positions, the platform 140 (shown in FIG. 30) can be horizontal such that the model foot 200 (shown in FIG. 1) can be in the resting state (shown in FIG. 12A, for example). The actuators 360A, 360B, 360C can be moved, at 334, to lower, upper and lower positions, respectively. Accordingly, the platform 140 can be tilted such that the model foot 200 can be in the heel-press state (shown in FIG. 12B, for example). The cycle including 332, 334 can be repeated, at 336, for a selected number of times. The cycle is shown as including pause 338 for home position for 1 second and pause 331 for foot motion for 3 seconds or 0.5 second for illustrative purposes only. The duration of the pauses 338, 331 can be any suitable time length, without limitation.

Figure 42:
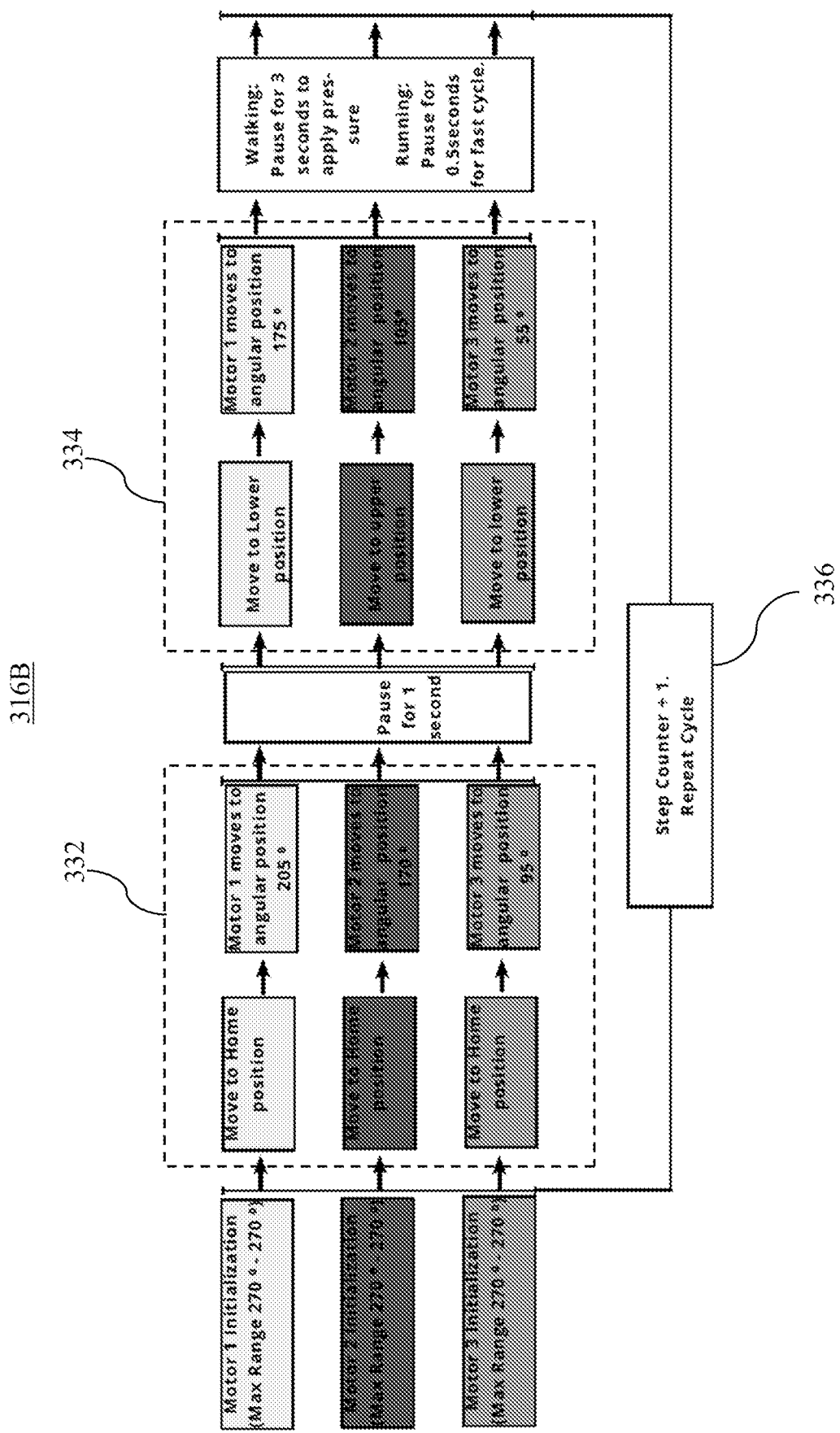
FIG. 42 is an exemplary diagram illustrating an alternative embodiment of the control process of FIG. 41, wherein angular values for actuators are shown.

Turning to FIG. 42, another exemplary flow chart of the Machine Run at 316B is shown. The flow chart is similar to the flow chart shown in FIG. 41 but shows exemplary angles for home, lower and higher positions in an exemplary setup. For illustrative purpose only, the actuators 360A-360C at 332 are shown as being at 205°, 170°, and 95°, respectively, and the actuators 360A-360C at 334 are shown as being at 175°, 105°, and 55°, respectively. However, the angles for the actuators 360A-360C at 332 can be any suitable uniform and/or different values, and the angles for the actuators 360A-360C at 334 can have any suitable values, without limitation. As a result of the change in angle values between 332 and 334, the actuators 360A, 360C can move similarly and synchronously between home and lower positions, and the actuator 360B can move between home and upper positions, creating the walking motion.

FIGS. 43A-43C show an exemplary process for making the model foot 200. Turning to FIG. 43A, before placing a casting material 256 (shown in FIG. 43B) into the mold 250, one or more fasteners 266 (for example, screws and/or bolts) can be inserted and/or screwed through and into the mold 250 at the selected locations corresponding to the attachment points 260 and be fixed at the locations at a suitable depth into the model foot 200.

Turning to FIG. 43B, the casting material 256 can be poured into the mold 250. Upon curing of the casting material 256, a recess complementary to a shape of the fastener 266 can be formed in the cured casting material 256. In various embodiments, the fasteners 266 can be selected such that at least the portion of the fastener 266 that is embedded into the casting material 256 can have the same shape as the portion of the coupling structure 120 (shown in FIG. 1) that is to be connected to the model foot 200 when the model foot 200 is in use.

Turning to FIG. 43C, after curing of the casting material 256, the model foot 200 can be formed and removed from the mold 250 (shown in FIG. 43B). As shown, the attachment points 260 can be defined on the model foot 200. FIG. 43D shows a perspective view of the model foot 200 for illustrating exemplary locations of the attachment points 260A-260C on the model foot 200. The attachment points 260A-260C are shown as each defining a fastening point 264. FIGS. 43A-43C show three attachment points 260 including three attachment points 260A-260C for illustrative purposes only. The model foot 200 can have any number of uniform and/or different attachment points 260 defined thereon, without limitation.

In some embodiments, the fasteners 266 (shown in FIG. 43B) can each include a screw and/or bolt, thus forming a thread in cured casting material. The thread can mate with the couple structure 120 if the couple structure 120 and the fastener 266 have the same type of thread. Thus, at the same time of curing the casting material 256, the model foot 200 can be shaped for accommodating the coupling structure 120, and/or any other suitable structure, to be connected to the model foot 200. The mold 250 can be reused for making multiple model feet 200 and the attachment points 260 can be defined on each model foot 200 at consistent location(s). In an alternative process, the model foot 200 can be first formed in, and then removed from, the mold 250, and the attachment points 260 can then be formed on the model foot 200. However, in comparison, the method illustrated in FIGS. 43A-43C can eliminate the separate step of forming the attachment points 260 and can prevent inconsistencies in locations of the attachment points 260. Advantageously, consistency, efficiency and cost of manufacturing the model foot 200 can be improved.

Although FIGS. 43A-43C show the fasteners 266 as being placed into the mold 250 before pouring the casting material 256 for illustrative purpose only, the fasteners 266 can be placed into the mold 250 at any suitable time before the casting material 256 is cured, without limitation. Additionally and/or alternatively, the mold 250 can be oriented in any suitable manner when the model foot 200 is being made. For example, the mold 250 can have uniform and/or different positions relative to ground, as shown in FIGS. 3C-3F, for example.

Although FIGS. 43A-43D show three fasteners 266 as being placed into the mold 250 for illustrative purpose only, one or more, or any number of, fasteners 266 can be used when making the model foot 200. One or more of, or all of, the formed attachment points 260 can be used when the model foot 200 is wearing the shoe 202 (shown in FIG. 1), depending on the type of the shoe 202 and/or the need of the stretching of the shoe 202. For example, to stretch a sneaker, all three of the attachment points 260 as shown can be used because a tongue of the sneaker can be lifted such that all the fasteners 266 can be accessed. In another example, when the model foot 200 wears a loafer without a movable tongue, the attachment point 260 proximal to the toes can be inaccessible and thus not used.

Figure 44:
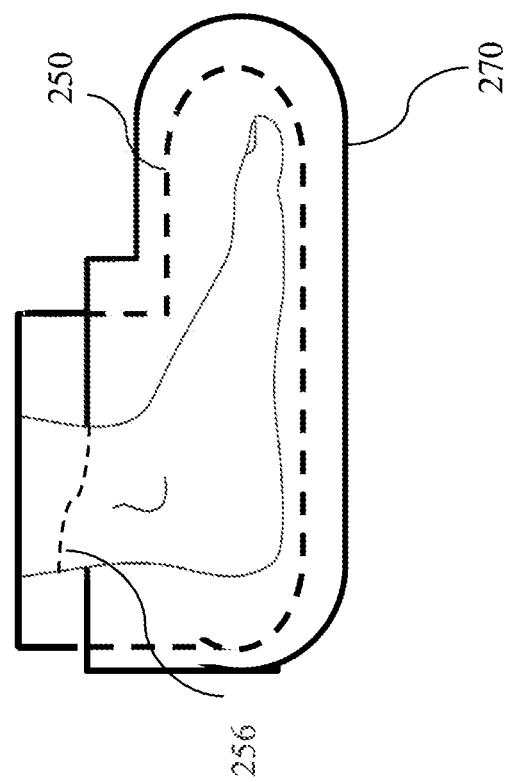
FIG. 44 is an exemplary diagram illustrating an embodiment of a process for making the model foot of FIG. 20, wherein a mold is disposed in a mold support.

Turning to FIG. 44, an exemplary mold support 270 is shown as at least partially enclosing the mold 250. In some embodiments, the mold 250 can be non-rigid, and/or the mold support 270 can be rigid or at least more rigid than the mold 250. For example, the mold 250 can be made of a silicone-based material. In one embodiment, the material for making the mold 250 can be different from the material for making the model foot 200 (shown in FIG. 1). Thus, when the casting material 256 is poured into the mold 250, the mold 250 can subside, sink and/or droop, under the weight of the casting material 256, thus deviating from the correct shape. The mold support 270 can prevent subsiding of, and can hold the shape of, the mold 250. Advantageously, the model foot 200 can be formed with the correct shape. For example, the mold support 270 can be made by any suitable methods including, for example, casting. Exemplary materials of the mold support 270 can be plaster.

Figure 45:
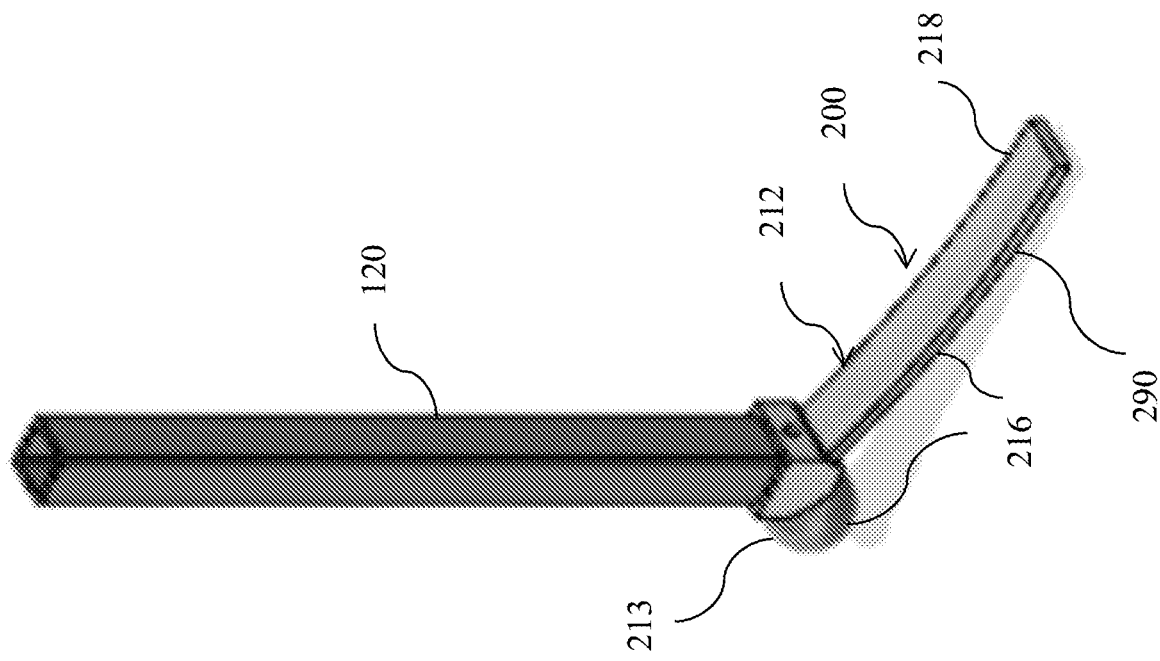
FIG. 45 is an exemplary diagram illustrating another alternative embodiment of the model foot of FIG. 27A, wherein the model foot includes a strip and a sphere.

Turning to FIG. 45, another exemplary model foot 200 attached to the coupling structure 120 is shown. Only the second foot portion 212 of the model foot 200 is shown for illustrative purposes. The first foot portion 211 (shown in FIGS. 4A, 25 and 27A) that replicates the external shape of the entire natural foot is not shown. The second foot portion 212 is shown as including the foot segment 216 including first and second end regions 218, 213. The second end region 213 can include a sphere, oval, ellipse, and/or any other regular or irregular curved shape, to simulate internal bone structure of a heel. The foot segment 216 is shown as including a strip 290 terminating at the second end region 218 and directly connected with the second end region 213 and/or indirectly coupled with the second end region 213 via any suitable mechanical structure. The strip 290 can be configured to simulate tarsals and/or metatarsals bone structure. The strip 290 can be planar and/or curved. Accordingly, the second foot portion 212 can imitate bone structure of the natural foot via a simplified shape and may be advantageous for reducing manufacturing cost.

Figure 46:
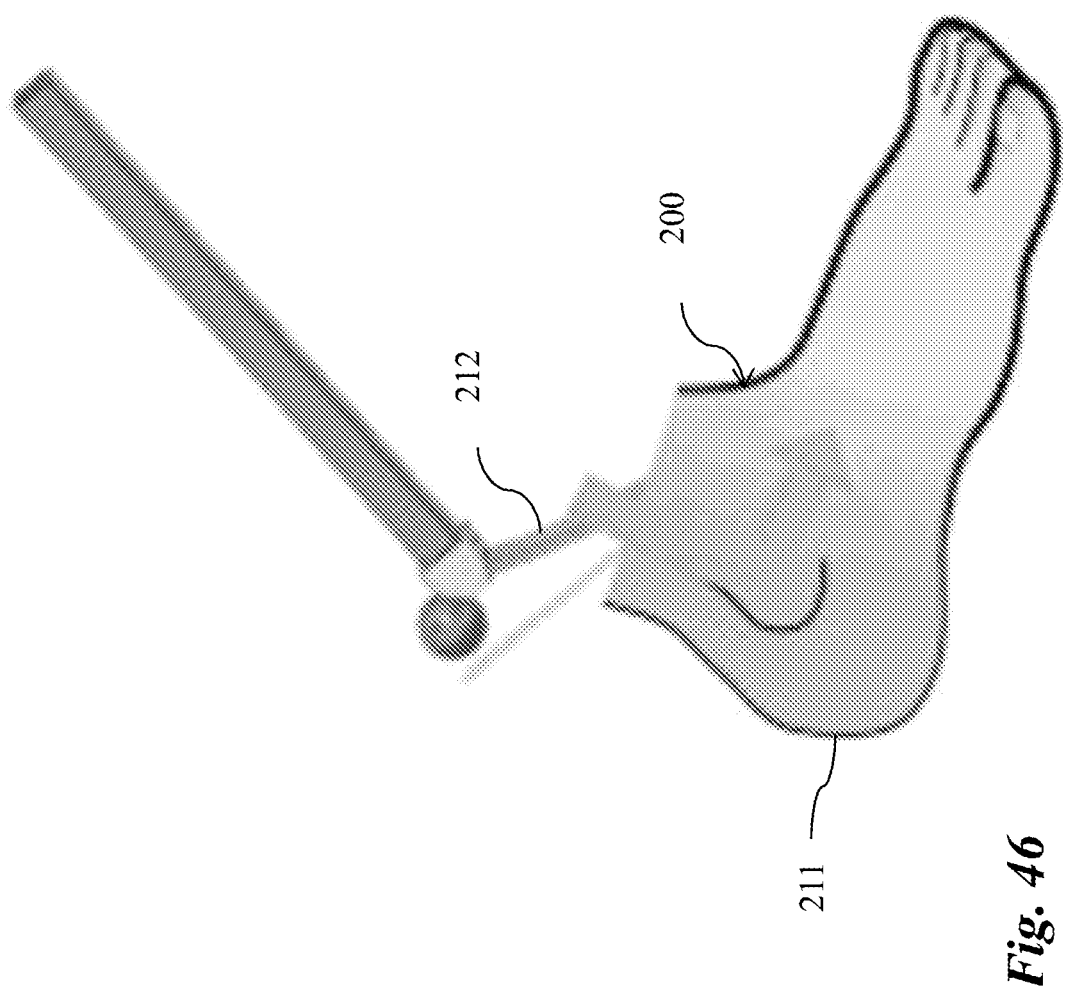
FIG. 46 is an exemplary diagram illustrating the model foot of FIG. 45, wherein the endoskeleton of the model foot includes the strip and the sphere.

Turning to FIG. 46, a diagram shows that the second foot portion 212 can be positioned in the first foot portion 211, at a suitable manufacturing stage depending upon the manufacturing method, to form an endoskeleton or core of the model foot 200.

Figure 47:
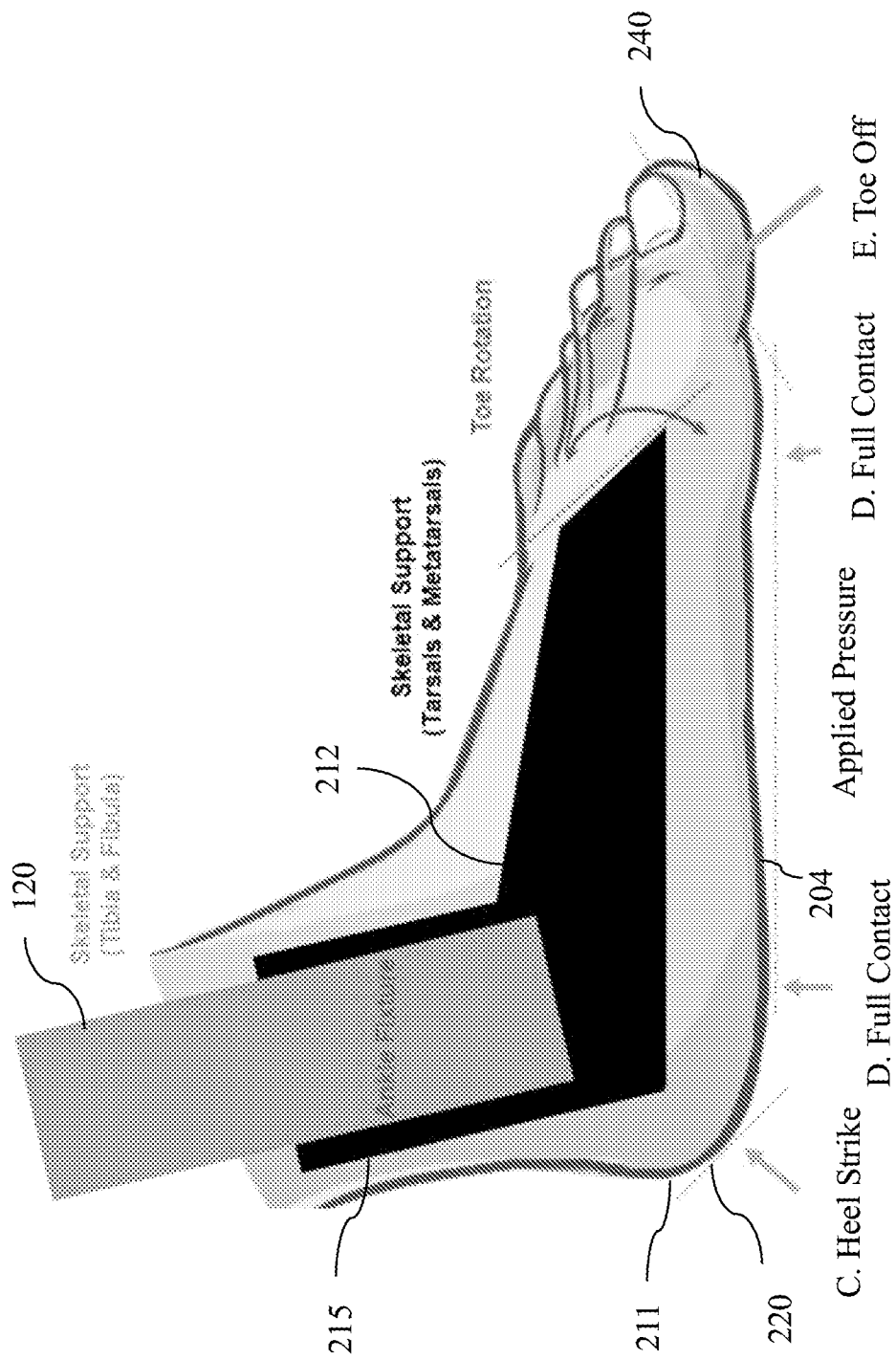
FIG. 47 is an exemplary diagram illustrating another alternative embodiment of the model foot of FIG. 27A, wherein the model foot includes a cantilever beam.

Turning to FIG. 47, another exemplary model foot 200 attached to the coupling structure 120 is shown. The coupling structure 120 can function as an ankle fixture that simulates a natural ankle. In one embodiment, the second foot portion 212 can include a stiff member overmold into the first foot portion 211 to help distribute the hold, and/or load, closer to the toes 240. The second foot portion 212 can thus form a construction similar to a cantilever beam with the ankle being a fixed end region, and a load being applied near the toes 240 to function as a floating end region. Depending on the motion of the model foot 200, a pressure can be applied to planes C, D, or E corresponding to the heel 220, the middle portion of the bottom 204, and the toes 240, respectively.

In various embodiments, based upon a mechanical breakdown of the cantilever beam, a relationship between the load applied at the end of the cantilever beam versus a stiffness of the cantilever beam can be directly proportional. For example, the second foot portion 212 with ten times the stiffness can require ten times more force to deflect the toes 240 at a given distance. Therefore, a pressure near the toes 240 can be increased by stiffening the cantilever beam. Because a great pressure near the toes 240 can be advantageous for shoe stretching, a stiff cantilever beam can be useful.

In various embodiments, there can be insignificant movement of the model foot 200 between the heel 220 and the metatarsals throughout a gait cycle. The addition of the second foot portion 212 can act the same as the corresponding skeletal system for the natural foot. As set forth above, the model foot 200 can be advantageously made via a simplified process, without using a multi-material mold making process (shown in FIGS. 3C-3F, for example). Because the second foot portion 212 can be terminated near the ends of the metatarsals, the toes 240 can be allowed to flex.

Figure 48:
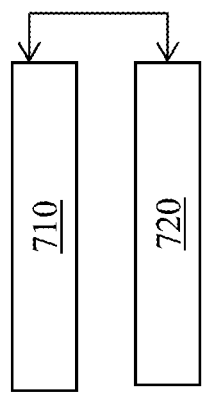
FIG. 48 is an exemplary diagram illustrating another alternative embodiment of the model foot of FIG. 3A, wherein the model foot includes first and second stretch components.

Turning to FIG. 48, an exemplary diagram of the model foot 200 is shown. In various embodiments, the model foot 200 can include a first stretch component 710 and a second stretch component 720 connected with the first stretch component 710. The first stretch component 710 can replicate an external shape of at least a part of the natural foot for shaping the internal surface of the shoe 202 (shown in FIG. 1). An exemplary first stretch component 710 can replicate a part of the natural foot with the most significant deformation and most necessary for shoe stretching. For example, for a natural foot with a toe deformation but no other types of deformation, the first stretch component 710 can include at least the toes. The second stretch component 720 can include some or all of the remaining part of the model foot 200, and can have any shapes, materials, sizes, and/or structures that imparts suitable mechanical and/or geometric properties to the model foot 200 such that the model foot 200 can mimic how the natural foot fits in, and/or moves within, the shoe 202. Accordingly, the first stretch component 710, by being coupled with the second stretch component 720, can stretch the shoe 202 into the desired shape.

In one embodiment, the first stretch component 710 can include the first sub-portion 251 (shown in FIG. 3B, for example). The second stretch component 720 can include the second sub-portion 252 (shown in FIG. 3B) and the third sub-portion 253 (shown in FIG. 3B). In another embodiment, the first stretch component 710 can include the first sub-portion 251 (shown in FIG. 4B, for example). The second stretch component 720 can include the second sub-portion 252 (shown in FIG. 4B), the third sub-portion 253 (shown in FIG. 4B) and the second foot portion 212 (shown in FIG. 4B). In another embodiment, the first and second stretch components 710, 720 can include the first and second foot portions 211, 212 (shown in FIGS. 4A, 25 and/or 27A).

Figure 49:
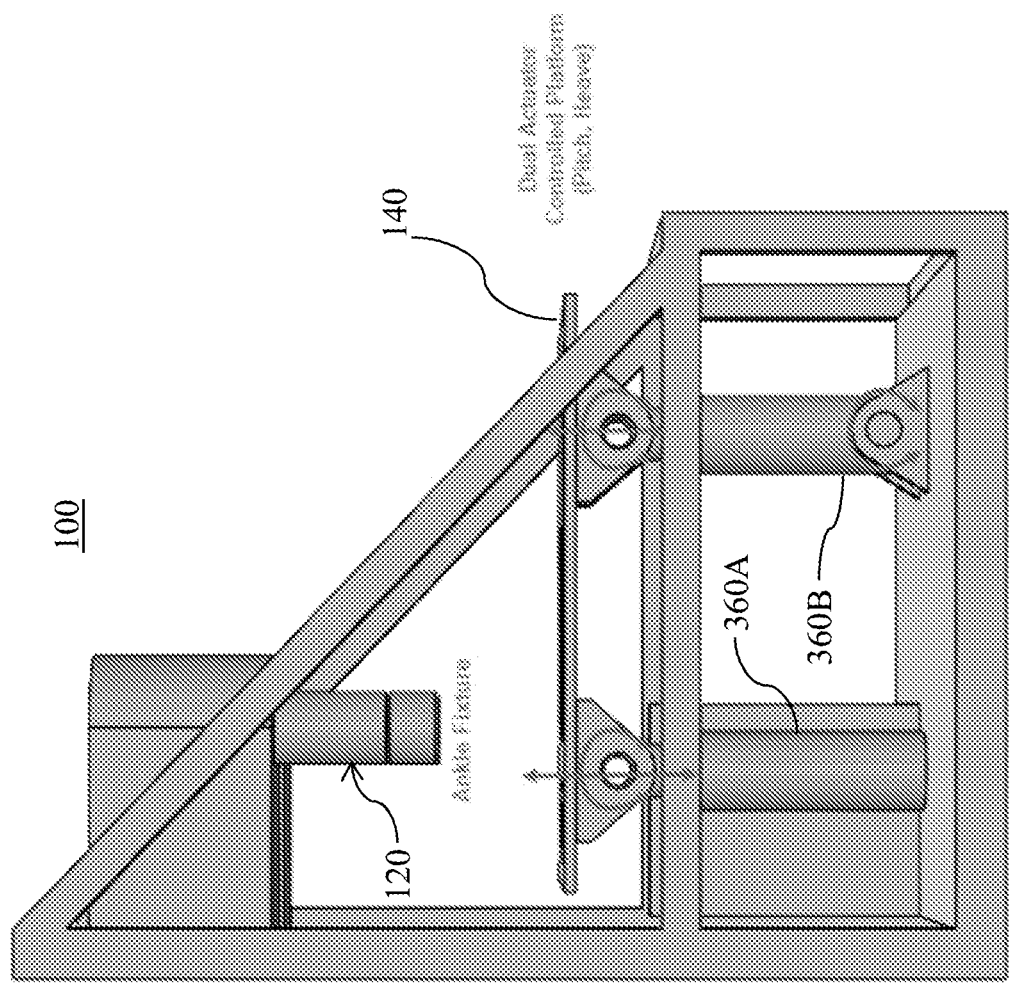
FIGS. 49 and 50 are exemplary diagrams illustrating another alternative embodiment of the apparatus of FIG. 1, wherein a platform is controlled by two actuators.

Turning to FIG. 49, another exemplary apparatus 100 is shown. The actuators 360A, 360B are shown as supporting the platform 140. The actuators 360A, 360B can include vertical actuators. The actuators 360A, 360B can be linked such that the platform 140 can move vertically and/or rotate (or pitch) to strike the shoe 202 (shown in FIG. 1) at suitable positions, and/or angles, of heel and/or toes. The coupling structure 120 can function as an ankle support that simulates a natural ankle. The coupling structure 120 can be fixed and/or compliant (or spring loaded) in plantar flexion and/or eversion such that the apparatus 100 can mimic the kinematics of the human body, creating all multi-directional forces to encourage movement and/or friction between the shoe 202, the sock 230 (shown in FIG. 33), and interfaces of the model foot 200 (shown in FIG. 1).

Figure 50:
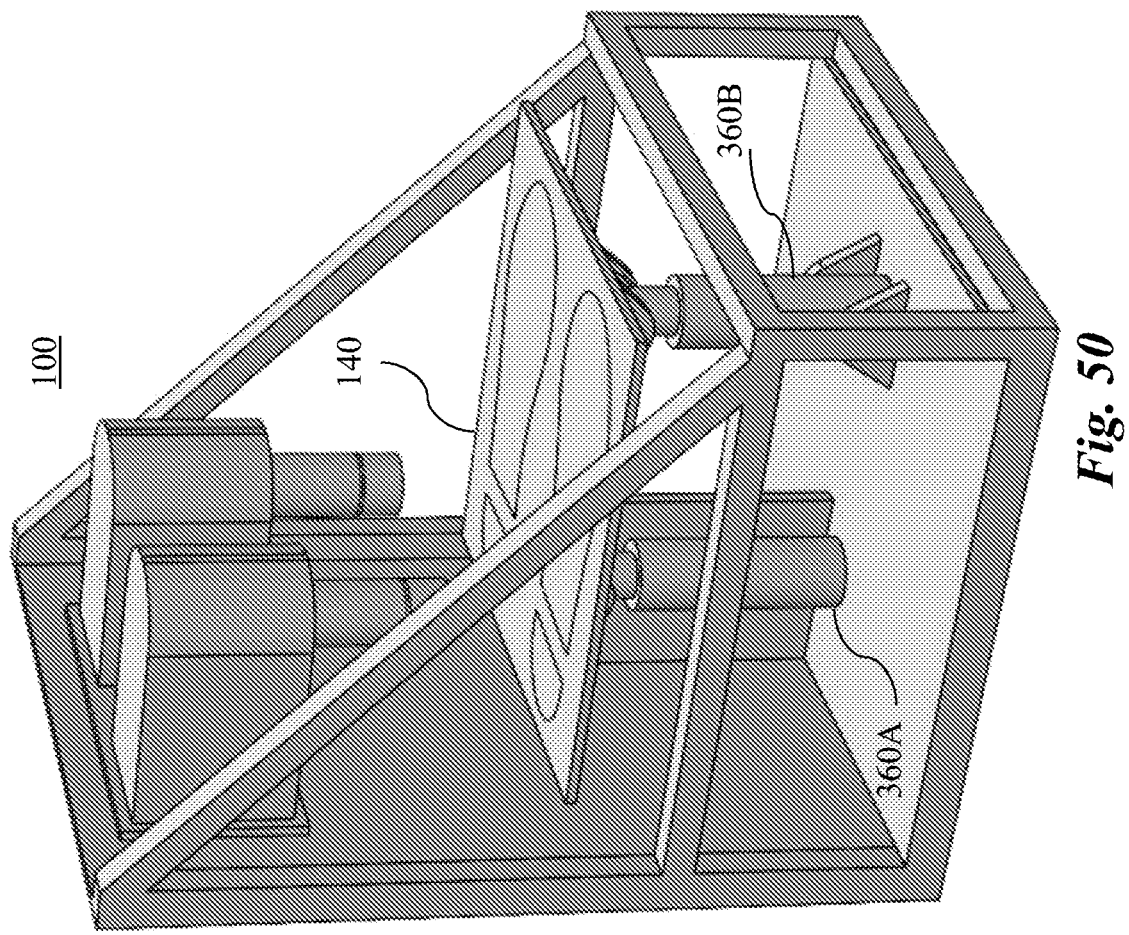

Turning to FIG. 50, the apparatus 100 of FIG. 49 is shown in an alternative view. The platform 140 is shown as being capable of contacting two shoes 202 (shown in FIG. 1) at the same time. Advantageously, the total number of components, and the manufacturing cost, of the apparatus 100 can be reduced.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. An apparatus for adjusting a shoe to fit a shape of a natural foot, comprising:
   a platform for generating a relative movement between said platform and a model foot with at least one modeling portion replicating a shape of at least part of a natural foot and being at least partially disposed in the shoe, said platform contacting the shoe via the relative movement such that the model foot moves within the shoe,
   wherein said platform repeats the relative movement for a selected number of times such that an internal surface of the shoe is stretched by the modeling portion to fit the shape of the natural foot.

2. The apparatus of claim 1, wherein said platform is configured to move in accordance with a walking motion to simulate walking of the model foot in the shoe.

3. The apparatus of claim 1, wherein said platform is configured to vibrate relative to the model foot and press against a bottom of the shoe.

4. The apparatus of claim 1, further comprising a coupling structure having first and second end regions proximal to and distal from the platform, respectively, the first end region being configured to be joined with the model foot.

5. The apparatus of claim 1, wherein said platform includes a Stewart platform with at least three degrees of freedom including:
   a pitch for simulating dorsiflexion and plantarflexion of the model foot;
   a roll for simulating pronation and supination of the model foot; and
   a heave for adjusting a distance between the model foot and the platform.

6. The apparatus of claim 5, wherein said Stewart platform has six degrees of freedom.

7. A method to make a model foot for stretching an internal surface of a shoe to fit a shape of a natural foot, comprising:
   making a first stretch component of the model foot using a first material for replicating at least toes of the natural foot; and
   making a second stretch component of the model foot using a second material for coupling with the first stretch component, the first material being different from the second material, the first and second stretch components collectively replicating the natural foot entirely, wherein the model foot is configured to be at least partially disposed in the shoe and, via a relative movement between a platform and the model foot, the platform contacts the shoe via the relative movement such that the model foot moves within the shoe and stretches the shoe.

8. The method of claim 7, wherein said making the first and second stretch components includes:
   casting a mold from the natural foot;
   placing one or more casting materials into the mold;
   curing the casting materials to form the first and second stretch components; and
   removing the first and second stretch components from the mold.

9. A method to make a model foot for stretching an internal surface of a shoe to fit a shape of a natural foot, comprising:
   making a first stretch component of the model foot using a first material for replicating at least toes of the natural foot; and
   making a second stretch component of the model foot using a second material for coupling with the first stretch component, the first material being different from second material, the first and second stretch components collectively replicating the natural foot entirely, wherein said making the first and second stretch components includes:
   casting a mold from the natural foot;
   placing one or more casting materials into the mold;
   curing the casting materials to form the first and second stretch components; and
   removing the first and second stretch components from the mold,
   wherein said making the first stretch component includes:
   pouring a first casting material into the mold, a bottom of the mold being at a preselected angle relative to a leveled surface such that the first casting material fills a first space defined by the mold corresponding to at least the toes of the natural foot.

10. The method of claim 9, wherein said making the second stretch component includes:
pouring, upon partial curing of the first casting material, a second casting material into the mold with the angle reduced such that the second casting material fills a second space defined by the mold corresponding to a middle portion of a bottom of the natural foot, the first casting material being denser than the second casting material; and
pouring, upon partial curing of the second casting material, the first casting material into the mold with the angle further reduced such that the first casting material fills a third space defined by the mold corresponding to a heel of the natural foot.

11. The method of claim 10, wherein the first and second casting materials are silicone-based, and wherein the first casting material is denser than the second casting material.

12. The method of claim 8, further comprising:
before said placing, inserting one or more with fasteners through the mold at selected locations such that a portion of each of the fasteners is embedded in the model foot upon curing of the casting materials; and
upon the curing, removing the fasteners from the model foot such that each of the removed fasteners defines an attachment point in the model foot.

13. The method of claim 8, further comprising:
before said placing, disposing the mold in a mold support conforming to a shape of the mold that is without the casting materials.

14. A model foot for stretching an internal surface of a shoe to fit a shape of a natural foot, comprising:
a first stretch component for replicating at least toes of the natural foot and being made of a first material; and
a second stretch component for coupling with the first stretch component and being made of a second material, the first material being different from the second material, the first and second stretch components collectively replicating the shape of the natural foot entirely, wherein the model foot is configured to be at least partially disposed in the shoe and cooperate with a platform, wherein the platform is configured to generate a relative movement between the platform and said model foot, to contact the shoe via the relative movement such that said model foot moves within the shoe, and wherein the platform is configured to repeat the relative movement such that the internal surface of the shoe is stretched by the model foot to fit the shape of the natural foot.

15. The model foot of claim 14, wherein the first stretch component includes toes of the model foot, and the second stretch component includes a heel of the model foot and a midportion of the model foot between the toes and the heel, the toes and the heel being made from a first casting material, the midportion of the model foot being made from a second casting material different from the first casting material.

16. The model foot of claim 15, wherein the midportion of the model foot between the toes and the heel is softer than the toes and the heel of the model foot.

17. A model foot for stretching an internal surface of a shoe to fit a shape of a natural foot, comprising:
a first stretch component for replicating at least toes of the natural foot and being made of a first material; and
a second stretch component for coupling with the first stretch component and being made of a second material, the first material being different from the second material, the first and second stretch components collectively replicating the shape of the natural foot entirely,
wherein the model foot defines one or more attachment points thereon, each attachment point defining a recess on the model foot with mechanical thread.

18. The model foot of claim 17, wherein the attachment points are defined at an ankle joint of the model foot, a back of the model foot, or a combination thereof, and at least one of the attachment points is accessible upon disposing the model foot in the shoe.

19. The method of claim 9, further comprising:
before said placing, inserting one or more with fasteners through the mold at selected locations such that a portion of each of the fasteners is embedded in the model foot upon curing of the casting materials; and
upon the curing, removing the fasteners from the model foot such that each of the removed fasteners defines an attachment point in the model foot.

20. The method of claim 9, further comprising:
before said placing, disposing the mold in a mold support conforming to a shape of the mold that is without the casting materials.

21. The model foot of claim 17, wherein the first stretch component includes toes of the model foot, and the second stretch component includes a heel of the model foot and a midportion of the model foot between the toes and the heel, the toes and the heel being made from a first casting material, the midportion of the model foot being made from a second casting material different from the first casting material.

22. The model foot of claim 21, wherein the midportion of the model foot between the toes and the heel is softer than the toes and the heel of the model foot.

* * * * *